US012440513B2

(12) United States Patent
Yang

(10) Patent No.: US 12,440,513 B2
(45) Date of Patent: Oct. 14, 2025

(54) METHODS FOR IMPROVING COGNITIVE FUNCTION

(71) Applicant: ALBANY MEDICAL COLLEGE, Albany, NY (US)

(72) Inventor: Qi Yang, Glenmont, NY (US)

(73) Assignee: Albany Medical College, Albany, NY (US)

( * ) Notice: Subject to any disclaimer, the term of this patent is extended or adjusted under 35 U.S.C. 154(b) by 1059 days.

(21) Appl. No.: 17/441,613

(22) PCT Filed: Mar. 20, 2020

(86) PCT No.: PCT/US2020/023800
§ 371 (c)(1),
(2) Date: Sep. 21, 2021

(87) PCT Pub. No.: WO2020/197984
PCT Pub. Date: Oct. 1, 2020

(65) Prior Publication Data
US 2022/0125849 A1 Apr. 28, 2022

Related U.S. Application Data

(60) Provisional application No. 62/822,159, filed on Mar. 22, 2019.

(51) Int. Cl.
| | |
|---|---|
| *A61K 38/19* | (2006.01) |
| *A61K 9/00* | (2006.01) |
| *A61K 31/202* | (2006.01) |
| *A61K 31/5575* | (2006.01) |
| *A61K 35/17* | (2015.01) |
| *A61K 35/26* | (2015.01) |
| *A61K 35/741* | (2015.01) |
| *A61K 38/20* | (2006.01) |
| *A61K 39/395* | (2006.01) |
| *A61P 25/28* | (2006.01) |
| *C12N 5/078* | (2010.01) |

(52) U.S. Cl.
CPC ............ *A61K 35/26* (2013.01); *A61K 9/0024* (2013.01); *A61K 31/202* (2013.01); *A61K 31/5575* (2013.01); *A61K 35/17* (2013.01); *A61K 35/741* (2013.01); *A61K 38/19* (2013.01); *A61K 38/20* (2013.01); *A61K 38/2033* (2013.01); *A61K 38/2046* (2013.01); *A61K 39/3955* (2013.01); *A61P 25/28* (2018.01); *C12N 5/0634* (2013.01)

(58) Field of Classification Search
CPC ...... A61K 31/202; A61K 38/19; A61K 38/20; A61K 39/3955; A61K 35/741; A61K 35/17; A61K 9/0024; A61K 35/26; A61K 38/2033; A61K 38/2046; A61P 25/28; C12N 5/0634
See application file for complete search history.

(56) References Cited

U.S. PATENT DOCUMENTS

| | | |
|---|---|---|
| 2016/0361365 A1 | 12/2016 | Lee et al. |
| 2017/0056448 A1 | 3/2017 | Glick et al. |
| 2017/0296678 A1 | 10/2017 | Frost et al. |
| 2017/0360907 A1 | 12/2017 | Serody et al. |
| 2018/0002664 A1 | 1/2018 | Scholz et al. |
| 2018/0186855 A1 | 7/2018 | Rosenthal |
| 2018/0340145 A1 | 11/2018 | Ichim et al. |
| 2019/0015480 A1* | 1/2019 | Fu ........................... A61P 25/28 |

FOREIGN PATENT DOCUMENTS

| | | |
|---|---|---|
| WO | 2017196432 A1 | 11/2017 |
| WO | 2018018082 A1 | 2/2018 |
| WO | 2018100091 A1 | 6/2018 |
| WO | 2018102612 A1 | 6/2018 |
| WO | 2018201071 A1 | 11/2018 |
| WO | 2018231951 A1 | 12/2018 |

OTHER PUBLICATIONS

Vivier et al., "innate Lymphoid Cells: 10 Years," Cell 174:1054-1066 p. 1054 and 1055 (2018) (Year: 2018).*
Hin et al., "Activation of Group 2 Innate Lymphoid cells alleviates Aging-Associated cognitive Decline," J. Exp. Med. 217 (4): e20190915) (Year: 2020).*
Zucchella et al., The Multidisciplinary Approach to Alzheimer's Disease and Dementia. Narrative Review of Non-Pharmacological Treatment. Front Neurol. Dec. 13, 2018; 9 1058 p. 1 (Year: 2018).*
Artis et al., The biology of innate lymphoid cells. Nature 517, 293-301 (2015) (Year: 2015).*
International Search Report and Written Opinion for International Application No. PCT/US2020/023800 (mailed on Jul. 31, 2020).
Besnard et al., "IL-33-mediated Protection Against Experimental Cerebral Malaria is Linked to Induction of Type 2 Innate Lymphoid Cells M2 Macrophages and Regulatory T Cells," PLoS Pathogens 11(2):1-21 (2015).
Gadani et al., "Characterization of Meningeal Type 2 Innate Lymphocytes and Their Response to CNS Injury," The Journal of Experimental Medicine 214(2):285-296 (2017).
Guillot-Sestier et al., "Innate Immunity Fights Alzheimer's Disease," Trends Neurosci. 38(11):674-681 (2015).

(Continued)

*Primary Examiner* — Prema M Mertz
(74) *Attorney, Agent, or Firm* — Heslin Rothenberg Farley & Mesiti P.C.

(57) ABSTRACT

The present disclosure relates to a method of improving cognitive function in a subject. The method includes implanting group-2 innate lymphoid cells (ILC2) in a cranium of a subject, where the ILC2 was treated with an ILC2 activator. The present disclosure further relates to a method including selecting a subject having aging-associated cognitive decline and administering to the subject an activator of innate lymphoid cell activity under conditions effective to promote innate lymphoid cell activity. The present disclosure further relates to a method of improving cognition in a subject. The method includes selecting a subject having aging-associated cognitive decline and administering to the subject a cytokine selected from the group consisting of IL-33, IL-5, IL-7, IL-25, and thymic stromal lymphopoietin.

20 Claims, 39 Drawing Sheets
Specification includes a Sequence Listing.

(56) References Cited

OTHER PUBLICATIONS

Mirchandani et al., "Interleukin-33 and the Function of Innate Lymphoid Cells," Trends in Immunology 33 (8):389-396 (2012).
Barbosa, Carlos Henrique D., et al.; "Critical role of IL-25-ILC2-IL-5 axis in the production of anti-Francisella LPS IgM by B1 B cells"; PLOS Pathogens 2021; 17(8):e1009905.
Kim, Brian S., et al.; "TSLP elicits IL-33-independent innate lymphoid cell responses to promote skin inflammation"; Sci Transl Med 2013; 5(170):170ra16.
Doherty, Taylor A., et al.; "Lung Type 2 innate lymphoid cells express CysLT1R that regulates Th2 cytokine production"; J. Allergy Clin Immunol. 2013; 132(1):205-213.
Fonseca, Wendy, et al.; "Group 2 innate lymphoid cells (ILC2) are regulated by stem cell factor during chronic asthmatic disease"; Mucosal Immunol 2019; 12(2):445-456.
Sheikh, Abdalla, et al.; "IL-7 induces type 2 cytokine response in lung ILC2s and regulates GATA3 and CD25 expression"; Journal of Leukocyte Biology 2022; 112:1105-1113.
Yu, X., et al.; "TNF superfamily member TL1A elicits type 2 innate lymphoid cells at mucosal barriers"; Mucosal Immunology 2014; 7(3):730-740.
Xue, Luzheng, et al.; "Prostaglandin D2 activates group 2 innate lymphoid cells through chemoattractant receptor- homologous molecule expressed on TH2 cells"; J Allergy Clin Immunol 2014; 133(4):1184-1194.e7.
Von Moltke, Jakob, et al.; "Tuft-cell-derived IL-25 regulates an intestinal ILC2-epithelial response circuit"; Nature 2016; 529(7585):221-225.
Moro, Kazuyo, et al.; "Innate production of TH2 cytokines by adipose tissue-associated c-Kit+Sca-1+ lymphoid cells"; Nature 2010; 463:540-546.

* cited by examiner

FIG. 2A
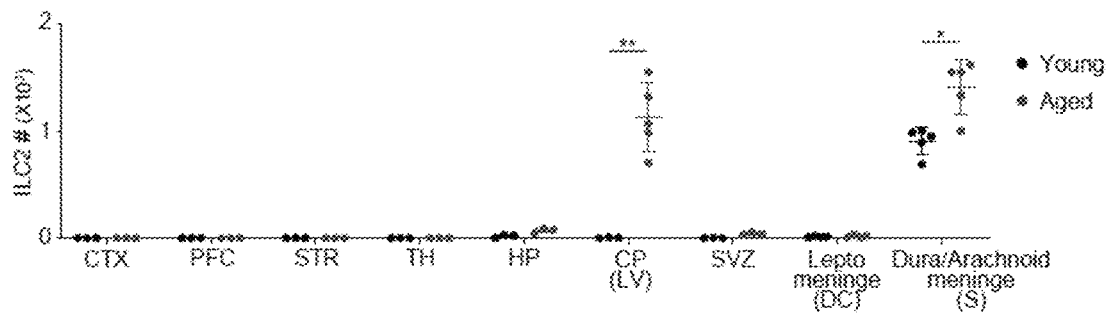
FIG. 2B
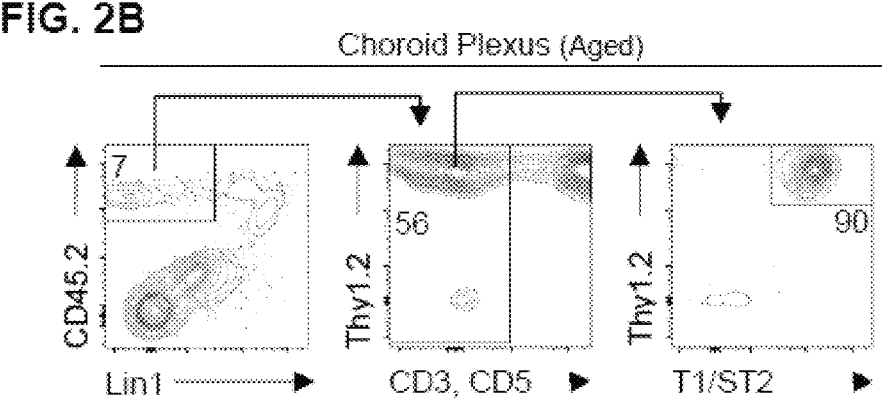
FIG. 2C
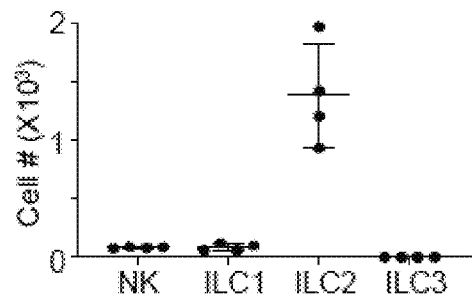
FIGS. 2A-2C

FIG. 2D
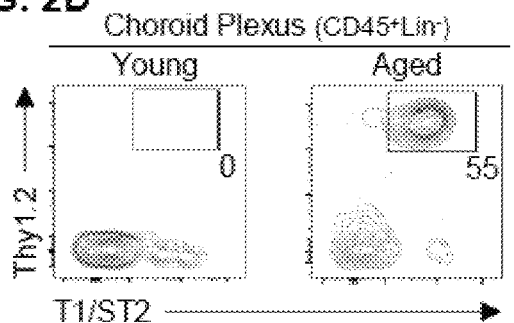
FIG. 2E
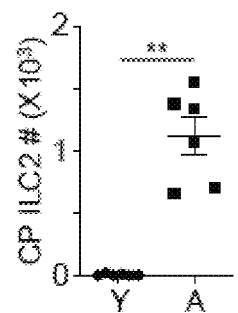
FIG. 2F
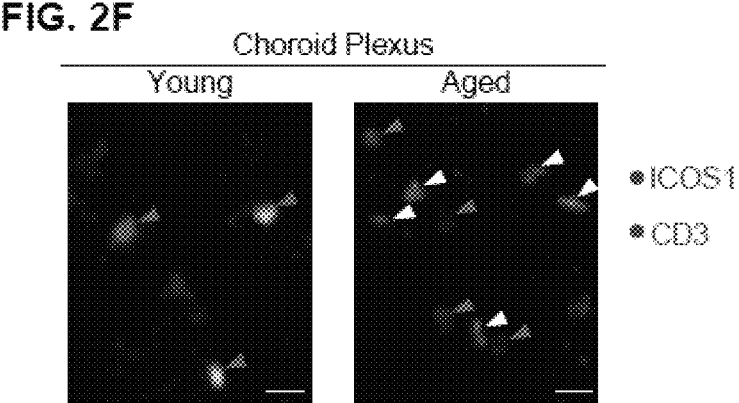
FIG. 2G
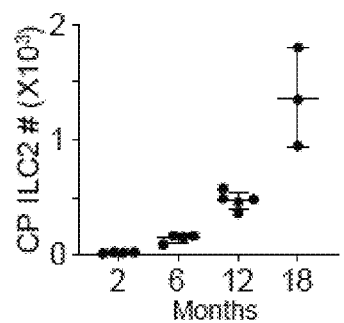
FIGS. 2D-2G FIG. 2H
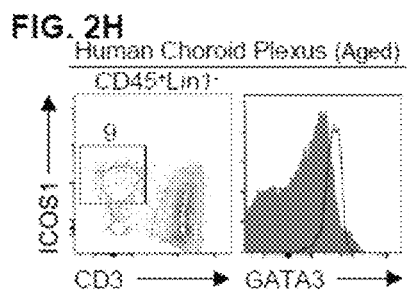
FIG. 2I
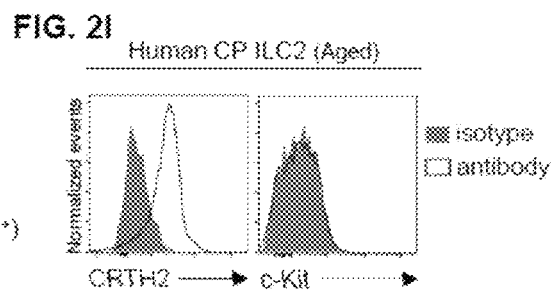
FIG. 2J
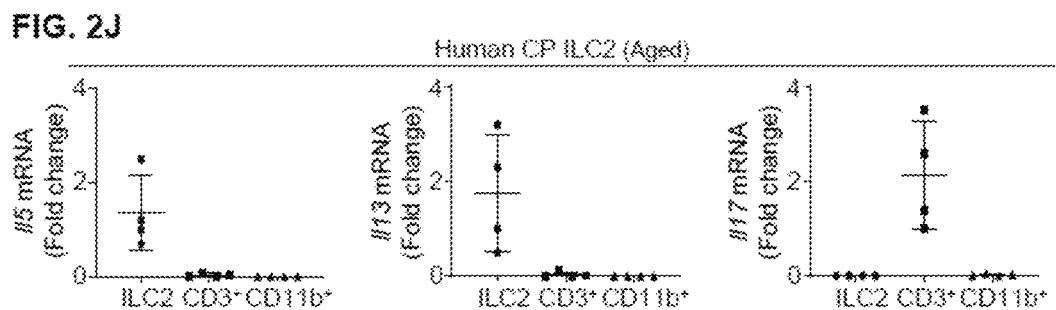
FIGS. 2H-2J FIG. 3F
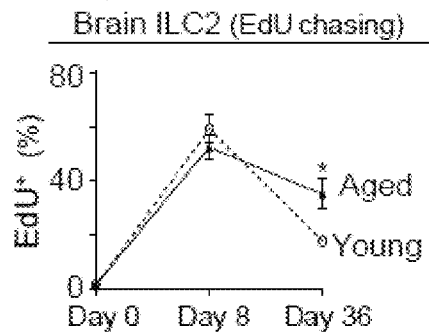
FIG. 3G
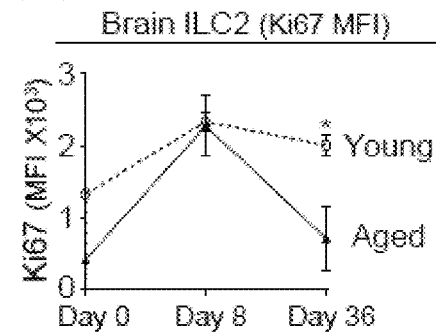
FIG. 3H
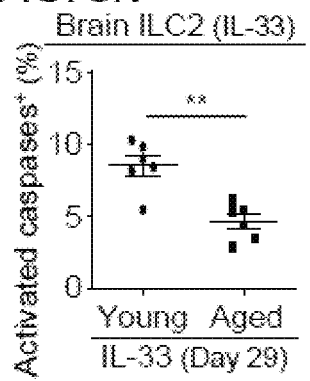
FIG. 3I
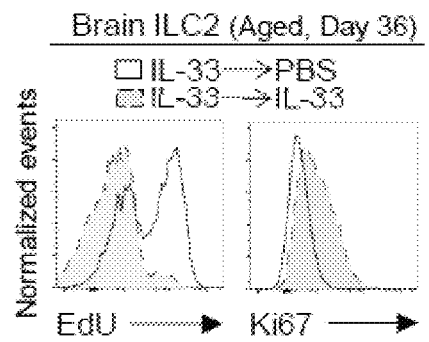
FIG. 3J
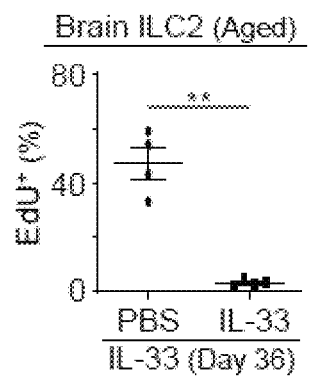
FIG. 3K
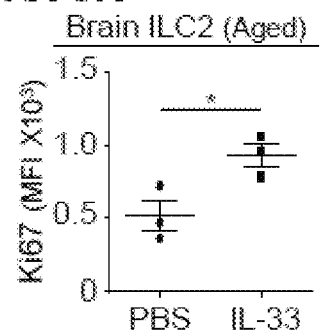
FIGS. 3F-3K

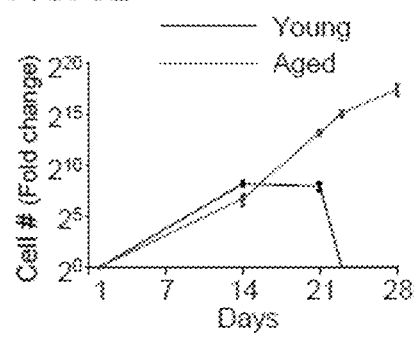
FIG. 3L
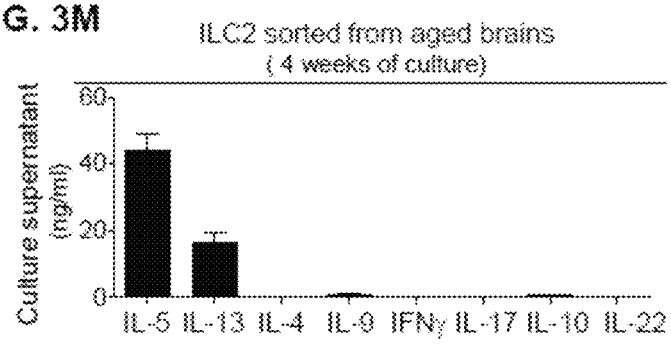
FIG. 3M
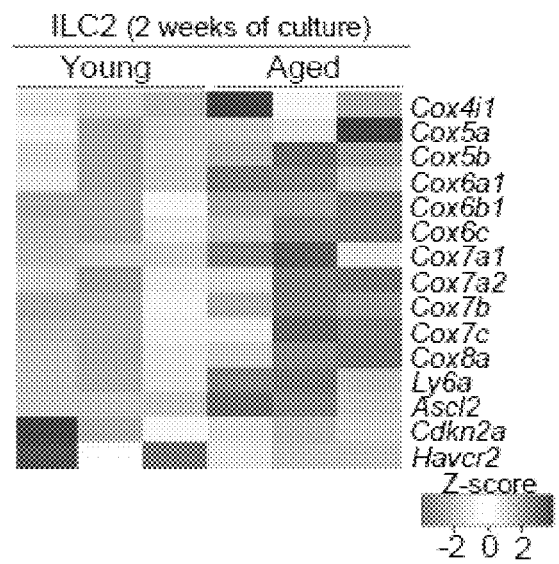
FIG. 3N
FIGS. 3L-3N

FIG. 4A
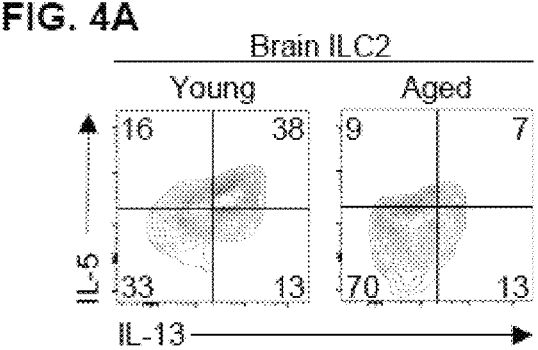
FIG. 4B
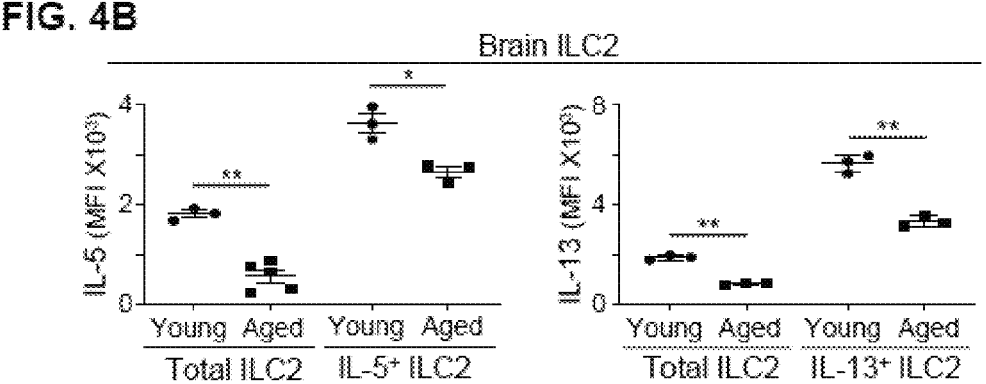
FIG. 4C
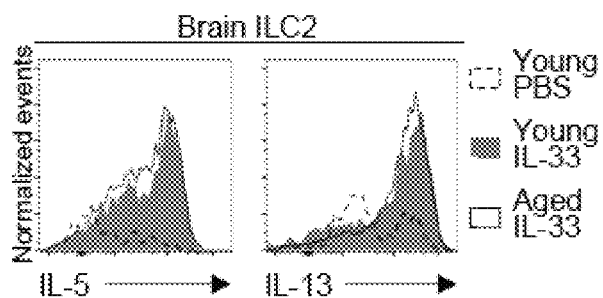
FIGS. 4A-4C

FIG. 4D
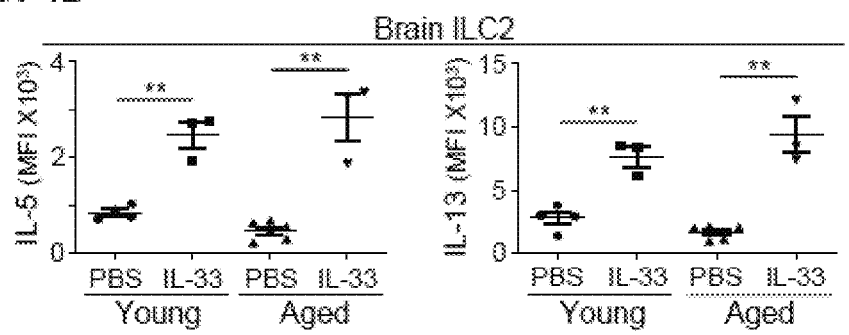
FIG. 4E
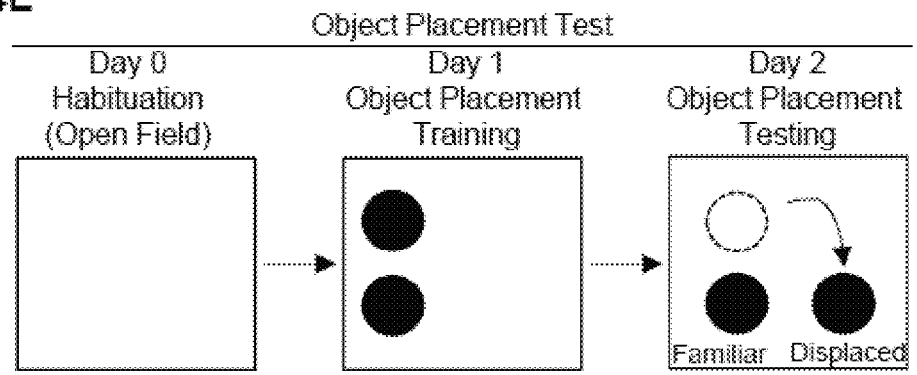
FIGS. 4D-4E

FIG. 5E
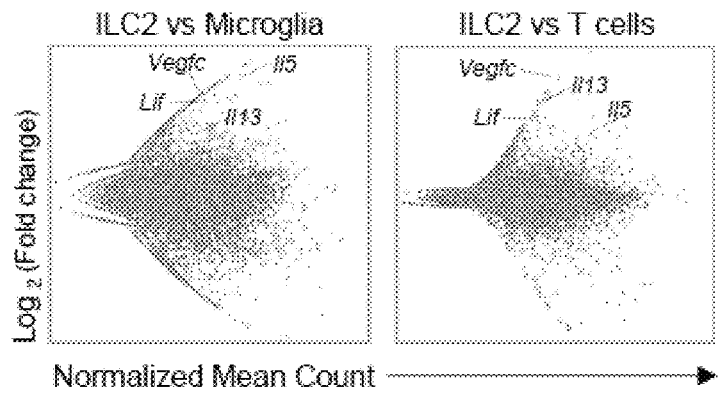
FIG. 5F
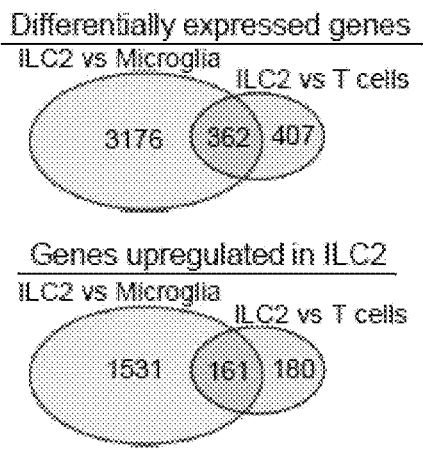
FIG. 5G
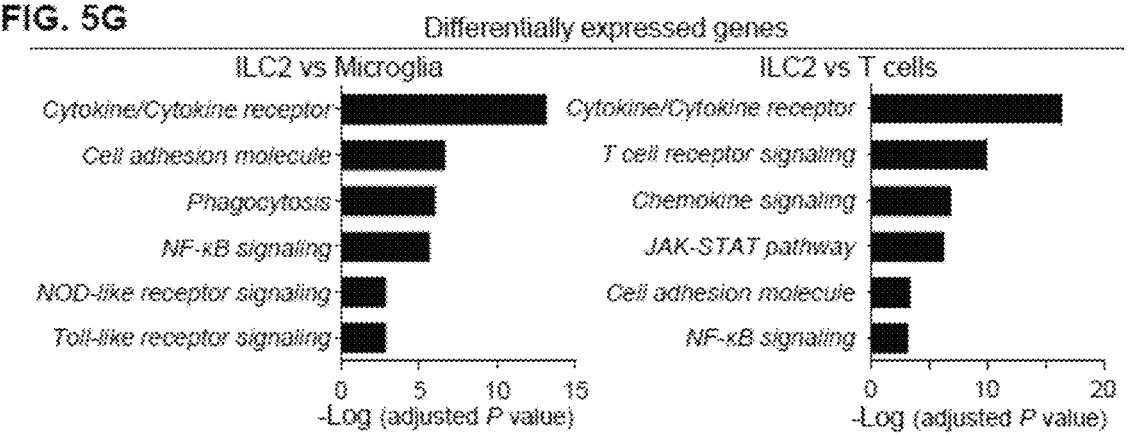
FIGS. 5E-5G

FIG. 5H
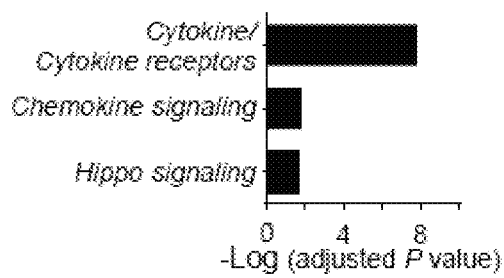
FIG. 5I
Genes highly expressed by ILC2 in aged brains
| Cytokine/Cytokine receptors | Il5, Il13, Il10, Lif, Csf2, Il2, Il7r, Il2ra, Dr3, Gitr |
|---|---|
| Chemokine/Chemokine receptors | Ccl1, Ccr8, Ccr9, Ccr2, Cxcr6 |
| Growth factors | Vegfc, Bmp7, Areg |
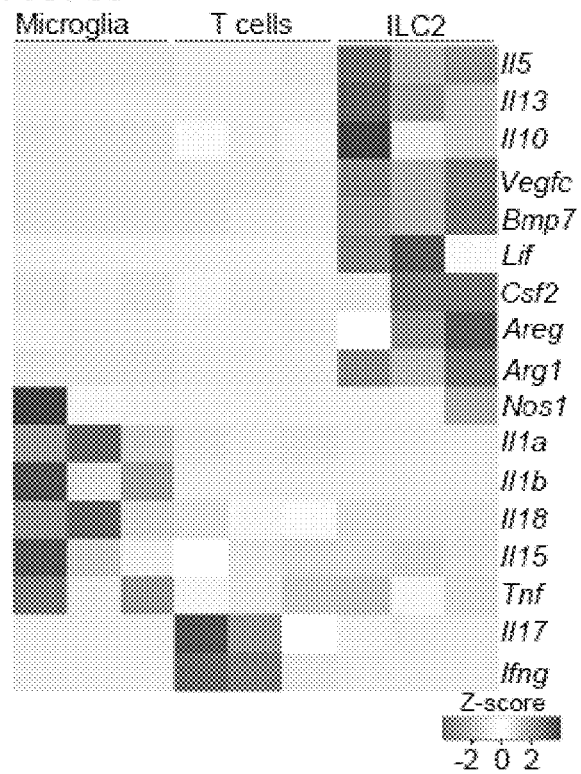
FIGS. 5H-5J

FIG. 5K
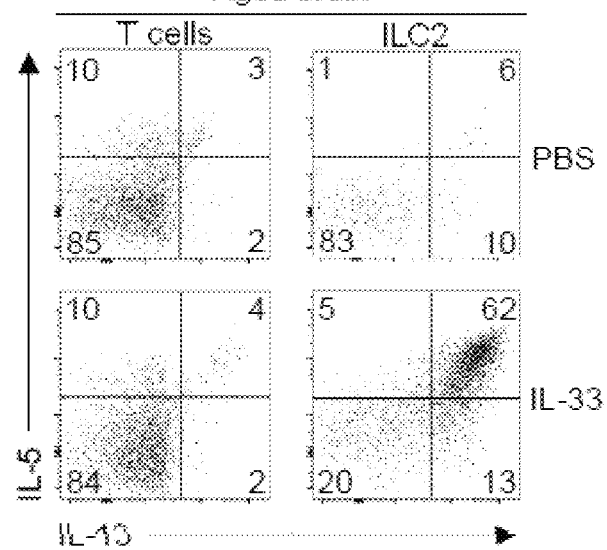
FIG. 5L
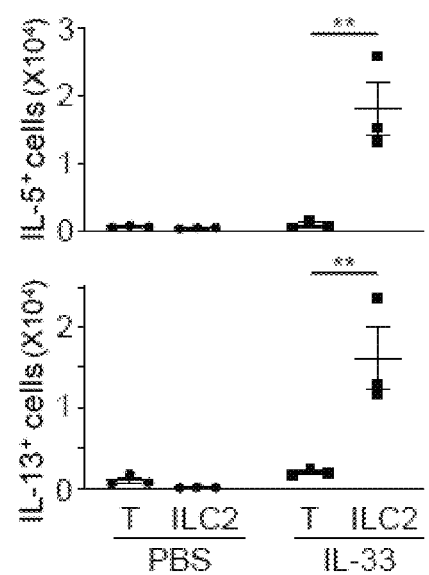
FIGS. 5K-5L

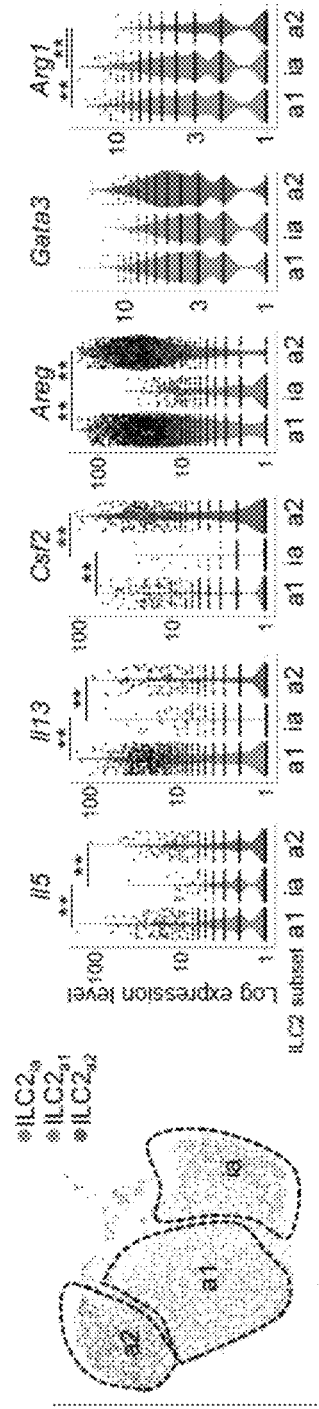
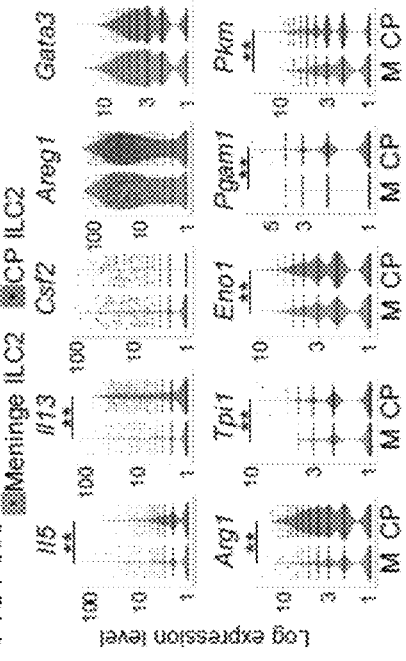
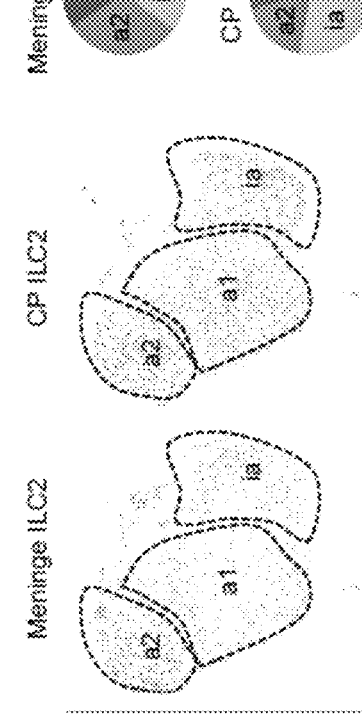
FIGS. 6G-6K

FIG. 7A
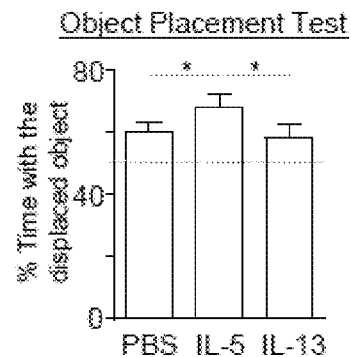
FIG. 7B
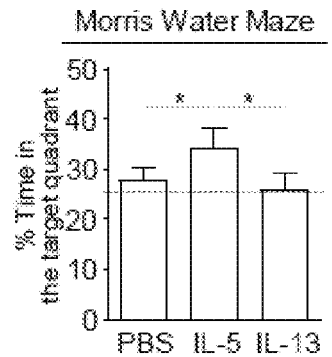
FIG. 7C
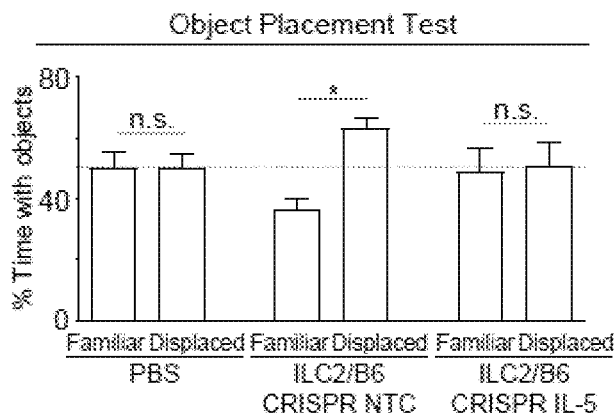
FIG. 7D
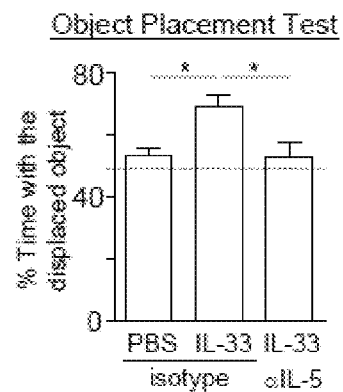
FIG. 7E
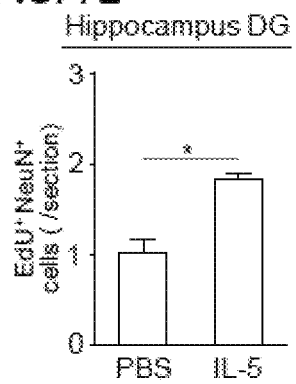
FIG. 7F
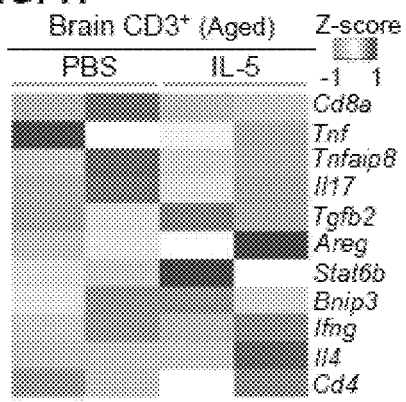
FIGS. 7A-7F FIG. 7G
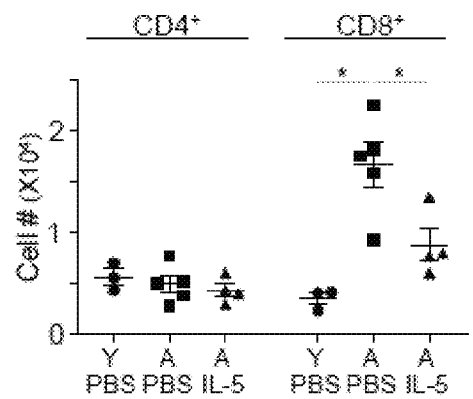
FIG. 7H
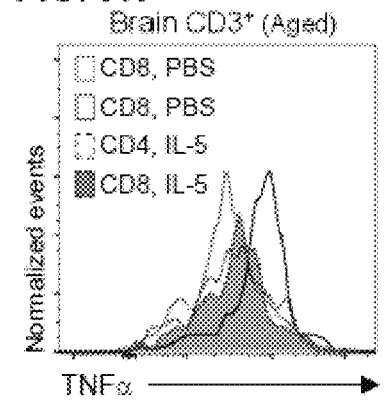
FIG. 7I
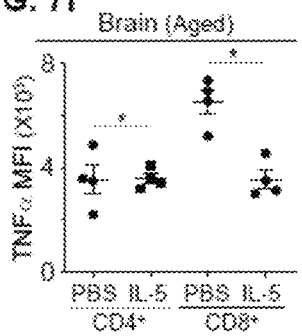
FIG. 7J
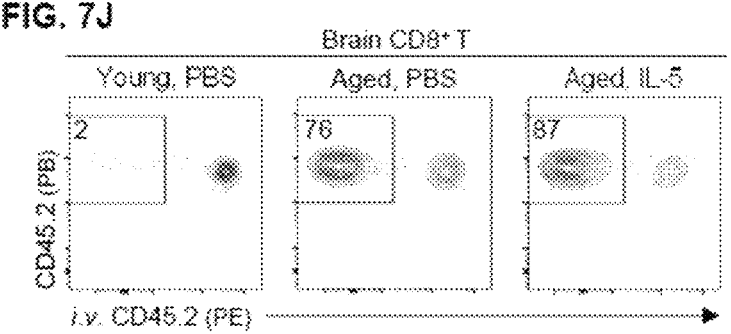
FIG. 7K
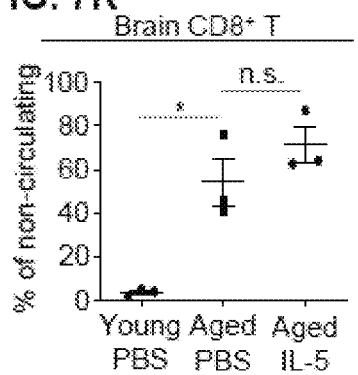
FIG. 7L
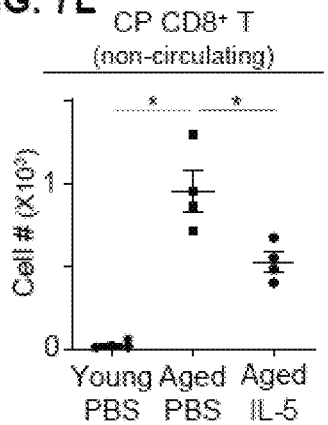
FIG. 7M
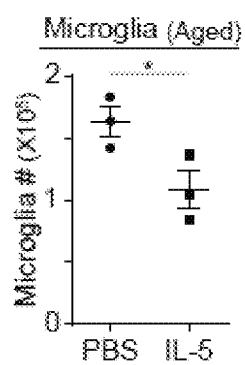
FIGS. 7G-7M

FIG. 7N
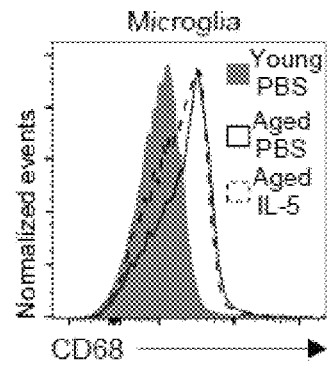
FIG. 7O
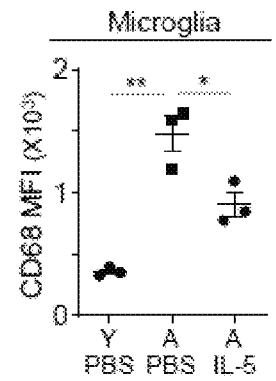
FIG. 7P
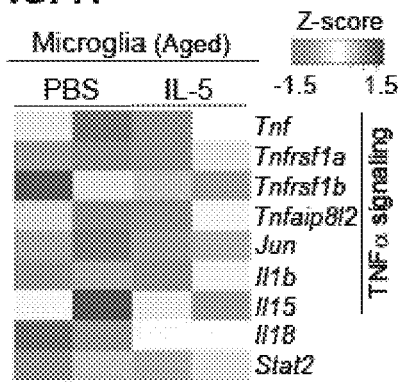
FIG. 7Q
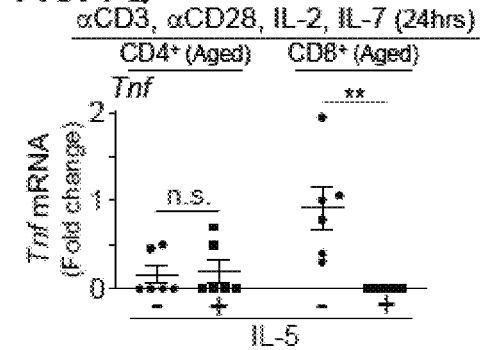
FIG. 7R
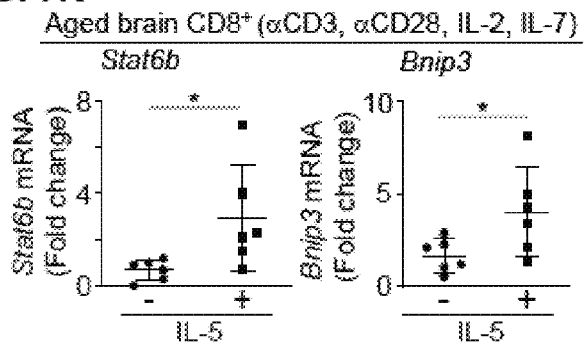
FIG. 7S
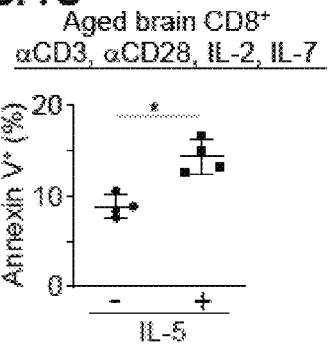
FIGS. 7N-7S

FIG. 9A
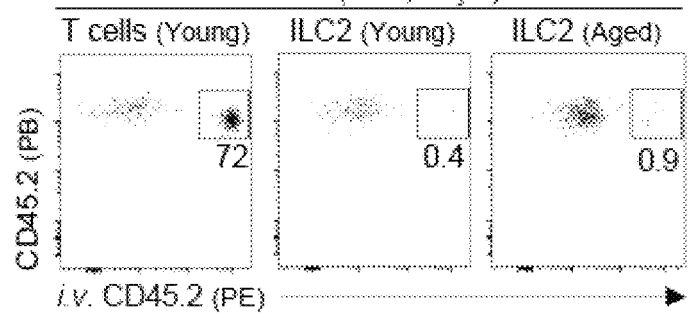
FIG. 9B
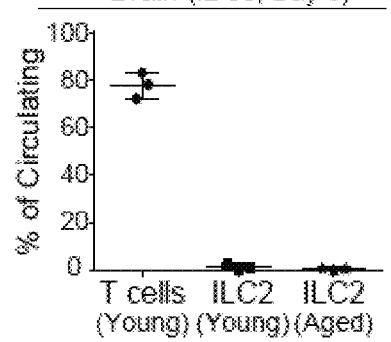
FIGS. 9A-9B

FIG. 12A
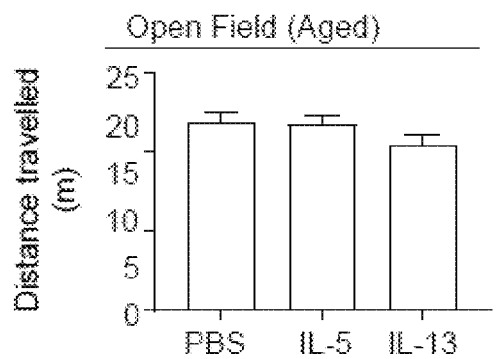
FIG. 12B
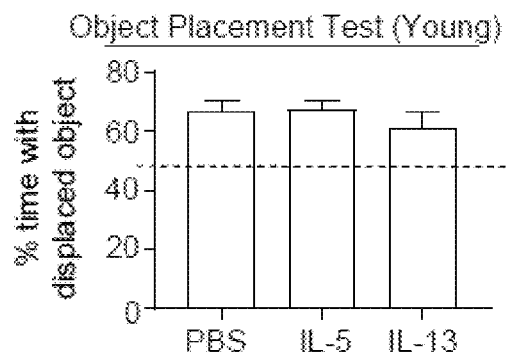
FIG. 12C
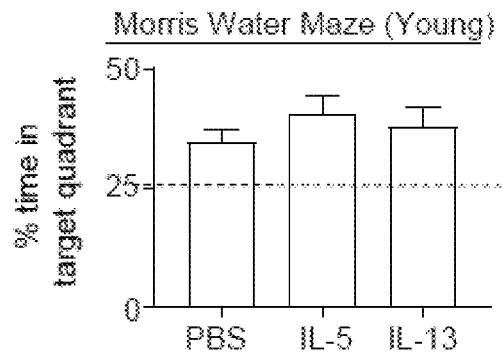
FIGS. 12A-12C FIG. 16A
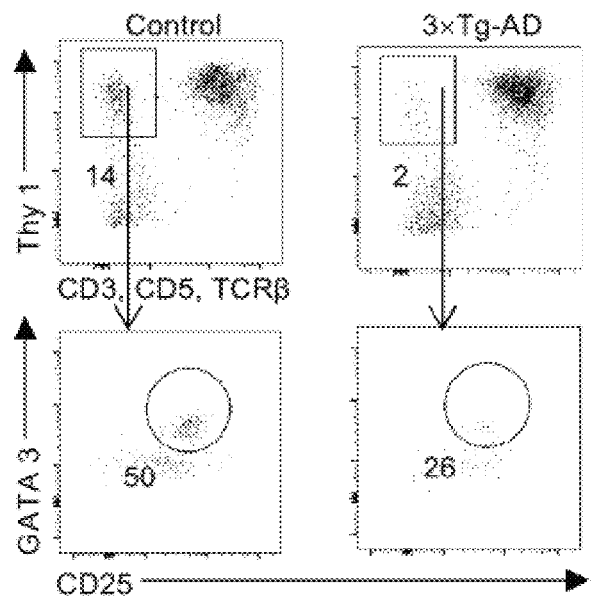
FIG. 16B
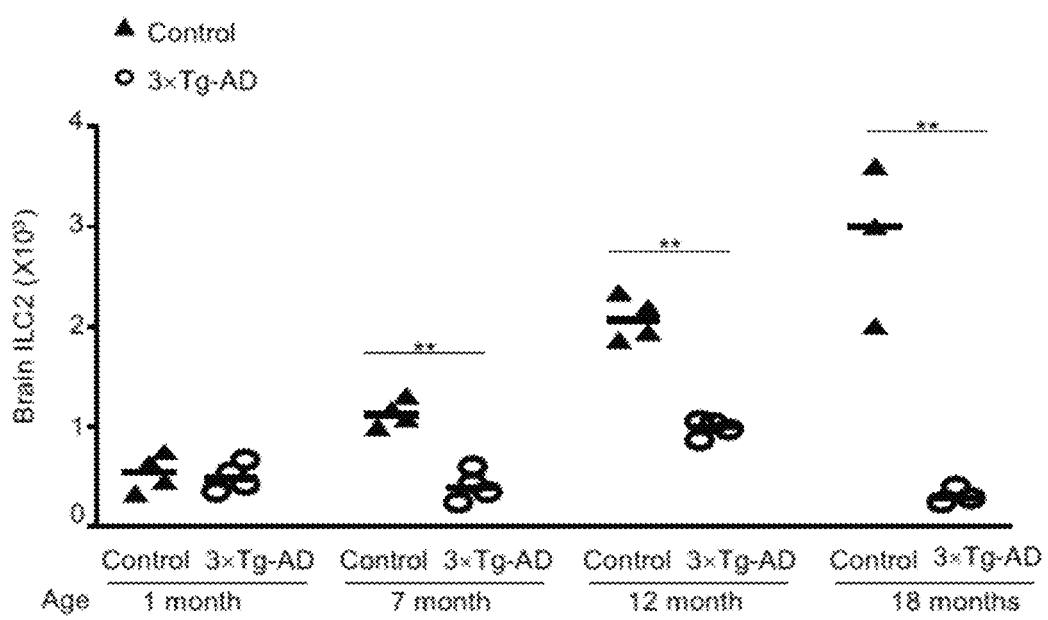
FIGS. 16A-16B FIG.16C
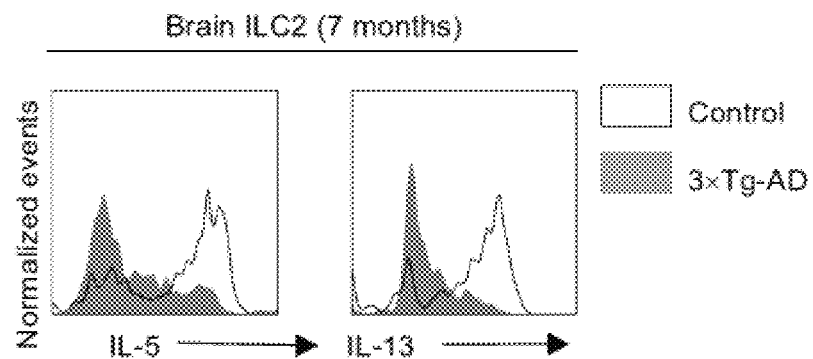
FIG. 16D
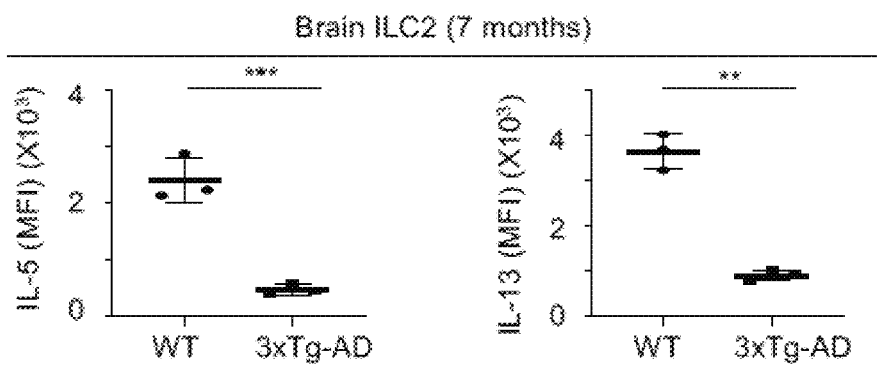
FIGS. 16C-16D FIG. 18A
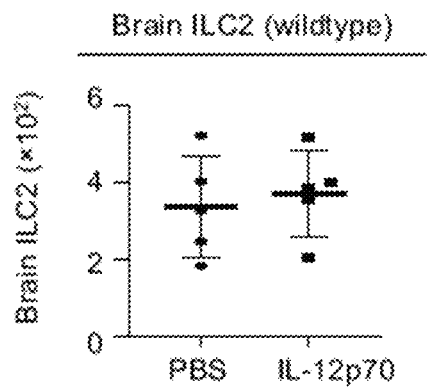
FIG. 18B
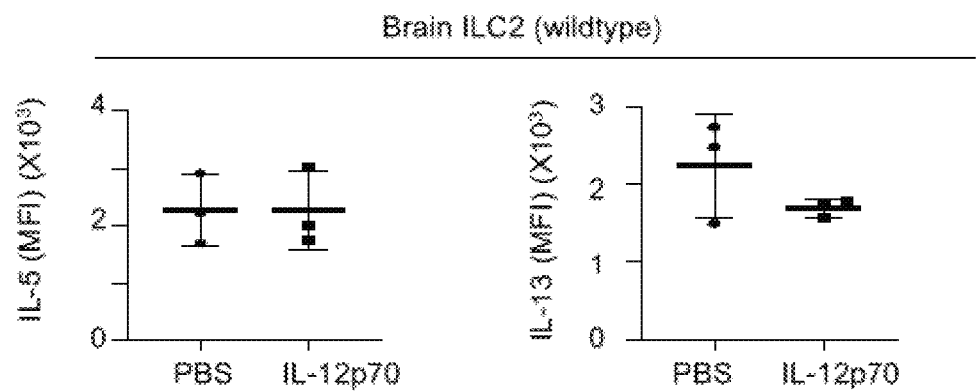
FIGS. 18A-18B FIG. 18C
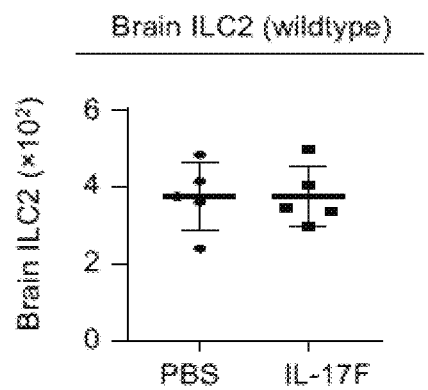
FIG. 18D
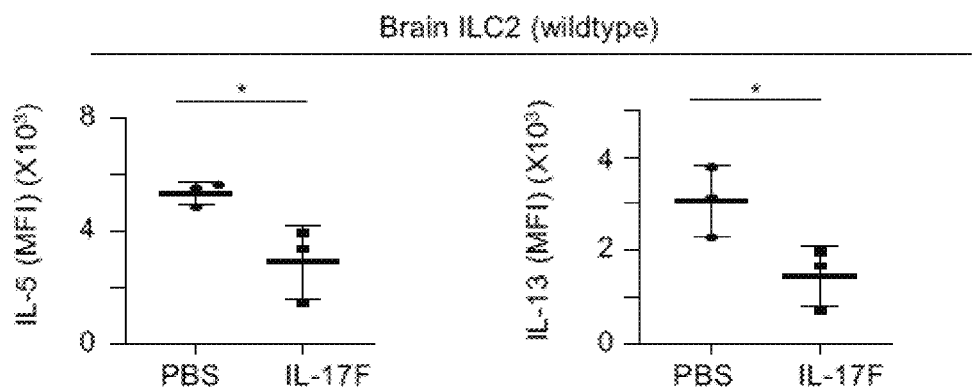
FIGS. 18C-18D FIG. 18E
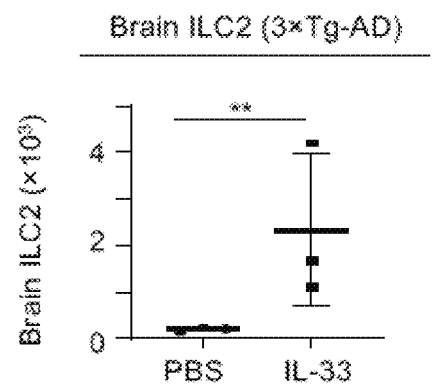
FIG. 18F
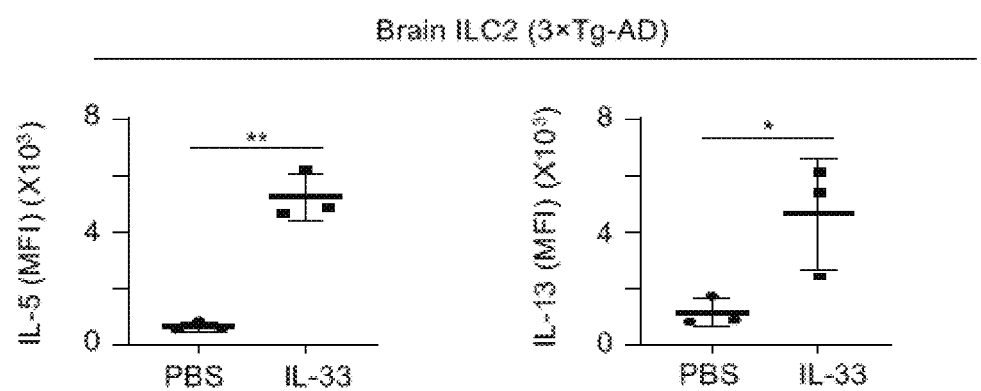
FIGS. 18E-18F

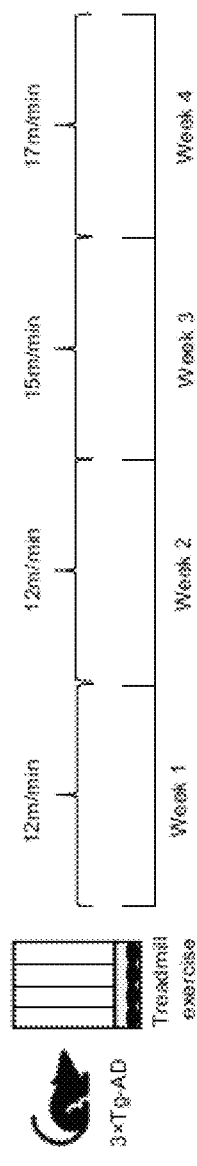
FIG. 19A
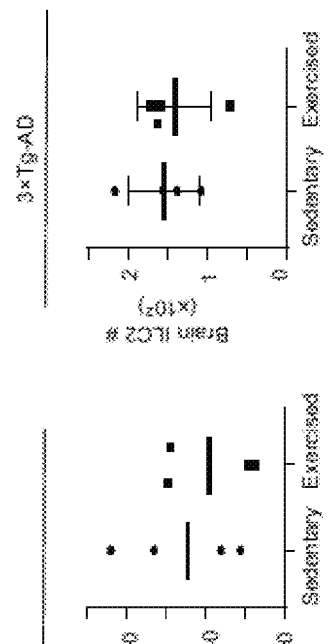
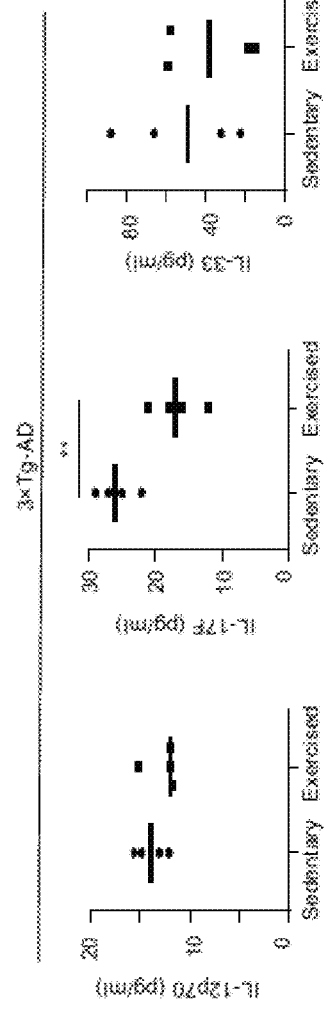
FIG. 19B
FIG. 19C
FIGS. 19A-19C

FIG. 19D
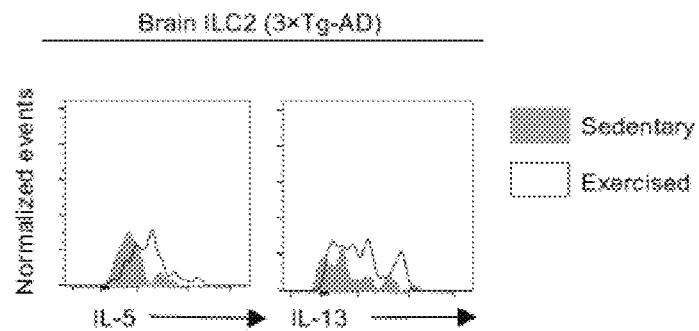
FIG. 19E
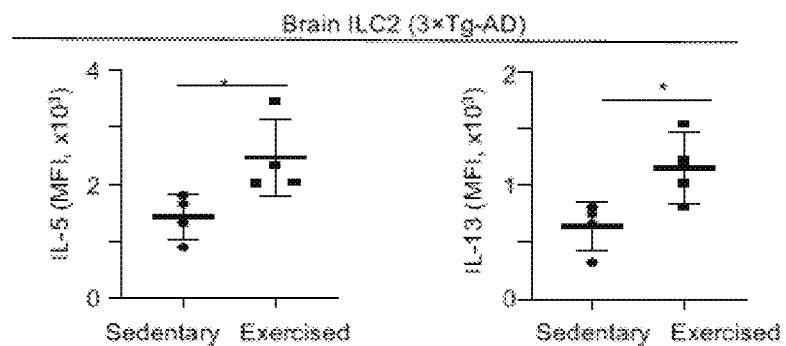
FIG. 19F
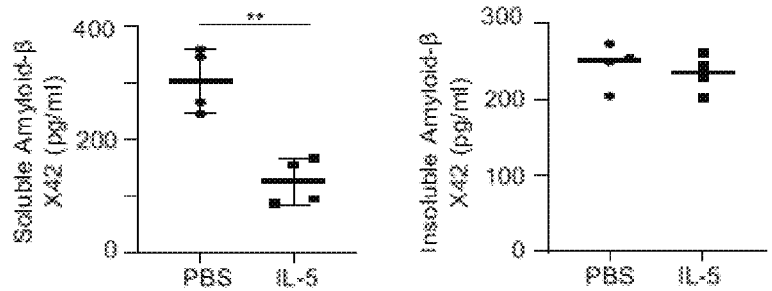
FIGS. 19D-19F

SEQUENCE LISTING

<160> NUMBER OF SEQ ID NOS: 2

<210> SEQ ID NO 1
<211> LENGTH: 20
<212> TYPE: DNA
<213> ORGANISM: Artificial Sequence
<220> FEATURE:
<223> OTHER INFORMATION: Laboratory synthesized sequence

<400> SEQUENCE: 1
acggaggacg aggcagttcc                              20

<210> SEQ ID NO 2
<211> LENGTH: 23
<212> TYPE: DNA
<213> ORGANISM: Artificial Sequence
<220> FEATURE:
<223> OTHER INFORMATION: Laboratory synthesized sequence

<400> SEQUENCE: 2
tgcgaatacg cccacgcgat ggg                          23

METHODS FOR IMPROVING COGNITIVE FUNCTION

This application is a national stage application under 35 U.S.C. § 371 of PCT Application No. PCT/US2020/023800, filed Mar. 20, 2020, which claims benefit of U.S. Provisional Patent Application Ser. No. 62/822,159, filed on Mar. 22, 2019, each of which is hereby incorporated by reference in its entirety.

This invention was made with government support under grant number R01AG057782 awarded by the National Institutes of Health. The Government has certain rights in the invention.

FIELD

The present disclosure relates generally to methods for improving cognitive function.

BACKGROUND

The brain has been traditionally viewed as an immune-privileged organ largely devoid of immune cells save for microglia in the parenchyma (Carson et al., "CNS Immune Privilege: Hiding in Plain Sight," *Immunol. Rev.* 213:48-65 (2006)). Nevertheless, advances in the past decade have instead suggested a critical role for immune surveillance in maintaining the physiological function of the brain (Louveau et al., "Revisiting the Mechanisms of CNS Immune Privilege," *Trends Immunol.* 36:569-577 (2015); McGowan et al., "Impaired Social Recognition Memory in Recombination Activating Gene 1-Deficient Mice," *Brain Res.* 1383: 187-195 (2011); Wolf et al., "CD4-positive T Lymphocytes Provide a Neuroimmunological Lnk in the Control of Adult Hippocampal Neurogenesis," *J. Immunol.* 182:3979-3984 (2009)). RAG-deficient mice lacking adaptive immune cells or mice deficient for T cells exhibited impaired neurogenesis and declined cognitive function that can be restored by the transfer of splenocytes or CD4$^+$ T cells (McGowan et al., "Impaired Social Recognition Memory in Recombination Activating Gene 1-Deficient Mice," *Brain Res.* 1383:187-195 (2011); Wolf et al., "CD4-positive T Lymphocytes Provide a Neuroimmunological Lnk in the Control of Adult Hippocampal Neurogenesis," *J. Immunol.* 182:3979-3984 (2009)). Exacerbated progression of Alzheimer's Disease phenotype has also been observed in Rag2$^{-/-}$Il2rg$^{-/-}$ mice that lack both adaptive and innate lymphocytes (Marsh et al., "The Adaptive Immune System Restrains Alzheimer's Disease Pathogenesis by Modulating Microglial Function," *Proc. Natl. Acad. Sci. USA* 113:E1316-1325 (2016)). The mechanisms of immune-mediated cognitive protection are yet not fully understood. Th2 T cells-derived cytokines IL-4 and IL-13 have been shown to preserve spatial learning and memory through reducing inflammation and promoting neurogenesis (Brombacher et al., "IL-13-Mediated Regulation of Learning and Memory," *J. Immunol.* 198:2681-2688 (2017) and Derecki et al., "Regulation of Learning and Memory by Meningeal Immunity: A Key Role for IL-4," *J. Exp. Med.* 207:1067-1080 (2010)). Regulatory T cells (Treg) may also alleviate cognitive decline in mouse models of Alzheimer's Disease, possibly by constraining neuroinflammation (Baruch et al., "Breaking Immune Tolerance by Targeting Foxp3(+) Regulatory T Cells Mitigates Alzheimer's Disease Pathology," *Nat. Commun.* 6:7967 (2015); Dansokho et al., "Regulatory T Cells Delay Disease Progression in Alzheimer-Like Pathology," *Brain* 139:1237-1251 (2016); and Ito et al., "Brain Regulatory T Cells Suppress Astrogliosis and Potentiate Neurological Recovery," *Nature* 565:246-250 (2019)). The theory of immune surveillance is centered on the importance of circulating adaptive immune cells, with the meninges being the major interaction site between the peripheral immune system and the brain. However, the properties of potential non-circulating tissue-resident lymphocytes in the brain remain poorly understood. The function and regulation of lymphocytes residing in more specialized structures with closer proximity to the brain parenchyma, such as the choroid plexus, are also largely unexplored.

Aging is a complex process leading to progressive loss of physiological functions in multiple organs and systems (Lopez-Otin et al., "The Hallmarks of Aging," *Cell* 153: 1194-1217 (2013)). The brain is particularly susceptible to the effects of aging. Mammalian cognitive function, especially learning and memory, gradually declines with aging (Glisky, E. L. "Changes in Cognitive Function in Human Aging," *In Brain Aging: Models, Methods, and Mechanisms* D. R. Riddle, editor Boca Raton (Fla.) (2007) and Harada et al., "Normal Cognitive Aging," *Clin. Geriatr. Med.* 29:737-752 (2013)). Whether and how immune cells may affect this process remains unknown. Aging is known to induce gradual deterioration of the adaptive immune system and to increase susceptibility to infectious diseases, termed immunosenescence (Goronzy et al., "Successful and Maladaptive T Cell Aging," *Immunity* 46:364-378 (2017)). However, the effects of aging on the immune system are much more complicated than a pan-decrease in immune cell development and function. Interestingly, many tissue-resident innate immune cells, such as microglia, display hyperactivation phenotypes with aging (Dilger et al., "Aging, Microglial Cell Priming, and the Discordant Central Inflammatory Response to Signals From the Peripheral Immune System," *J. Leukoc. Biol.* 84:932-939 (2008) and Spittau, B. "Aging Microglia-Phenotypes, Functions and Implications for Age-Related Neurodegenerative Diseases," *Front Aging Neurosci.* 9:194 (2017)). In addition, subsets of memory or memory-like T and B cells with innate-like properties have been observed to accumulate with aging (Fukushima et al., "The Impact of Senescence-Associated T Cells on Immunosenescence and Age-Related Disorders," *Inflamm. Regen.* 38:24 (2018); Goronzy et al., "Successful and Maladaptive T Cell Aging," *Immunity* 46:364-378 (2017); Hao et al., "A B-cell Subset Uniquely Responsive to Innate Stimuli Accumulates in Aged Mice," *Blood* 118:1294-1304 (2011); Ratliff et al., "In Senescence, Age-associated B Cells Secrete TNFalpha and Inhibit Survival of B-Cell Precursors," *Aging Cell* 12:303-311 (2013); Rubtsov et al., "Toll-like Receptor 7 (TLR7)-driven Accumulation of a Novel CD11c(+) B-cell Population is Important for the Development of Autoimmunity," *Blood* 118:1305-1315 (2011); and Rubtsova et al., "Age-Associated B Cells: A T-bet-Dependent Effector with Roles in Protective and Pathogenic Immunity," *J. Immunol.* 195:1933-1937 (2015)). The increased numbers and activity of certain innate or innate-like immune cell subsets with aging might be considered as host responses to compensate for the drastic decline in adaptive immune cell development and function. Such responses are generally considered detrimental, leading to increased basal levels of inflammation and susceptibility to inflammatory diseases with aging, termed inflammaging (Franceschi et al., "Inflammaging: A New Immune-Metabolic Viewpoint For Age-Related Diseases," *Nat. Rev. Endocrinol.* 14:576-590 (2018)). However, it remains unknown whether aging may also possibly select unique populations of immune cells with enhanced cellular fitness and preserved beneficial capability that can instead be harnessed to combat aging.

Innate lymphoid cells (ILC) are specialized innate effectors that lack clonally distributed antigen receptors, but transcriptionally resemble T cells (Yang, Q., and A. Bhandoola "The Development of Adult Innate Lymphoid Cells," *Curr. Opin. Immunol.* 39:114-120 (2016)). Group 2 innate lymphoid cells (ILC2) respond to the alarm protein IL-33 and are potent producers of IL-5 and IL-13 (Yang, Q., and A. Bhandoola "The Development of Adult Innate Lymphoid Cells," *Curr. Opin. Immunol.* 39:114-120 (2016)). ILC2 are non-circulating, tissue-resident cells residing at non-lymphoid tissues such as mucosal barrier sites, the uterus, and adipose tissues (Yang, Q., and A. Bhandoola "The Development of Adult Innate Lymphoid Cells," *Curr. Opin. Immunol.* 39:114-120 (2016)). Local proliferation, but not recruitment from the periphery, is a signature of ILC2 activation (Gasteiger et al., "Tissue Residency of Innate Lymphoid Cells in Lymphoid and Nonlymphoid Organs," *Science* 350:981-985 (2015)). Tissue-resident ILC2 are implicated in tissue repair, tissue remodeling and metabolic homeostasis (Vivier et al., "Innate Lymphoid Cells: 10 Years On," *Cell* 174:1054-1066 (2018)). ILC2 have been recently discovered in the dura sinus of the meninges of young mice (Gadani et al., "Characterization of Meningeal Type 2 Innate Lymphocytes and Their Response to CNS Injury," *J. Exp. Med.* 214:285-296 (2017)). Meningeal-resident ILC2 are activated during spinal cord injury (SCI) and are involved in healing after SCI (Gadani et al., "Characterization of Meningeal Type 2 Innate Lymphocytes and Their Response to CNS Injury," *J. Exp. Med.* 214:285-296 (2017)). However, whether ILC2 also reside in other specialized brain barrier structures, such as the choroid plexus, their potential role in cognitive function, and their responses to aging, remain to be investigated.

Alzheimer's Disease (AD) is a devastating disease that affects more than 50 million people worldwide. Alzheimer's Disease is characterized by increased beta-amyloid (Aβ) and tau pathologies and declined cognitive function (Bondi et al., "Alzheimer's Disease: Past, Present, and Future," *J. Int. Neuropsychol. Soc.* 23:818-31 (2017) and Wang et al., "A Systemic View of Alzheimer Disease—Insights From Amyloid-Beta Metabolism Beyond the Brain," *Nat. Rev. Neurol.* 13:703 (2017)). The immune system has been implicated as a key factor in Alzheimer's Disease. Neuroinflammation mediated by dysregulated microglia is a hallmark of AD, and is believed to directly contribute to AD pathologies and cognitive decline (Smith et al., "Role of Pro-inflammatory Cytokines Released From Microglia in Neurodegenerative Diseases," *Brain Res. Bull.* 87:10-20 (2012); Calsolaro V. and Edison P., "Neuroinflammation in Alzheimer's Disease: Current Evidence and Future Directions," *Alzheimers Dement.* 12:719-32 (2016); Regen et al., "Neuroinflammation and Alzheimer's Disease: Implications for Microglial Activation," *Curr. Alzheimer Res.* 14:1140-8 (2017); Hansen et al., "Microglia in Alzheimer's Disease," *J. Cell. Biol.* 217:459-72 (2018); Navarro et al., "Microglia in Alzheimer's Disease: Activated, Dysfunctional or Degenerative," *Front Aging Neurosci.* 10:140 (2018); Plescher et al., "Plaque-dependent Morphological and Electrophysiological Heterogeneity of Microglia in an Alzheimer's Disease Mouse Model," *Glia* 66:1464-80 (2018); Song W M and Colonna M., "The Identity and Function of Microglia in Neurodegeneration," *Nat. Immunol.* 19:1048-58 (2018); Bradburn et al., "Neuroinflammation in Mild Cognitive Impairment and Alzheimer's Disease: A Meta-Analysis," *Ageing Res. Rev.* 50:1-8 (2019); Chaney et al., "In Vivo Molecular Imaging of Neuroinflammation in Alzheimer's Disease," *J. Neurochem.* 149:438-51 (2019); and McQuade A. and Blurton-Jones M., "Microglia in Alzheimer's Disease: Exploring How Genetics and Phenotype Influence Risk," *J. Mol. Biol.* 431:1805-17 (2019)). Recent studies also indicate potential roles for non-glia immune cells in regulating AD development and progression. $CD8^+$ effector memory T cells with enhanced T cell receptor (TCR) signaling accumulated in the brains of Alzheimer's Disease patients, and their numbers were negatively associated with cognitive function (Gate et al., "Clonally Expanded CD8 T Cells Patrol the Cerebrospinal Fluid in Alzheimer's Disease," *Nature* 577:399-404 (2020)). Nevertheless, genetic deletion of both adaptive and innate lymphocytes led to exacerbated amyloid pathology in a mouse model of Alzheimer's Disease, indicating that some other lymphocyte subsets might instead play a protective role in AD (Marsh et al., "The Adaptive Immune System Restrains Alzheimer's Disease Pathogenesis by Modulating Microglial Function," *Proc. Natl. Acad. Sci. USA* 113:E1316-25 (2016)). Indeed, enhancing the activity of regulatory T cells (Tregs) improved cognitive function of the mouse model of Alzheimer's Disease (Dansokho et al., "Regulatory T cells Delay Disease Progression in Alzheimer-like Pathology," *Brain* 139:1237-51 (2016)). However, function and regulation of other lymphocytes subsets in Alzheimer's Disease remain poorly understood.

Innate lymphoid cells (ILC) are specialized innate effector cells that lack surface antigen receptors but are functionally analogous to effector T cell subsets (Yang Q. and Bhandoola A., "The Development of Adult Innate Lymphoid Cells," *Curr. Opin. Immunol.* 39:114-20 (2016) and Das et al., "Lineage Specification in Innate Lymphocytes," *Cytokine Growth Factor Rev.* 42:20-6 (2018)). Group-2 innate lymphoid cells (ILC2) express high amounts of GATA3 and produce large amounts of type-2 cytokines IL-5 and IL-13 (Yang Q. and Bhandoola A., "The Development of Adult Innate Lymphoid Cells," *Curr. Opin. Immunol.* 39:114-20 (2016) and Das et al., "Lineage Specification in Innate Lymphocytes," *Cytokine Growth Factor Rev.* 42:20-6 (2018)). ILC2 are enriched in barrier tissues such as lung, gut, skin and meninges (Yang Q. and Bhandoola A., "The Development of Adult Innate Lymphoid Cells," *Curr. Opin. Immunol.* 39:114-20 (2016) and Gadani et al., "Characterization of Meningeal Type 2 innate Lymphocytes and Their Response to CNS Injury," *J. Exp. Med* 214:285-96 (2017)). They are critically involved in tissue repair and regeneration (Yang Q. and Bhandoola A., "The Development of Adult Innate Lymphoid Cells," *Curr. Opin. Immunol.* 39:114-20 (2016) and Gadani et al., "Characterization of Meningeal Type 2 innate Lymphocytes and Their Response to CNS Injury," *J. Exp. Med* 214:285-96 (2017)). Recent work indicates a striking role for ILC2 in regulating brain function (Hin et al., "Activation of Group 2 Innate Lymphoid Cells Alleviates Aging-Associated Cognitive Decline," *J. Exp. Med* 217 (4):e20190915 (2020)). It was found that ILC2 accumulated in the brains with aging, and that their activation alleviated aging-associated cognitive decline (Hin et al., "Activation of Group 2 Innate Lymphoid Cells Alleviates Aging-Associated Cognitive Decline," *J. Exp. Med* 217 (4):e20190915 (2020)). Regulation and function of ILC2 in Alzheimer's Disease, however, remain to be investigated.

The present disclosure is directed to overcoming these and other deficiencies in the art.

SUMMARY

A first aspect relates to a method of improving cognitive function in a subject. The method includes implanting group-2 innate lymphoid cells (ILC2) in a cranium of a subject, where the ILC2 was treated with an ILC2 activator.

In one example, the ILC2 activator is selected from the group consisting of interleukin 33 (IL-33), interleukin 25 (IL-25), interleukin 7 (IL-7), thymic stromal lymphopoietin (TSLP), TL1A, prostaglandin D2 (PGD2), and cysteinyl leukotriene 4 (LTE4), anti-IL1RL1, probiotic bacteria, succinate, depletion of natural killer (NK) cells, and depletion of mucosal associated invariant T cells. In another example, the ILC2 activator is interleukin 33 (IL-33). In yet another example, the ILC2 activator is interleukin 25 (IL-25).

In one example, the implanting is in a choroid plexus of said subject. In another example, the implanting is by intracerebroventricular transfer. In another example, the subject has a cognitive impairment. In another example, the cognitive impairment is selected from the group consisting of Alzheimer's Disease, frontotemporal dementia, senile dementias, dementia with lewy bodies, and mild cognitive impairment. In another example, the cognitive impairment is Alzheimer's Disease. In yet another example, the cognitive impairment is Alzheimer's Disease and the ILC2 activator is interleukin 33 (IL-33) interleukin 25 (IL-25), interleukin 7 (IL-7), or thymic stromal lymphopoietin (TSLP). In yet another example, the cognitive impairment is Alzheimer's Disease and the ILC2 activator is interleukin 33 (IL-33). In yet another example, the cognitive impairment is Alzheimer's Disease and the ILC2 activator is interleukin 25 (IL-25). In another example, one or more soluble beta-amyloid plaques in said subject are reduced. In another example, the subject is an elderly subject.

A second aspect relates to a method including selecting a subject having aging-associated cognitive decline and administering to the subject an activator of innate lymphoid cell activity under conditions effective to promote innate lymphoid cell activity.

In one example, the activator is a group-2 innate lymphoid cell (ILC2) activator, a group-1 innate lymphoid cell (ILC1) activator, or a group-3 innate lymphoid cell (ILC3) activator. In another example, the activator is selected from the group consisting of interleukin 33 (IL-33), interleukin 25 (IL-25), interleukin 7 (IL-7), thymic stromal lymphopoietin (TSLP), TL1A, prostaglandin D2 (PGD2), and cysteinyl leukotriene 4 (LTE4), anti-IL1RL1, probiotic bacteria, succinate, depletion of natural killer (NK) cells, and depletion of mucosal associated invariant T cells.

In another example, the activator is an activating cytokine. In yet another example, the activating cytokine is selected from the group consisting of interleukin 33 (IL-33), interleukin 25 (IL-25), interleukin 7 (IL-7), and thymic stromal lymphopoietin (TSLP). In another example, the activating cytokine is interleukin 33 (IL-33). In another example, the activating cytokine is interleukin 25 (IL-25).

In another example, the one or more innate lymphoid cell is selected from the group consisting of a group-2 innate lymphoid cell (ILC2), a group-1 innate lymphoid cell (ILC1), and a group-3 innate lymphoid cell (ILC3).

In another example, the administering is in a choroid plexus of said subject. In another example, the cytokine is administered in an amount between about 1 mg and 10 mg. In another example, the method further comprises repeating said administering. In another example, the method further comprises administering an additional agent.

In another example, the T-cell inflammation in said subject is reduced. In another example, the cognitive memory in said subject is improved. In another example, innate lymphoid cell activity in said subject is increased. In another example, the subject has a cognitive impairment. In another example, the cognitive impairment is selected from the group consisting of frontotemporal dementia, senile dementias, and mild cognitive impairment. In another example, the cognitive impairment is not Alzheimer's Disease. In another example, the cognitive impairment is not Alzheimer's Disease and the activator is an activating cytokine and is selected from the group consisting of interleukin 33 (IL-33), interleukin 25 (IL-25), interleukin 7 (IL-7), and thymic stromal lymphopoietin (TSLP). In yet another example, the cognitive impairment is not Alzheimer's Disease and the activating cytokine is interleukin 33 (IL-33). In another example, the cognitive impairment is not Alzheimer's Disease and the activating cytokine interleukin 25 (IL-25).

In another example, the administering is carried out intraperitoneally, orally, parenterally, nasally, subcutaneously, intravenously, intramuscularly, intracerebroventricularly, intraparenchymally, by intranasal inhalation, by implantation, by intracavitary or intravesical instillation, intraocularly, intraarterially, intralesionally, transdermally, or by application to mucous membranes. In another example, the subject is an elderly subject. In another example, the cognitive function is improved in said subject.

A third aspect relates to a method of improving cognition in a subject. The method includes selecting a subject having aging-associated cognitive decline and administering to the subject a cytokine selected from the group consisting of IL-33, IL-5, IL-7, IL-25, and thymic stromal lymphopoietin.

In one example, the cytokine is IL-33. In another example, the cytokine is IL-5. In another example, the administering is in a choroid plexus of said subject. In another example, the cytokine is administered in an amount between about 1 mg and 10 mg. In another example, the aspect further includes repeating said administering. In another example, the aspect further includes administering an additional agent. In another example, the T-cell inflammation in said subject is reduced. In another example, the cognitive memory in said subject is improved.

In another example, the innate lymphoid cell activity in said subject is increased. In another example, the subject has a cognitive impairment. In another example, the cognitive impairment is selected from the group consisting of frontotemporal dementia, senile dementias, and mild cognitive impairment. In one example, the cognitive impairment is not Alzheimer's Disease.

In one example, the administering is carried out intraperitoneally, orally, parenterally, nasally, subcutaneously, intravenously, intramuscularly, intracerebroventricularly, intraparenchymally, by intranasal inhalation, by implantation, by intracavitary or intravesical instillation, intraocularly, intraarterially, intralesionally, transdermally, or by application to mucous membranes. In another example the subject is an elderly subject, a juvenile subject, or an immunocompromised subject.

Increasing evidence has challenged the traditional view about the immune privilege of the brain, but the precise roles of immune cells in regulating brain physiology and function remain poorly understood. Here it is reported that tissue-resident group 2 innate lymphoid cells (ILC2) accumulate in the choroid plexus of aged brains. ILC2 in the aged brain are long-lived, relatively resistant to cellular senescence and exhaustion, and are capable of switching between cell cycle dormancy and proliferation. They are functionally quiescent at homeostasis but can be activated by IL-33 to produce large amounts of type-2 cytokines and other effector molecules in vitro and in vivo. Intracerebroventricular transfer of activated ILC2 revitalized the aged brain and enhanced the cognitive function of aged mice. Administration of IL-5, a major ILC2 product, was sufficient to repress aging-associated neuroinflammation and alleviate aging-associated cognitive decline. Targeting ILC2 in the aged brain may provide new avenues to combat aging-associated neurodegenerative disorders.

It is here reported that the accumulation of tissue-resident ILC2 in the choroid plexus of the aged brain, with ILC2 comprising a major subset of lymphocytes in the choroid plexus of aged mice and humans. ILC2 in the aged brain are long-lived and capable of reversibly switching between cell cycle dormancy and proliferation. They are relatively resistant to cellular senescence and exhaustion under replication stress, leading to enhanced self-renewal capability. They are functionally quiescent at homeostasis but can be activated by exogenous IL-33 to produce large amounts of IL-5 and IL-13 as well as a variety of other effector molecules, in vitro and in vivo. When activated in vitro and transferred intracerebroventricularly, they revitalized the aged brains and enhanced cognitive function of aged mice. Administration of IL-5, a major ILC2 product, repressed aging-associated neuroinflammation and alleviated aging-associated cognitive decline. Together, these results suggest that aging may expand a unique population of brain-resident ILC2 with enhanced cellular fitness and potent neuroprotective capability. Targeting ILC2 in the aged brain may unlock therapies to combat aging-related neurodegenerative disorders.

The immune pathways in Alzheimer's Disease (AD) remain poorly understood. A recent study indicates that tissue-resident group-2 Innate lymphoid cells (ILC2) accumulate in the aged brain, and that their activation alleviates aging-associated cognitive decline. Regulation and function of ILC2 in Alzheimer's Disease, however, remain unknown. Here it is reported that aging-associated accumulation of brain ILC2 was lost in the triple transgenic AD mouse model (3×Tg-AD). Both ILC2 numbers and their capability to produce type-2 cytokines IL-5 and IL-13 were severely compromised in the brains of middle-aged and aged 3×Tg-AD mice. 3×Tg-AD mice exhibited increased concentrations of the pro-inflammatory cytokine IL-17F that repressed ILC2 function. Aerobic exercise decreased IL-17F levels and enhanced production of IL-5 and IL-13 by ILC2. Administration of IL-5, a cytokine produced by ILC2, reduced soluble Aβ burden in 3×Tg-AD mice. The results disclosed herein demonstrate a striking numerical and functional deficiency of brain ILC2 in the mouse model of AD that can be partially restored by aerobic exercise. Enhancing ILC2 activity by altering lifestyle might alleviate the disease progression of AD.

It is here disclosed that aging-associated accumulation of brain ILC2 was lost in the triple transgenic Alzheimer's Disease mouse model (3×Tg-AD). ILC2 were severely compromised in numbers and in cytokine-producing activities in middle-aged and aged 3×Tg-AD mice. 3×Tg-AD mice had increased concentrations of proinflammatory cytokines such as IL-17F that repressed the production of both IL-5 and IL-13 by brain ILC2. Interestingly, aerobic exercise decreased IL-17F concentration and enhanced ILC2 activity in the brain. Finally, administration of IL-5, a type-2 cytokine produced by ILC2, reduced soluble Aβ burden in 3×Tg-AD mice. Together, these data reveal a severe numerical and functional deficiency of ILC2 in the mouse model of AD that can be partially restored by aerobic exercise. Enhancing ILC2 activity by altering lifestyle might help alleviate AD development or progression.

BRIEF DESCRIPTION OF THE DRAWINGS

FIG. 1A shows representative flow cytometry profiles of hematopoietic cells in the brains of young (2-3 months) and aged (18-22 months) mice. FIG. 1B shows quantification of ILC2 numbers in the brains of young and aged mice. Data are from 7 mice per group, pooled from two independent experiments. FIG. 1C depicts representative flow cytometry profiles of ILC2 and T cells from the brains of young and aged mice. FIG. 1D shows representative flow cytometry profiles of brain ILC2 and T cells from young and aged mice injected intravenously with anti-CD45.2 PE antibody and euthanized 3 minutes after injection. FIG. 1E shows percentages of circulating cells labeled with intravenously injected anti-CD45.2 PE antibody. Data are from 3 mice per group, and representative of two independent experiments. FIG. 1F shows the number of various ILC subsets in the brain of young and aged mice. Data are from 4 mice per group, and representative of two independent experiments. *, $p<0.05$. **, $p<0.01$.

FIGS. 2A-2J illustrate that ILC2 accumulate in the choroid plexus of the aged brain. FIG. 2A shows quantification of ILC2 numbers in different regions of young and aged mice. Data are from 5 mice per group, pooled from two independent experiments. CTX, cortex; PFC, prefrontal cortex; STR, striatum; TH, thalamus; HP, hippocampus; CP, choroid plexus; SVZ, subventricular zone. CP lining the lateral ventricle, leptomeninges attached to the brain parenchyma of dorsal cerebrum, and dura/arachnoid meninges attached to the skull, were isolated. FIG. 2B depicts representative flow cytometry profiles of ILC2 in the choroid plexus (CP) of aged mice. FIG. 2C shows the number of various ILC subsets in the CP of aged mice. Data are 4 mice per group, and representative of two independent experiments. FIG. 2D show representative flow cytometry profiles of ILC2 in the choroid plexus (CP) of young and aged mice. FIG. 2E depicts quantification of ILC2 numbers in the choroid plexus of young and aged mice. Data are from 6 mice per group, pooled from two independent experiments. FIG. 2F shows representative wholemount CP immunofluorescence staining profiles of ILC2 and T cells from young and aged mice. White arrow denotes ILC2; blue arrow denotes $CD3^+$ T cells. Data represent 6 mice per group from two independent experiments. FIG. 2G depict quantification of ILC2 numbers in the CP of mice at different ages. Data are from 3-4 mice per group, representative of two independent experiments. FIG. 2H shows representative flow cytometry profiles of ILC2 in the choroid plexus of deceased elderly people over 65 years old. Data represents 4 autopsy samples. FIG. 2I shows representative flow cytometry profiles depicting the expression of CRTH2 and cKit in human CP ILC2 from deceased elderly people. Data represent 4 autopsy samples. FIG. 2J shows mRNA levels of the indicated genes in sorted ILC2, $CD3^+$ T cells, and $CD11b^+$ myeloid cells in the CP tissue of deceased elderly people. Data are from 4 autopsy samples. **, $p<0.01$. Lin1 antibodies included anti-B220, anti-NK1.1 and anti-CD11b. Mouse total Lin antibodies included anti-B220, anti-NK1.1, anti-CD11b, anti-CD3, and anti-CD5. Human Lin1 antibodies included anti-CD56, anti-CD19, anti-CD11c, anti-CD11b, anti-CD14, and anti-FcγR1α.

FIG. 3A shows mRNA expression of Mki67 (encoding Ki67) in ILC2 sorted from the brains of young aged mice. Data are from 4 mice per group, and representative of two independent experiments. FIG. 3F shows when EdU was administrated simultaneously with IL-33 treatment. EdU concentrations in ILC2 were measured at Day 0 (naïve mice), Day 8 (24 hrs after the last EdU/IL-33 administration) and Day 36 (4 weeks after the last EdU/IL-33 administration). Percentages of EdU$^+$ brain ILC2 at Day 0, Day 8 and Day 36. Data are from 3-7 mice per group, and representative of two independent experiments. FIG. 3G shows Mean fluorescence intensity (MFI) of Ki67 in brain ILC2 at Day 0, Day 8 and Day 36. Data are from 3-7 mice per group, and representative of two independent experiments. FIG. 3H shows the percentage of ILC2 that expressed activated caspases at Day 29. Data are from 6 mice per group, pooled from two independent experiments. FIG. 3I shows aged mice that were treated with IL-33 for 7 days together with EdU. The mice were then rested for 4 weeks and administrated with IL-33 or PBS again for 2 days. EdU concentrations were measured at 7 days after secondary injections with IL-33 or PBS. Ki67 expression was measured at 24 hrs after secondary injections with IL-33 or PBS. FIG. 3J shows percentages of Edu$^+$ ILC2 at 7 days after secondary injection of IL-33 or PBS. Data are from 3 mice per group, and representative of two independent experiments. FIG. 3K shows MFI of Ki67 in aged brain ILC2 at 24 hrs after secondary injections with IL-33 or PBS. Data are from three mice per group, and representative of two independent experiments. FIG. 3L shows ILC2 from the brains of young and aged mice were sorted and cultured with IL-7, IL-2, IL-33 and SCF for up to 4 weeks. Fold change of cell numbers over time was shown. Data are from 3 mice per group, representative of three independent experiments. FIG. 3M shows cytokine concentrations in the culture supernatant of ILC2 isolated from aged brains and cultured in vitro for 4 weeks. Data are from 3 mice per group, representative of two independent experiments. FIG. 3N depicts a heatmap showing the expression of representative genes by RNA-Seq comparing ILC2 isolated from the brains of young versus aged mice and cultured for 2 weeks in vitro. FIG. 3O is a qPCR showing the expression of the indicated genes in ILC2 isolated from the brains of young and aged mice and cultured for 2 or 4 weeks in vitro. Data are from 3 mice per group, representative of two independent experiments. *, $p<0.05$; **, $p<0.01$; n.s., not significant.

FIGS. 4A-4H show that ILC2 in the aged brain are functionally dormant at homeostasis but can be activated by IL-33 to produce large amounts of type-2 cytokines in vivo. FIG. 4A shows representative flow cytometry profiles showing the expression of IL-5 and IL-13 by brain ILC2 in young versus aged mice at homeostasis. FIG. 4B shows MFI of IL-5 and IL-13 by total brain ILC2 or cytokine-expressing ILC2 in young versus aged mice at homeostasis. Data are from 3 mice per group, representative of three independent experiments. FIG. 4C shows representative flow cytometry profiles of the expression of IL-5 and IL-13 by brain ILC2 in young or aged mice treated with IL-33 or PBS daily for 7 days. FIG. 4D depicts MFI of IL-5 and IL-13 expressed by brain ILC2 in young or aged mice treated with IL-33 or PBS daily for 7 days. Data are from 3-6 mice per group, representative of two independent experiments. FIG. 4E shows an experimental scheme for Object Placement Test. FIG. 4F shows the percentage of time spent with familiar or displaced objects for young and aged mice. Data are from 9-10 mice per group, and representative of two independent experiments. FIG. 4G illustrates the distance travelled by aged mice treated with IL-33 or PBS in Open Field test. Data are from 9-14 mice per group, and representative of two independent experiments. FIG. 4H shows percentages of time spent with familiar or displaced objects for aged mice treated with IL-33 or PBS daily for 2 days. Data are from 9-14 mice per group are representative of two independent experiments. *, $p<0.05$; **, $p<0.01$; n.s., not significant.

FIGS. 5A-5L show that activated ILC2 improves the cognitive function in aged mice. FIG. 5A shows that ILC2 were isolated from brains of aged mice, and cultured in vitro with IL-33, IL-2, IL-7 and SCF for 4 weeks. Object Placement Test was performed with aged mice that received i.c.v. injection of $2\times10^5$ in vitro expanded and activated brain ILC2 or PBS. Mice were rested for 1-week post-surgery before behavior testing. Distance travelled in Open Field Test was quantified. Data are from 8-11 mice per group, pooled from two independent experiments. FIG. 5B shows percentages of time spent with familiar or displaced objects in Objective Placement Test. Data are from 8-11 mice per group, pooled from two independent experiments. FIG. 5C shows Morris Water Maze performed with mice that were i.c.v. injected with in vitro expanded and activated brain ILC2 or PBS. Percentages of time spent in the target quadrant and the number of entries to the target zone were quantified. Data are from 9-11 mice per group, pooled from two independent experiments. FIG. 5D shows RNA-Seq that was performed with sorted microglia, ILC2 or T cells from the brains of aged mice treated with IL-33 daily for 7 days. Principle component analysis was performed. FIG. 5E shows MA plots comparing the gene expression profiles. FIG. 5F shows venn diagrams depicting the numbers of differentially expressed genes. FIG. 5G shows pathway analysis of differentially expressed genes. FIG. 5H shows pathway analysis of genes that are highly expressed in brain ILC2, but not in microglia or brain T cells of IL-33 treated aged mice. FIG. 5I provides a list of effector molecules, receptors, and transcription factors that are highly expressed in brain ILC2 of IL-33 treated aged mice. FIG. 5J shows a heatmap that depicts the expression of effector molecules expressed by different immune cell subsets in the brains of IL-33 treated aged mice. FIG. 5K shows representative flow cytometry profiles of IL-5 and IL-13 expression by brain T cells or ILC2 in PBS or IL-33 treated aged mice. FIG. 5L shows quantification of the number of IL-5 or IL-13-producing brain T cells and ILC2 in IL-33 treated aged mice. Data are from 3 mice per group, representative of two independent experiments. *, $p<0.05$; **, $p<0.01$; n.s., not significant.

FIGS. 6A-6L show that CP ILC2 possess more potent proliferative and cytokine-producing capability than meningeal ILC2 in aged mice. FIG. 6A shows numbers of ILC2 at different regions of aged mice after daily IL-33 treatment for 7 days. Data are from four mice per group, representative of two independent experiments. FIG. 6B shows ILC2 from the meninges of young mice, the meninges of aged mice and CP from aged mice were sorted and cultured with IL-7, IL-2, IL-33 and SCF for up to 4 weeks. Fold change of cell numbers over time was shown. Data are from 4 mice per group, and representative of two independent experiments. FIG. 6C shows numbers of meningeal and CP ILC2 in aged mice treated with PBS or IL-33 daily for 7 days. Data are from 4 mice per group, and representative of two independent experiments. FIG. 6D shows fold change of ILC2 numbers in IL-33 treated mice over those in PBS treated mice. The average ILC2 number in PBS treated mice was set as 1. Data are from 4 mice per group, and representative of two independent experiments. FIG. 6E shows representative flow cytometry profiles of IL-5 and IL-13 expression in meningeal and CP ILC2 in IL-33 treated aged mice. FIG. 6F shows MFI of IL-5 and IL-13 in meningeal and CP ILC2 in IL-33 treated aged mice. Data are from 5 mice per group, and representative of two independent experiments. FIG. 6G shows scRNA-seq was performed with sorted meningeal and CP ILC2 from IL-33 treated aged mice. UMAP analysis of the combined ILC2 and meningeal ILC2 population. FIG. 6H shows expression of the indicated genes by different subsets of ILC2 in the combined meningeal and CP ILC2 population. FIG. 6I shows split analysis of meningeal and CP ILC2 by UMAP. FIG. 6J shows percentage of each ILC2 subset in meningeal and CP ILC2. FIG. 6K shows expression of the indicated genes by meningeal and CP ILC2. FIG. 6L shows expression of the indicated genes in each ILC2 subset in meningeal and CP ILC2. *, $p<0.05$; **, $p<0.01$. n.s., not significant.

FIGS. 7A-7S show that IL-5 improves the cognitive function in aged mice. FIG. 7A show an Object Placement Test that was performed with aged mice after injection of IL-5, IL-13 or PBS daily for 2 days. Percentages of time spent with the displaced objects were quantified. Data are from 9-10 mice per group, and representative of two independent experiments. FIG. 7B shows Morris Water Maze that was performed with aged mice after PBS, IL-5, or IL-13 treatment for 2 days. Percentages of time spent in the target quadrant were quantified. Data are from 9-10 mice per group, and representative of two independent experiments. FIG. 7C shows that IL-5 was deleted in activated ILC2/b6 cells using CRISPR-mediated gene knockout technique. Object Placement Test was performed with aged mice 1 week after i.c.v injection with control or IL-5 deficient ILC2/b6 cells. Percentages of time spent with displaced objects were quantified. Data are from 9-10 mice per group, pooled from two independent experiments. FIG. 7D shows that aged mice received i.c.v injection of 10 μg anti-IL-5 antibody or isotype control, followed by intraperitoneal injection of IL-33 or PBS daily for 2 days. Object Placement Test was performed after 1 weeks of i.c.v injection. Percentages of time spent with the displaced objects were quantified. Data are from 8-11 mice per group, pooled from two independent experiments. FIG. 7E shows that IL-5 or PBS treated aged mice were injected with EdU in vivo. EdU$^+$ cells in the hippocampus DG regions was examined and quantified by immunofluorescence at 2 days after the last dose of IL-5 or PBS treatment. Data are from 4 mice per group. FIG. 7F shows a heatmap that depicts the gene expression profiles of CD3$^+$ T cells from the brains of PBS or IL-5 treated aged mice by RNA-Seq. FIG. 7G shows numbers of CD4$^+$ and CD8$^+$ T cells in the brains of young or aged mice treated with PBS or IL-5. Data are from 4 mice per group, and representative of three independent experiments. FIG. 7H shows representative flow cytometry profiles of TNFα expression by CD4$^+$ or CD8$^+$ T cells in the brains of aged mice treated with PBS or IL-5. FIG. 7I shows MFI of TNFα in brain CD4$^+$ or CD8$^+$ T cells of aged mice treated with PBS or IL-5. Data are from 3-5 mice per group, and representative of three independent experiments. FIG. 7J shows representative flow cytometry profiles of CD8$^+$ cells in the brains of aged mice that were injected intravenously with anti-CD45.2 PE antibody and euthanized 3 mins later. FIG. 7K shows the number of non-circulating brain CD8$^+$ T cells that were not labelled with intravenously injected anti-CD45.2 antibody. Data are from 3 mice per group, and representative of two independent experiments. FIG. 7L shows the number of non-circulating CD8$^+$ T cells in the CP of young or aged mice treated with PBS or IL-5. Data are from 4 mice per group, and representative of two independent experiments. FIG. 7M shows the number of microglia in IL-5 or PBS treated aged mice. Data are from three mice per group, representative of two independent experiments. FIG. 7N shows representative flow cytometry profiles of CD68 expression by microglia in IL-5 or PBS treated aged mice. FIG. 7O shows MFI of CD68 on microglia of IL-5 or PBS treated aged mice. Data are from three mice per group, and representative of two independent experiments. FIG. 7P shows a heatmap that depicts the gene expression profiles of microglia from PBS or IL-5 treated aged mice by RNA-Seq. FIG. 7Q shows CD4$^+$ or CD8$^+$ T cells from the brains of aged mice were sort-purified, and cultured in the presence or absence of IL-5 for 24 hours. Tnf expression was examined by qPCR. Data are from 6 mice per group, and representative of two independent experiments. FIG. 7R shows expression of the indicated genes in CD8$^+$ T cells sorted from the aged brain and cultured in the presence or absence of IL-5 for 24 hours. Data are from 6 mice per group, and representative of two independent experiments. FIG. 7S shows annexin V staining that was performed at 3 days of culture. Data are from 4 mice per group, and representative of two independent experiments. *, $p<0.05$; **, $p<0.01$, n.s., not significant.

FIG. 8 shows the expression of many ILC2 characteristic genes is upregulated in the choroid plexus of aged mice. Heatmap depicts the expression of the indicated genes in the choroid plexus of young and aged mice by genome-wide micro-array analysis.

FIGS. 9A-9B demonstrate that local proliferation, but not recruitment from the periphery, is a signature of ILC2 activation. Young or aged mice were treated IL-33 daily for 7 days. At 24 hours after the last injection, mice were injected with anti-CD45.2 PE antibody i.v. and euthanized 3 minutes later. Flow cytometry was performed to examine circulating cells that were labeled with i.v. injected anti-CD45.2 PE antibody. FIG. 9A shows representative flow cytometry profiles. Plots were pre-gated on brain T cells or ILC2. FIG. 9B shows percentages of circulating cells. Data are from 3 mice per group, representative of two independent experiments.

In FIG. 11A, QPCR analysis of the indicated genes in ILC2 sorted from meninges or CP of aged mice at homeostasis. Data are from three mice per group, pooled from three independent experiments. FIG. 11B shows expression of the indicated genes in CP and meninge ILC2 of IL-33 treated aged mice by Single-cell RNA sequencing. * p<0.05; **p<0.01.

FIGS. 12A-12C show the results of behavior tests in young or aged mice treated with PBS, IL-5 or IL-13. FIG. 12A shows distance travelled in open field test for aged mice treated with PBS, IL-5 or IL-13. Data are from 9-10 mice per group, representative of two independent experiments. FIG. 12B shows that object placement test was performed with young mice treated with PBS, IL-5, or IL-13. Percentages of time with the displaced object were quantified. Data are from 8 mice per group, representative of two independent experiments. FIG. 12C shows Morris Maze test was performed with young mice treated with PBS, IL-5, or IL-13. Percentages of time spent in the target quadrant were quantified. Data are from 11-15 mice per group, pooled from two independent experiments.

FIG. 12A shows that brain ILC2 from aged mice were transduced with LentiCRISPRV2-GFP lentivirus containing a non-target control (NTC) sequence. GFP expression was examined at 5 days post transduction. Cells without lentiviral transduction, lung ILC2 sorted from young mice, and an immortalized ILC2 line ILC2/b6, were used as controls. Data represent 4 independent experiments. FIG. 12B shows ILC2/b6 line cells that were transduced with LentiCRISPRV2-GFP lentivirus containing a gRNA targeting IL-5 or non-target control (NTC). Expression of IL-5 was examined at 10 days post transduction. Data represent 3 independent experiments.

FIG. 15A shows mRNA of Tnf was examined at 24 hours of culture. FIG. 15B shows annexin V staining was performed with cells after 3 days of culture. Data are from 3 mice per group, representative of two independent experiments.

FIGS. 16A-16D illustrate that ILC2 are numerically and functionally deficient in 3×Tg-AD mice. FIG. 16A shows representative flow cytometric profiles of ILC2 in the brains of 3×Tg-AD mice and control wildtype mice (18 months old). Plots were pre-gated on brain $CD45^+CD11b^-NK1.1^-B220^-$ cells. FIG. 16B shows numbers of ILC2 in the brains of 3×Tg-AD mice and control wildtype mice at different ages. FIG. 16C shows representative flow cytometric profiles depicting IL-5 and IL-13 expression by brain ILC2 in 3×Tg-AD and control wildtype mice (7 months old). FIG. 15D shows mean fluorescence intensity (MFI) of IL-5 and IL-13 in brain ILC2 from 3×Tg-AD mice and control wildtype mice (7 months old). Data are from 3-4 mice per group, two independent experiments. Error bars=mean±SEM. *p<0.05; **p<0.01.

FIGS. 18A-18F show that a high level of IL17F, but not IL-12, inhibits the functional activity of brain ILC2. FIG. 18A shows wildtype mice (7 months old) were treated with IL-12p70 or PBS daily for 4 days. Numbers of brain ILC2 were examined by flow cytometric analysis. FIG. 18B shows Mean Fluorescence Intensity (MFI) of IL-5 and IL-13 in brain ILC2 from wildtype mice treated with IL-12p70 or PBS. FIG. 18C shows wildtype mice (7 months old) were treated with IL-17F or PBS daily for 4 days. Numbers of brain ILC2 were examined by flow cytometric analysis. FIG. 18D shows MFI of IL-5 and IL-13 in brain ILC2 from wildtype mice treated with IL-17F or PBS. FIG. 18E shows 3×Tg-AD mice (7 months old) were treated with IL-33 daily for 4 days. Numbers of brain ILC2 were examined by flow cytometric analysis. FIG. 18F shows MFI of IL-5 and IL-13 in ILC2 from 3×Tg-AD mice treated with IL-33 or PBS. Data are from 3-5 per group, 2-3 independent experiments. Error bars=mean±SEM. *p<0.05; **p<0.01.

FIGS. 19A-19F show that aerobic exercise enhances functional activity of brain ILC2 in 3×Tg-AD mice. FIG. 19A shows an experimental scheme of treadmill exercise. FIG. 19B shows IL-12, IL-17F, and IL-33 concentrations in the serum of 3×Tg-AD mice (7 months old), with or without treadmill exercise. FIG. 19C shows numbers of brain ILC2 in 3×Tg-AD mice with and without treadmill exercise. FIG. 19D shows representative flow cytometric profiles depicting IL-5 and IL-13 expression by brain ILC2 in 3×Tg-AD mice with and without treadmill exercise. FIG. 19E shows Mean fluorescence intensity (MFI) of IL-5 and IL-13 expression by brain ILC2 in 3×Tg-AD mice with and without treadmill exercise. FIG. 19F shows 3×Tg-AD mice were injected with recombinant IL-5 or PBS control daily for 2 days. Levels of soluble and insoluble Amyloid-β x-42 proteins in the brains were examined. Data are from 4 mice per group, 2-3 independent experiments. Error bars=mean±SEM. *p<0.05; **p<0.01.

DETAILED DESCRIPTION

Figure 1A:
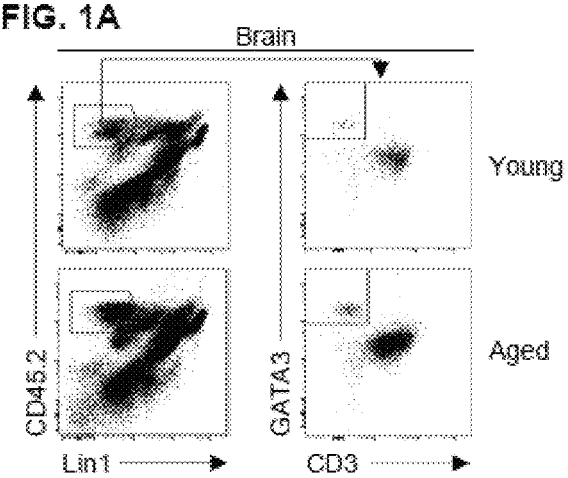
FIGS. 1A-1F depicts ILC2 accumulation in the aged brain.

A first aspect relates to a method of improving cognitive function in a subject. The method includes implanting group-2 innate lymphoid cells (ILC2) in a cranium of a subject, where the ILC2 was treated with an ILC2 activator.

It is to be appreciated that certain aspects, modes, embodiments, variations and features of the present invention are described below in various levels of detail in order to provide a substantial understanding of the present technology. The definitions of certain terms as used in this specification are provided below. Unless defined otherwise, all technical and scientific terms used herein generally have the same meaning as commonly understood by one of ordinary skill in the art to which this invention belongs.

As used herein, the term "about" means that the numerical value is approximate and small variations would not significantly affect the practice of the disclosed embodiments. Where a numerical limitation is used, unless indicated otherwise by the context, "about" means the numerical value can vary by ±10% and remain within the scope of the disclosed embodiments.

As used herein, the terms "subject," "individual" or "patient," used interchangeably, means any animal, including mammals, such as mice, rats, other rodents, rabbits, dogs, cats, swine, cattle, sheep, horses, or primates, such as humans.

As used herein, the term "purified" means that when isolated, the isolate contains at least 90%, at least 95%, at least 98%, or at least 99% of a compound described herein by weight of the isolate.

As used herein, the phrase "substantially isolated" means a compound that is at least partially or substantially separated from the environment in which it is formed or detected.

It is further appreciated that certain features described herein, which are, for clarity, described in the context of separate embodiments, can also be provided in combination in a single embodiment. Conversely, various features which are, for brevity, described in the context of a single embodiment, can also be provided separately or in any suitable sub-combination.

In accordance with this and all aspects of the present invention, a subject suitable for treatment using the methods of the present invention includes any animal, preferably a mammal, e.g., human, non-human primate, rodent, cow, horse, sheep, pig, goat, deer, elk, bison, etc. Preferably, the subject is a human.

Cognitive impairment as described herein includes any impairment to thought processes, including, for example, loss of higher reasoning, forgetfulness, learning disabilities, concentration difficulties, decreased intelligence, and any other reduction in mental function. Cognitive impairment may be present at birth or can occur at any point in a person's lifespan. Accordingly, suitable subjects for treatment in accordance with the methods of the present invention include infants, children, adolescents, young adults, adults, and elderly. In one embodiment, the subject is of advanced age or is elderly.

Causes of cognitive impairment in infants and small children include chromosome abnormalities and genetic syndromes, malnutrition, prenatal drug exposure, poisoning due to lead or other heavy metals, hypoglycemia (low blood sugar), neonatal jaundice (high bilirubin levels developing after birth), hypothyroidism (underactive thyroid), complications of prematurity, trauma or child abuse such as shaken baby syndrome, or oxygen deprivation in the womb or during or after birth.

Cognitive impairment that develops in childhood or adolescence can result from many conditions. Examples include side effects of cancer therapy, malnutrition, heavy metal poisoning, autism (abnormal development of communication and social skills), metabolic conditions, and systemic lupus erythematosus (disorder in which the body attacks its own healthy cells and tissues.

Cognitive impairment also occurs in young adults, adults, and elderly adults. This impairment may be an age-related phenomenon (i.e., not associated with any disease state or with any neurodegeneration), for example, age-related memory loss. Alternatively, cognitive impairment in these individuals may be associated with or resulting from a disease or other condition.

Individuals suffering from cognitive impairment may be unable to think well enough to do normal activities, such as dressing or eating. Other manifestations of cognitive impairment include a loss of problem solving capacity, memory impairment, and difficulty with recall of information and remembering new experiences and past events. Individuals suffering from cognitive impairment may be unable to differentiate between real and unreal experiences. There may be a loss of a train of thought, a phenomenon known as "word salad", social withdrawal at least in part because of fear, disorganized thinking, loss of long-term memory, and loss of responsiveness. Other individuals may experience difficulty concentrating amid distractions and may be slower at processing new information, experience a loss of recent memory, have difficulty with new learning, and/or lose executive function ability in starting tasks and setting goals. Still other individuals with cognitive impairment may experience difficulty with decision making, control of inhibitions, planning, and memory, may have problems with concentration, sifting different thoughts, application to problems, and general mental activities. These symptoms and signs are purely for illustration and it is understood by one of skill in the art that there are many other medical manifestations arising from cognitive impairment and decline.

There are a wide variety of tests available for assessing cognitive function. Examples include scoring the ability of a person to recognize shapes, numbers, symbols and/or pictures presented on flash cards and/or computer screens. The Folstein mini-mental state examination is one example of a test which incorporates simple assessments of memory, reading, copying, response to commands, identification of places and dates, writing, and naming into derivation of a composite score. The Folstein test may be used to assess the severity of cognitive impairment and follow the course of cognitive change in an individual. The Mini-Cog test is another commonly used test to assess cognitive decline where the person is given three words to remember, then is exposed to a distraction such as a drawing exercise, and is rated on his or her ability to recall the three words. There are many other tests known and used by medical professionals in the clinical field that operate on similar principles ranging from very simple to highly complex. Any one of these tests may be used to assess the initial cognitive state of an individual, i.e., determine the severity of cognitive impairment, and to track or assess cognitive improvement in an individual following treatment in accordance with the methods of the present invention.

Treatment-induced improvement in the cognitive state of a patient, including drug-induced improvement, can also be observed by family members of a patient as enhanced memory, improved level of alertness and reduced anxiety, along with a general improved level of participation in personal care ability and family affairs. The subject may experience improved recall and general ability to function in society, plus a general lifting of a heavy cloud over his or her ability to think clearly. The clinical pharmacologist may observe improved responses in formal tests of drug action, which can include the induction of an artificial foggy state with experimental drugs (for example scopolamine), then reversal by the therapeutic agent, in much the same way as this drug is used as a test compound in laboratory animals. The patient care professional may observe improved performance in his or her objective tests of memory and other aspects of mental functioning, including response to questioning.

The improvement in cognitive function as described in the present aspect may be useful in improving cognition of a subject having a cognitive impairment, including, for example, a mild cognitive impairment. In one embodiment, the cognitive impairment is selected from the group consisting of Alzheimer's Disease, frontotemporal dementia, senile dementias, dementia with lewy bodies, and mild cognitive impairment. In one embodiment, the cognitive impairment is Alzheimer's Disease. In another embodiment, the cognitive impairment may not be associated with neurodegeneration.

In one embodiment, the cognitive impairment is Alzheimer's Disease and the ILC2 activator is interleukin 33 (IL-33) interleukin 25 (IL-25), interleukin 7 (IL-7), or thymic stromal lymphopoietin (TSLP). In another embodiment, the cognitive impairment is Alzheimer's Disease and the ILC2 activator is interleukin 33 (IL-33). In another embodiment, the cognitive impairment is Alzheimer's Disease and the ILC2 activator is interleukin 25 (IL-25). In one embodiment, one or more soluble beta-amyloid plaques in the subject are reduced.

In accordance with the present disclosure, cognition may be improved and cognitive impairment may be treated or prevented by administering to a subject an ILC2 activator that improves cognitive function, improves cognition, and/ or treats or prevents cognitive impairment in a subject. An ILC2 activator as described herein includes any compound that triggers activity in a group-2 innate lymphoid cell (ILC2). Innate lymphoid cells (ILC) in accordance with the present disclosure include specialized innate effectors that lack clonally distributed antigen receptors, but transcriptionally resemble T cells (Yang Q. and Bhandoola A., "The Development of Adult Innate Lymphoid Cells," Curr. Opin. Immunol. 39:114-20 (2016), which is hereby incorporated by reference in its entirety). Group 2 innate lymphoid cells (ILC2) as described herein include those which respond to the alarm proteins IL-33 and IL-25 and are potent producers of IL-5 and IL-13 (Yang Q. and Bhandoola A., "The Development of Adult Innate Lymphoid Cells," Curr. Opin. Immunol. 39:114-20 (2016), which is hereby incorporated by reference in its entirety). ILC2 as described herein include non-circulating, tissue-resident cells residing at non-lymphoid tissues such as mucosal barrier sites, the uterus, and adipose tissues (Yang Q. and Bhandoola A., "The Development of Adult Innate Lymphoid Cells," Curr. Opin. Immunol. 39:114-20 (2016), which is hereby incorporated by reference in its entirety). As described herein, local proliferation, but not recruitment from the periphery, is a signature of ILC2 activation (Gasteiger et al., "Tissue Residency of Innate Lymphoid Cells in Lymphoid and Nonlymphoid Organs," Science 350:981-985 (2015), which is hereby incorporated by reference in its entirety). Tissue-resident ILC2 may be implicated in tissue repair, tissue remodeling and metabolic homeostasis (Vivier et al., "Innate Lymphoid Cells: 10 Years On," Cell 174:1054-1066 (2018), which is hereby incorporated by reference in its entirety). In one embodiment the ILC2 activator may, for example, be interleukin 33 (IL-33), interleukin 25 (IL-25), interleukin 7 (IL-7), thymic stromal lymphopoietin (TSLP), TL1A, prostaglandin D2 (PGD2), cysteinyl leukotriene 4 (LTE4), anti-IL1RL1, probiotic bacteria, succinate, depletion of natural killer (NK) cells, depletion of mucosal associated invariant T cells, or any combination thereof. In one particular embodiment, the ILC2 activator is interleukin 33 (IL-33). In another particular embodiment, the ILC2 activator is interleukin 25 (IL-25). The ILC2 activator may include, for example a variant of interleukin 33 (IL-33) interleukin 25 (IL-25), interleukin 7 (IL-7), or thymic stromal lymphopoietin (TSLP) that maintains the ability to activate ILC2.

Various cytokines, including, for example, IL-33, IL-25, IL-7, and TSLP, are well known in the art. See e.g., Zhang et al., "Cytokines, Inflammation and Pain," Int. Anesthesiol. Clin. 45:27-37 (2007), which is hereby incorporated by reference in its entirety. Cytokines that are ILC2 activators are within the scope of this disclosure, for example, IL-33 or a variant thereof that activates ILC2. For a discussion of IL-33, see Marchandani et al., "Interleukin-33 and the Function of Innate Lymphoid Cells," Trends in Immunol. 33:389-95 (2012), which is hereby incorporated by reference in its entirety.

The ILC2 activator that is a probiotic bacteria may include any organism, particularly microorganisms that exert a beneficial effect on the host animal such as increased health or resistance to disease. Probiotic organisms can exhibit one or more of the following characteristics: non-pathogenic or non-toxic to the host; are present as viable cells, preferably in large numbers; microbicidal or microbistatic activity or effect toward pathogenic bacteria; enhanced urogenital tract health; capable of survival, metabolism, and persistence in the gut environment (e.g., resistance to gastrointestinal acids, secretions, and low pH); adherence to epithelial cells, particularly the epithelial cells of the gastrointestinal tract; anticarcinogenic activity; immune modulation activity, particularly immune enhancement; modulatory activity toward the endogenous flora; antiseptic activity in or around wounds and enhanced would healing; reduction in intestinal permeability; reduction in diarrhea; reduction in allergic reactions; reduction in neonatal necrotizing enterocolitis; and reduction in inflammatory bowel disease.

The probiotic bacteria may be, for example, Escherichia coli, Bifidobacterium longum, Bifidobacterium lactis, Bifidobacterium animalis, Bifidobacterium breve, Bifidobacterium infantis, Bifidobacterium adolescentis, Lactobacillus acidophilus, Lactobacillus casei, Lactobacillus paracasei, Lactobacillus salivarius, Lactobacillus reuteri, Lactobacillus rhamnosus, Lactobacillus johnsonii, Lactobacillus plantarum, Lactobacillus fermentum, Lactococcus lactis, Streptococcus thermophilus, Lactococcus lactis, Lactococcus diacetylactis, Lactococcus cremoris, Lactobacillus bulgaricus, Lactobacillus helveticus, Lactobacillus delbrueckii, or mixtures thereof. ILC2 activators are further discussed in Schneider et al., "A Metabolite-Triggered Tuft Cell-ILC2 Circuit Drives Small Intestinal Remodeling," Cell 174(2): 271-284.e14 (2018), which is hereby incorporated by reference in its entirety.

An ILC2 activator that is a succinate includes, for example, any salt or ester of succinic acid. The term succinate, as used herein, refers to a metabolite that is the anion of succinic acid, and is also known as butanedioate. It is an intermediate of the tricarboxylic acid (TCA) cycle, and plays a crucial role in adenosine triphosphate (ATP) generation in mitochondria. The chemical formula of succinate is $C_4H_6O_4$. The expression circulating succinate or circulating succinate in a subject as used herein refers to succinate that is detectable in a blood, plasma or serum sample from a subject. ILC2 activators that are succinate are further discussed in Schneider et al., "A Metabolite-Triggered Tuft Cell-ILC2 Circuit Drives Small Intestinal Remodeling," Cell 174(2):271-284.e14 (2018), which is hereby incorporated by reference in its entirety.

An ILC2 activator may include, for example, depletion of natural killer (NK) cells. NK cells (also referred to as large granular lymphocytes) as referred to herein refer to cytotoxic lymphocytes important in the innate immune system. NK cells as described herein provide fast response to virus-infected cells and may recognized stressed cells to promote quite immune reaction. NK cells as described herein belong to the group of innate lymphoid cells and are one of three kinds of cells differentiated from lymphoid progenitor (the other two include B and T lymphocytes). NK cells inhibit the growth of fungal and bacterial pathogens in vivo and in vitro. See e.g., Harshan et al., "In Vivo Depletion of Natural Killer Cell Activity Leads to Enhanced Multiplication of Mycobacterium avium Complex in Mice," Infect. Immun. 59:2818-21 (1991), which is hereby incorporated by reference in its entirety. NK cells are known to produce IFNgamma that can repress ILC2 activity. See Califano et al., "IFN-γ Increases Susceptibility to Influenza A Infection Through Suppression of Group II Innate Lymphoid Cells,"

*Mucosal Immunol.* 11(1):209-219 (2018), which is hereby incorporated by reference in its entirety.

An ILC2 activator may include, for example, depletion of mucosal associated invariant T cells (also referred to herein as MAIT cells). MAIT cells as disclosed herein include a subset of T cells in the immune system that display innate, effector-like qualities. In human subjects, MAIT cells may be found in the blood, lungs, mucosa, and liver, for example, and may defend against microbial activity and infection. MAIT cells repress ILC2 activity. See Ye et al., "Mucosal-Associated Invariant T Cells Restrict Allergic Airway Inflammation," *J. Allergy Clin. Immunol.* (available online December 2019), which is hereby incorporated by reference in its entirety.

An ILC2 activator in accordance with the present disclosure may include, for example, anti-IL1RL1 antibody.

In one embodiment, the method includes implanting group-2 innate lymphoid cells (referred to herein interchangeably as ILC2) that were treated with an ILC2 activator in a cranium of a subject. In such an embodiment, the methods of the present disclosure may involve selecting a subject based on levels of a particular cell type during a time period where increased improved cognition is sought, compared to a reference level for a subject not having a need or desire for improved cognition. As used herein, the term "reference level" refers to an amount of a substance, e.g., particular cell type (for example, ILC2), which may be of interest for comparative purposes. In some embodiments, a reference level may be the level or concentration of a population of a cell type expressed as an average of the level or concentration from samples of a control population of healthy (disease-free and/or pathogen-free) subjects. In other embodiments, the reference level may be the level in the same subject at a different time, e.g., before the present invention is employed, such as the level determined prior to the subject developing a disease, disease condition, loss or potential loss of cognitive ability (with or without neurodegeneration), and/or pathogenic infection, prior to initiating therapy, such as, for example, therapy for improving cognitive function, or earlier in the therapy. Mammalian subjects according to this aspect of the present invention include, for example, human subjects, equine subjects, porcine subjects, feline subjects, and canine subjects. Human subjects are particularly preferred.

Exemplary methods of comparing ILC2 levels between a subject and a reference level include, but are not limited to, comparing differences in detected cell population levels, based on results of one or more assays. In some embodiments, cell population levels are lower in the presence of a cognitive impairment than in a subject having no cognitive impairment.

As used herein, the phrase "therapeutically effective amount" means an amount of active compound or pharmaceutical agent that elicits the biological or medicinal response that is being sought in a tissue, system, animal, individual or human by a researcher, veterinarian, medical doctor or other clinician. The therapeutic effect is dependent upon the disorder being treated or the biological effect desired. As such, the therapeutic effect can be a decrease in the severity of symptoms associated with the disorder and/or inhibition (partial or complete) of progression of the disorder, or improved treatment, healing, prevention or elimination of a disorder, or side-effects. The amount needed to elicit the therapeutic response can be determined based on the age, health, size and sex of the subject. Optimal amounts can also be determined based on monitoring of the subject's response to treatment.

In one embodiment, the ILC2 activator is applied to ILC2 in vitro. In one embodiment, the method further includes inserting the cells into a subject following applying of one or more ILC2 activators. In this embodiment, a cell population can be taken from a subject or from a second subject then administered to a first subject (e.g., by injecting the cell population into the first subject).

In embodiments that involve applying the one or more ILC2 activator to cells from a subject, any combination of administration can be accomplished either via systemic administration to the subject or via targeted administration to affected tissues, organs, and/or cells. The cell population following application of one or more ILC2 activators may be administered to a non-targeted area along with one or more agents that facilitate migration of the cells (and/or uptake by) a targeted tissue, organ, or cell. Additionally, and/or alternatively, the cells themselves can be modified to facilitate transport to (and uptake by) the desired tissue, organ, or cell, as will be apparent to one of ordinary skill in the art.

In one embodiment, the implanting is in a choroid plexus of said subject. In one embodiment, the implanting is by intracerebroventricular transfer.

A second aspect relates to a method including selecting a subject having aging-associated cognitive decline and administering to the subject an activator of innate lymphoid cell activity under conditions effective to promote innate lymphoid cell activity.

This aspect is carried out in accordance with the previously described aspect.

A subject having cognitive decline may have neurodegeneration or may not have neurodegeneration.

In one embodiment, the activator is a group-2 innate lymphoid cell (ILC2) activator, a group-1 innate lymphoid cell (ILC1) activator, or a group-3 innate lymphoid cell (ILC3) activator. The activator may include any or all of the ILC2 activators described in the previous aspect. As described in the present aspect, the activator may also include any compound that activates innate lymphoid cells and/or innate lymphoid cell activity as it relates to any biological function of innate lymphoid cells including for instance cytokines secretion or cytotoxic function. Innate lymphoid cells (ILC) are a novel family of lymphoid effector cells that serve essential roles in the early immune response, consisting of cytotoxic cells (NK cells) and "helper-like" ILCs. ILCs are characterized by expression of interleukin-7 receptor (IL-7Rα/CD127) and categorized into three distinct groups based on their transcription factors (TF) and signature cytokines production similarities to T helper (TH) cells. Group 1 ILC (ILC1) express T-BET/TBX21 and produce $T_H1$-associated cytokines IFN-γ and TNF-α. Group 2 ILC (ILC2) secrete $T_H2$-associated cytokines, IL-5 and IL-13 via a GATA-3 and RORα-dependent pathway. Group 3 ILC (ILC3) utilize related orphan receptor C (RORC encoding RORγt) to drive production of the $T_H17$-associated cytokines, IL-17 and/or IL-22 (Serafini et al., "Transcriptional Regulation of Innate Lymphoid Cell Fate," *Nat. Rev. Immunol.* 75:415-428 (2015) and Spits et al., "Innate Lymphoid Cells—A Proposal for Uniform Nomenclature," *Nat. Rev. Immunol.* 13:145-149 (2013), both of which are hereby incorporated by reference in their entirety). These different ILC subsets are found in diverse lymphoid and non-lymphoid tissues, and enriched at mucosal sites where they play essential roles in barrier function and innate immune defense. See Artis et al., "The Biology of Innate Lymphoid Cells," *Nature* 517:293-301 (2015); Eberl et al., "Innate Lymphoid Cells. Innate Lymphoid Cells: A New Paradigm in Immunology," *Science* 348:aaa6566 (2015), and WO 2018/100091 all of which are hereby incorporated by reference in their entirety.

In another embodiment, the activator is an activating cytokine. In one embodiment, the activating cytokine may include, for example, interleukin 33 (IL-33), interleukin 25 (IL-25), interleukin 7 (IL-7), thymic stromal lymphopoietin (TSLP), and any combination thereof. In one particular embodiment, the activating cytokine is interleukin 33 (IL-33). In another particular embodiment, the activating cytokine is interleukin 25 (IL-25). The ILC2 activator may include, for example a variant of interleukin 33 (IL-33) interleukin 25 (IL-25), interleukin 7 (IL-7), or thymic stromal lymphopoietin (TSLP) that maintains the ability to activate and/or promote innate lymphoid cell activity. As described herein, variant and variations thereof, refers to a protein or peptide that deviates from a reference protein or peptide sequence. Modified and variant proteins or peptides may therefore have greater or less activity or function than a reference protein or peptide but at least retain partial activity or function of the reference protein or peptide.

In one embodiment, the one or more innate lymphoid cell may include, for example, a group-2 innate lymphoid cell (ILC2), a group-1 innate lymphoid cell (ILC1), and a group-3 innate lymphoid cell (ILC3). As used herein, the phrase innate lymphoid cell has its general meaning in the art and refers to a family of innate immune cells, which are part of the innate immune system, but develop from the lymphoid lineage, and are more fully described infra.

In one embodiment, an additional agent may be administered to the cells in addition to the activator of innate lymphoid cell activity.

As used herein, the term "simultaneous" therapeutic use refers to the administration of at least one additional agent beyond the activator of innate lymphoid cell activity, optionally, by the same route and at the same time or at substantially the same time. As used herein, the term "separate" therapeutic use refers to an administration of at least one additional agent beyond the activator of innate lymphoid cell activity at the same time or at substantially the same time by different routes. As used herein, the term "sequential" therapeutic use refers to administration of at least one additional agent beyond the activator of innate lymphoid cell activity at different times, the administration route being identical or different. More particularly, sequential use refers to the whole administration of the additional agent before administration of the activator of innate lymphoid cell activity. It is thus possible to administer the additional agent over several minutes, hours, or days before applying the activator of innate lymphoid cell activity.

In one embodiment, the additional agent may include, for example, one or more antibiotic compound; one or more antimicrobial compound; one or more antibody; one or more biocidal agent; one or more nanoparticle; one or more self-assembling nanoparticle; one or more viral particle; one or more bacteriophage particle; one or more bacteriophage DNA; genetic material including but not limited to a plasmid, RNA, mRNA, siRNA, and an aptamer; one or more chemotherapy agent; one or more growth factor; one or more synthetic scaffold including but not limited to hydrogel and others; one or more natural scaffold including but not limited to collagen gel and decellularized tissue (whole, dissolved, denatured, or powdered); one or more electrode, one or more drug or pharmaceutical compound including but not limited to an anti-inflammatory agent, an inflammatory agent, a pain blocking agent, and a numbing agent; one or more microbes, and one or more bacteria.

If the additional agent is antibiotic compound, such an antibiotic compound may include any of a number of different classes or types of antibiotics. Examples include aminoglycosides, ansamycins, carbapenems, cephalosporins, antibiotic glycopeptides, lincosamides, abitbiotic lipopeptides, macrolides, monobactams, nitrofurans, oxazolidinones, penicillins, quinolones, fluoroquinolones, sulfonamides, tetracyclines, or others. Any antibiotic from any of these categories may be used in accordance with aspects of the present disclosure. Non-limiting specific examples include, tobramycin, streptomycin, rifampicin, vancomycin, clindamycin, daptomycin, erythromycin, linezolid, penicillin, minocycline, pexiganan, fusidic acid, mupirocin, bacitracin, neomycin, polymixin B, and metronidazole. Other examples include metals or metal ions known to have antimicrobial or antibacterial effects, such as silver, copper, or zinc. In some examples, combinations of any two or more of the foregoing antibiotics or substances with antibiotic activity may be administered concurrently in accordance with an aspect of the present disclosure. In some examples, any one or more of the foregoing may also be explicitly excluded from use in accordance with an aspect of the present disclosure. Additional exemplary antibiotic agents include, but are not limited to, doxorubicin; actinomycin; aminoglycosides (e.g., neomycin, gentamicin, tobramycin); β-lactamase inhibitors (e.g., clavulanic acid, sulbactam); glycopeptides (e.g., vancomycin, teicoplanin, polymixin); ansamycins; bacitracin; carbacephem; carbapenems; cephalosporins (e.g., cefazolin, cefaclor, cefditoren, ceftobiprole, cefuroxime, cefotaxime, cefipeme, cefadroxil, cefoxitin, cefprozil, cefdinir); gramicidin; isoniazid; linezolid; macrolides (e.g., erythromycin, clarithromycin, azithromycin); mupirocin; penicillins (e.g., amoxicillin, ampicillin, cloxacillin, dicloxacillin, flucloxacillin, oxacillin, piperacillin); oxolinic acid; polypeptides (e.g., bacitracin, polymyxin B); quinolones (e.g., ciprofloxacin, nalidixic acid, enoxacin, gatifloxacin, levaquin, ofloxacin, etc.); sulfonamides (e.g., sulfasalazine, trimethoprim, trimethoprim-sulfamethoxazole (co-trimoxazole), sulfadiazine); tetracyclines (e.g., doxycyline, minocycline, tetracycline, etc.); monobactams such as aztreonam; chloramphenicol; lincomycin; clindamycin; ethambutol; mupirocin; metronidazole; pefloxacin; pyrazinamide; thiamphenicol; rifampicin; thiamphenicl; dapsone; clofazimine; quinupristin; metronidazole; linezolid; isoniazid; piracil; novobiocin; trimethoprim; fosfomycin; fusidic acid; or other topical antibiotics. Optionally, the antibiotic agents may also be antimicrobial peptides such as defensins, magainin and nisin; or lytic bacteriophage. The antibiotic agents can also be the combinations of any of the agents listed above.

In one embodiment, where the additional compound is an antimicrobial compound, the antimicrobial compound may include, for example, any agent that has the potential to reduce a microbe including but not limited to a fungus, such as *Candida albicans, Candida auris*, or species of *Aspergillis*. Various antifungal compounds may also be administered in accordance with an aspect of the present disclosure. Non-limiting examples include clotrimazole, econazole, miconazole, terbinafine, fluconazole, ketoconazole, and amphotericin, or other compounds known to have antifungal activities. In some embodiments, combinations of any two or more of the foregoing antifungals or substances with antifungal activity may be administered concurrently in accordance with an aspect of the present disclosure. In some examples, any one or more of the foregoing antifungals or substances with antifungal activity may also be explicitly excluded from use in accordance with an aspect of the present disclosure. In some other embodiments, one or more of the foregoing antibiotics or substances with antibiotic activity may be used in combination with any one or more of the foregoing antifungals or substances with antifungal activity in accordance with an aspect of the present disclosure.

In one embodiment, where the additional agent is an antibody, the antibody ("Ab"), which may also be call an immunoglobulin ("Ig"), may be any protein produced in a subject and use by the immune system to neutralize pathogens such as, for example, pathogenic bacteria and viruses.

In one embodiment, where the additional agent is a biocidal agent, the biocidal agent may be any substance or microorganism that is intended to destroy, deter, render harmless, or exert a controlling effect on any harmful organism. Biocidal agents may include, for example, preservatives, insecticides, disinfectants, and pesticides used for the control of organisms that are harmful to health or that cause damage to natural or manufactured products. The biocidal agent in some embodiments, may include, for example, a pesticide such as one or more of a fungicide, an herbicide, an insecticide, an algicide, a molluscicide, a miticide, a rodenticide, and a slimicide. The biocide may also include an antimicrobial biocide, including for example, a germicide, an antibiotic, an antibacterial, an antiviral, an antifungal, an antiprotozoal, and an antiparasite. In one embodiment, the biocide may be spermicide.

The activator of innate lymphoid cell activity and/or the additional agent may optionally be administered by any of various medically known or accepted or approved means of applying or administering such beneficial compositions. Examples include oral, parenteral (including subcutaneous, intradermal, intramuscular, intravenous and intraarticular), intracranial, intrathecal, intracerebroventricular, intraspinal, rectal and topical (including dermal, buccal, sublingual and intraocular) administration. The activator and/or additional agent may be formulated as appropriate for such administration, which may be tailored to a given purpose, such as in a tablet, capsule, or other form for oral administration or injectable formulation for injection, or gel, cream, powder, ointment, or other composition for rectal or dermal application, etc. In some examples, the activator and/or additional agent may be included in the surface of a material or an apparatus to be implanted on or within the body of a subject such as a human subject configured or otherwise formulated to have or promote a beneficial effect at the surface of such material or apparatus or to be released therefrom and have such a beneficial effect in tissue in the vicinity of such material or apparatus.

Any suitable approach for delivery of the activator of innate lymphoid cell activity and/or additional agents can be utilized to practice this aspect. Typically, the agent will be administered to a patient in a vehicle that delivers the agent(s) to the target cell, tissue, or organ. Exemplary routes of administration include, without limitation, by intratracheal inoculation, aspiration, airway instillation, aerosolization, nebulization, intranasal instillation, oral or nasogastric instillation, intraperitoneal injection, intravascular injection, topically, transdermally, parenterally, subcutaneously, intravenous injection, intra-arterial injection (such as via the pulmonary artery), intramuscular injection, intrapleural instillation, intraventricularly, intralesionally, intracranially, intrathecally, intracerebroventricularly, intraspinally, by application to mucous membranes (such as that of the nose, throat, bronchial tubes, genitals, and/or anus), or implantation of a sustained release vehicle.

In some embodiments, the activator of innate lymphoid cell activity and/or additional agent is administered orally, topically, intranasally, intraperitoneally, intravenously, subcutaneously, orally, or by aerosol inhalation. In some embodiments, an agent is administered via aerosol inhalation. In some embodiments, an agent can be incorporated into pharmaceutical compositions suitable for administration, as described herein. In one embodiment, the administering is carried out intraperitoneally, orally, parenterally, nasally, subcutaneously, intravenously, intramuscularly, intracerebroventricularly, intracranially, intrathecally, intraspinally, intraparenchymally, by intranasal inhalation, by implantation, by intracavitary or intravesical instillation, intraocularly, intraarterially, intralesionally, transdermally, or by application to mucous membranes. The activator of innate lymphoid cell activity may, in one embodiment, be administered in the choroid plexus of a subject.

The amount to be administered will, of course, vary depending upon the treatment regimen. Generally, an agent is administered to achieve an amount effective for cell differentiation or stimulation, or treatment of the condition causing or making a subject susceptible to having cognitive decline or impaired cognitive function. Thus, a therapeutically effective amount can be an amount which is capable of at least partially treating or preventing such a condition. This includes, without limitation, delaying the onset of infection. The dose required to obtain an effective amount may vary depending on the agent, formulation, and individual to whom the agent is administered. In one embodiment, the method includes repeating administration of the activator any number of times necessary to create a desired effect (e.g., promoting innate lymphoid cell activity and/or treating age-associated cognitive decline).

The terms dose and dosage are used interchangeably herein. A dose refers to the amount of active ingredient given to an individual at each administration. The dose will vary depending on a number of factors, including the range of normal doses for a given therapy, frequency of administration; size and tolerance of the individual; severity of the condition; risk of side effects; and the route of administration. One of skill will recognize that the dose can be modified depending on the above factors or based on therapeutic progress. The term dosage form refers to the particular format of the pharmaceutical or pharmaceutical composition, and depends on the route of administration. Dosage, toxicity and therapeutic efficacy of the agents or compositions of the present invention can be determined by standard pharmaceutical procedures in cell cultures or experimental animals, e.g., for determining the $LD_{50}$ (the dose lethal to 50% of the population) and the $ED_{50}$ (the dose therapeutically effective in 50% of the population). The dose ratio between toxic and therapeutic effects is the therapeutic index and it can be expressed as the ratio $LD_{50}/ED_{50}$. Compounds which exhibit high therapeutic indices may be desirable. While compositions that exhibit toxic side effects may be used, care should be taken to design a delivery system that targets such compositions to the site of affected tissue in order to minimize potential damage to uninfected cells and, thereby, reduce side effects. In one embodiment, the activator is administered in an amount between about 1 mg and 10 mg. The amount of the activator or innate lymphoid cell activity will vary based on the selected subject and may be less than 1 mg or, alternatively, may be more than 10 mg.

Aging-associated cognitive decline as described herein includes, for example, the progressive loss of physiological functions in multiple organs and systems that occurs during aging (Lopez-Otin et al., "The Hallmarks of Aging," *Cell*

153:1194-1217 (2013), which is hereby incorporated by reference in its entirety). The brain is particularly susceptible to the effects of aging. Mammalian cognitive function, especially learning and memory, gradually declines with aging (Glisky, E. L. "Changes in Cognitive Function in Human Aging," *In Brain Aging: Models, Methods, and Mechanisms* D. R. Riddle, editor Boca Raton (Fla.) (2007) and Harada et al., "Normal Cognitive Aging," *Clin. Geriatr. Med.* 29:737-752 (2013), which are hereby incorporated by reference in their entirety). Some examples of age-related cognitive decline involve neurodegeneration, whereas other examples of age-related cognitive decline do not involve neurodegeneration. Aging is known to induce gradual deterioration of the adaptive immune system and to increase susceptibility to infectious diseases, termed immunosenescence (Goronzy et al., "Understanding Immunosenescence to Improve Responses to Vaccines," *Nat. Immunol.* 14:428-436 (2013), which is hereby incorporated by reference in its entirety). May tissue-resident innate immune cells, such as microglia, display hyperactivation phenotypes with aging (Dilger et al., "Aging, Microglial Cell Priming, and the Discordant Central Inflammatory Response to Signals From the Peripheral Immune System," *J. Leukoc. Biol.* 84:932-939 (2008) and Spittau, B. "Aging Microglia-Phenotypes, Functions and Implications for Age-Related Neurodegenerative Diseases," *Front Aging Neurosci.* 9:194 (2017), which are hereby incorporated by reference in their entirety). In addition, subsets of memory or memory-like T and B cells with innate-like properties have been observed to accumulate with aging (Fukushima et al., "The Impact of Senescence-Associated T Cells on Immunosenescence and Age-Related Disorders," *Inflamm. Regen.* 38:24 (2018); Goronzy et al., "Successful and Maladaptive T Cell Aging," *Immunity* 46:364-378 (2017); Hao et al., "A B-cell Subset Uniquely Responsive to Innate Stimuli Accumulates in Aged Mice," *Blood* 118:1294-1304 (2011); Ratliff et al., "In Senescence, Age-associated B Cells Secrete TNFalpha and Inhibit Survival of B-Cell Precursors," *Aging Cell* 12:303-311 (2013); Rubtsov et al., "Toll-like Receptor 7 (TLR7)-driven Accumulation of a Novel CD11c(+) B-cell Population is Important for the Development of Autoimmunity," *Blood* 118:1305-1315 (2011); and Rubtsova et al., "Age-Associated B Cells: A T-bet-Dependent Effector with Roles in Protective and Pathogenic Immunity," *J. Immunol.* 195:1933-1937 (2015), all of which are incorporated by reference in their entirety). The increased numbers and activity of certain innate or innate-like immune cell subsets in accordance with this present disclosure during aging might be considered as host responses to compensate for the drastic decline in adaptive immune cell development and function.

In one embodiment, the subject has a cognitive impairment as described infra. The cognitive impairment in accordance with the present aspect may include, for example, frontotemporal dementia, senile dementias, mild cognitive impairment, and any combination therein, with or without a neurodegenerative component. In one embodiment of the current aspect, the cognitive impairment is not Alzheimer's Disease. In one embodiment, the cognitive impairment is not Alzheimer's Disease and the activator is interleukin 33 (IL-33), interleukin 25 (IL-25), interleukin 7 (IL-7), or thymic stromal lymphopoietin (TSLP), or any combination thereof. In another embodiment, the cognitive impairment is not Alzheimer's Disease and the activator is interleukin 33 (IL-33). In another embodiment, the cognitive impairment is not Alzheimer's Disease and the activator is interleukin 25 (IL-25).

A third aspect relates to a method of improving cognition in a subject. The method includes selecting a subject having aging-associated cognitive decline and administering to the subject a cytokine selected from the group consisting of interleukin 33 (IL-33), interleukin 5 (IL-5), interleukin 7 (IL-7), interleukin (IL-25), and thymic stromal lymphopoietin.

This aspect is carried out in accordance with the previously described aspects.

In one embodiment, the cytokine is IL-33. In an alternative embodiment, the cytokine is IL-5. Interleukin 5 (IL-5) as described herein is produced by type-2 T helper cells and mast cells, in particular produced by ILC2. IL-5 may stimulate B cell growth and increase immunoglobulin secretion, in particular IgA. The cytokine may include, for example a variant of IL-33, IL-5, IL-7, IL-25, and/or thymic stromal lymphopoietin (TSLP) that maintains the ability to improve cognition in a subject having aging-associated cognitive decline.

The present disclosure may be further illustrated by reference to the following examples.

EXAMPLES

Example 1—Materials and Methods

Mice—Young (2-3 months) and aged (19-24 months) female C57BL/6 mice were obtained from the National Institute of Aging via Charles River or bred in the animal facility of Albany Medical College. All animal experiments were performed according to protocols approved by the Institutional Animal Care and Use Committee at Albany Medical College.

Human choroid plexus tissues—Deidentified human autopsy tissues were collected from deceased elderly people over 65 years old. Choroid plexus tissues were digested with 0.2 mg/ml of Liberase (Roche) and 0.1 mg/ml DNase I (Roche) in HBSS for 30 minutes at 37° C. Single cell suspension was prepared followed by flow cytometry analysis. Albany medical college Institutional Review Board (IRB) has determined that this is not human subject study, because autopsy tissues are collected from deceased individuals.

Intravascular Staining—Mice were injected intravenously with anti-CD45.2 PE (3 µg/mouse) and sacrificed 3 minutes later as described before (Anderson et al., "Intravascular Staining for Discrimination of Vascular and Tissue Leukocytes," *Nat. Protoc.* 9:209-222 (2014) and Andersson et al., "Eosinophils From Hematopoietic Stem Cell Recipients Suppress Allogeneic T Cell Proliferation," *Biol. Blood Marrow Transplant* 20:1891-1898 (2014), which are hereby incorporated by reference in their entirety).

Isolation of Hematopoietic Cells—Mice were perfused with 50 ml of PBS into the right ventricle of the heart. The brain was harvested, minced and digested with 0.2 mg/ml of Liberase (Roche) and 0.1 mg/ml DNase I (Roche) in HBSS for 30 minutes at 37° C. Single cell suspension was made by filtering the tissue through a 70 µM strainer. Hematopoietic cells were harvested after gradient centrifugation with 40% Percoll (GE).

For isolation of hematopoietic cells from the meninges and CP, CP tissue lining the lateral ventricles was isolated. Leptomeninges attached to the brain parenchyma of the dorsal cerebrum were isolated, and referred to as "Leptomeninges". Meninges attached to the skull were isolated, and referred to as "dura/arachnoid meninges". CP and meninges were digested with 0.2 mg/ml of Liberase (Roche) and 0.1 mg/ml DNase I (Roche) in HBSS for 30 minutes at 37° C. Single cell suspension was made by filtering the tissue through a 70 µM strainer.

Flow Cytometry and Cell Sorting—Lineage markers include anti-B220 (RA3-6B2), anti-NK1.1 (PK136), anti-CD11b (M1/70), anti-CD3 (2C11), anti-CD5 (53-7.3) and anti-TCRβ (H57). Other antibodies (abs) include anti-CD45.2 (104), anti-Thy1.2 (53-2.1), anti-CD25 (PC61.5), anti-T1/ST2 (DJ8), anti-CD127 (A7R34), anti-Ki67 (16A8), anti-CD68 (FA11), anti-IL5 (TRFK5), anti-IL13 (ebiol3A) and anti-GATA3 (TWAJ). Staining for transcription factors was performed using the Foxp3 Fix/perm Kit (Thermo) according to the manufacturer's instructions, as was previously described (Shen et al., "Cutting Edge: Core Binding Factor beta Is Required for Group 2 Innate Lymphoid Cell Activation," *J. Immunol.* 202:1669-1673 (2019); Shen et al., "Group 2 Innate Lymphoid Cells Promote Airway Hyperresponsiveness Through Production of VEGFA," *J. Allergy Clin. Immunol.* 141:1929-1931 e1924 (2018); Yang et al., "Group 2 Innate Lymphoid Cells Mediate Ozone-Induced Airway Inflammation and Hyperresponsiveness in Mice," *J. Allergy Clin. Immunol.* 137:571-578 (2016); Yang et al., "TCF-1 Upregulation Identifies Early Innate Lymphoid Progenitors in the Bone Marrow," *Nat. Immunol.* 16:1044-1050 (2015); Yang et al., "T cell factor 1 is Required for Group 2 Innate Lymphoid Cell Generation," *Immunity* 38:694-704 (2013); Yang et al., "Cutting Edge: Natural Helper Cells Derive From Lymphoid Progenitors," *J. Immunol.* 187: 5505-5509 (2011); Zhang et al., "Cutting Edge: Notch Signaling Promotes the Plasticity of Group-2 Innate Lymphoid Cells," *J. Immunol.* 198:1798-1803 (2017, all of which are incorporated by reference in their entirety). Detection of EdU was performed using the Click-iT Plus EdU Flow Cytometry Assay Kit (Thermo) following the manufacturer's instructions. Detection of activated caspases was performed using the CaspGLOW staining kit (Thermo) according to the manufacturer's instructions. Intracellular cytokine staining was performed using the Cytofix/Cytoperm Kit (BD) following re-stimulation with PMA, Ionomycin and Monensin at 37° C. for 2.5 hours, as was previously described (Shen et al., "Cutting Edge: Core Binding Factor beta Is Required for Group 2 Innate Lymphoid Cell Activation," *J. Immunol.* 202:1669-1673 (2019); Shen et al., "Group 2 Innate Lymphoid Cells Promote Airway Hyperresponsiveness Through Production of VEGFA," *J. Allergy Clin. Immunol.* 141:1929-1931 e1924 (2018); Yang et al., "Group 2 Innate Lymphoid Cells Mediate Ozone-Induced Airway Inflammation and Hyperresponsiveness in Mice," *J. Allergy Clin. Immunol.* 137:571-578 (2016); Yang et al., "TCF-1 Upregulation Identifies Early Innate Lymphoid Progenitors in the Bone Marrow," *Nat. Immunol.* 16:1044-1050 (2015); Yang et al., "T cell factor 1 is Required for Group 2 Innate Lymphoid Cell Generation," *Immunity* 38:694-704 (2013); Yang et al., "Cutting Edge: Natural Helper Cells Derive From Lymphoid Progenitors," *J. Immunol.* 187: 5505-5509 (2011); Zhang et al., "Cutting Edge: Notch Signaling Promotes the Plasticity of Group-2 Innate Lymphoid Cells," *J. Immunol.* 198:1798-1803 (2017, all of which are incorporated by reference in their entirety). Flow cytometric analysis was performed using a FACSCanto analyzer (BD) and cell sorting was performed using a FACSAria II sorter (BD).

Cell Culture and Cytokine Measurement—ILC2 were purified by fluorescence activated cell sorting and cultured in alpha-MEM medium containing 20% Hyclone FCS (GE), SCF (100 ng/ml), IL-7 (20 ng/ml), IL-2 (20 ng/ml) and IL-33 (20 ng/ml). Cytokines were purchased from BioLegend. Cytokine concentrations were measured using the LEGENDplex Kit (BioLegend) following the manufacturer's instructions.

For T cell culture, CD4 or CD8 cells from the brains and spleens of aged mice were sorted and cultured in alpha-MEM medium containing 20% Hyclone FCS (GE), anti-CD3 (1 µg/ml), anti-CD28 (2 µg/ml), TL-2 (20 ng/ml), and TL-7 (30 ng/ml). Round-bottom 96-well plates pre-coated with 10 µg/ml of anti-CD3 were used. 100 ng/ml IL-5 was added to some wells. Antibodies were purchased from R&D. Cytokines were purchased from BioLegend.

Gene Transcription Analysis, Microarray and RNA-Seq—RNeasy Plus Mini Kit (Qiagen) was used to extract RNA from samples. qPCR was performed to examine gene expression. Microarray analysis was conducted at the Boston University Microarray and Sequencing Resource.

RNA-Seq was performed with the Center for Functional Genomics at the University at Albany. Samples for RNA-Seq were prepared from sorted cells into Trizol-LS and cDNA was prepared using the SMART-Seq v4 Ultra Low Input RNA kit (Takara). Nextera XT DNA Library Prep Kit (Illumina) was used to generate the library and NextSeq 500 (Illumina) was used to perform Single-end 75 bp high throughput sequencing. STAR aligner was used to align and normalize the data. DEseq2 was used for differential expression analysis. DAVID was used to perform gene pathway analysis (Huang da et al., "Bioinformatics Enrichment Tools: Paths Toward the Comprehensive Functional Analysis of Large Gene Lists," *Nucleic Acids Res.* 37:1-13 (2009a) and Huang da et al., "Systematic and Integrative Analysis of Large Gene Lists Using DAVID Bioinformatics Resources," *Nat. Protoc.* 4:44-57 (2009b), which are incorporated by reference in their entirety). Heatmap was generated by Heatmapper (Babicki et al., "Heatmapper: Web-Enabled Heat Mapping for All," *Nucleic Acids Res.* 44:W147-153 (2016), which is hereby incorporated by reference in its entirety).

For single-cell RNA-seq, aged mice were treated with 400 ng of IL-33 daily for 7 days. Meningeal and CP ILC2 were sorted by fluorescence activated cell sorting, and pooled from 10 mice per group. Single-cell RNA-seq was performed as was previously described (Harly et al., "The Transcription Factor TCF-1 Enforces Commitment to the Innate Lymphoid Cell Lineage," *Nat. Immunol.* 20:1150-1160 (2019), which is hereby incorporated by reference in its entirety). scRNA-seq libraries were prepared using the chromium 5' single-cell gene expression kit (10× Genomics) according to the manufacturer's instruction. The library was sequenced by NextSeq 5000 (Illumina). Primary analysis was performed with Cellranger V3.1.0. Median number of UMI counts were 4225 for meningeal ILC2, and 5347 for CP ILC2. Data were normalized and scaled using Seurat (Stuart et al., "Comprehensive Integration of Single-Cell Data," *Cell* 177:1888-1902 e1821 (2019), which is hereby incorporated by reference in its entirety). Cells were clustered by the UAMP function of Seurat using a dimension of 20. Violin plots were generated using Seurat's normalized data. A Wilcoxon rank-sum test was used to determine significance.

The microarray data of choroid plexus in young and aged mice have been deposited in the Gene Expression Omnibus under the accession number of GSE129923. The RNA-Sequencing data for cultured ILC2, microglia/T cells/ILC2 in IL-33 treated aged mice, and microglia/T cells in IL-5 treated aged mice have been deposited in Gene Expression Omnibus under the accession numbers GSE129992, GSE129996 and GSE129999 respectively. scRNA-seq data have been deposited in Gene Expression Obnimbus under the accession number GSE139328.

Cytokine Injection, EdU Labeling and Intracerebroventricular Injection—For cytokine injections, mice were administrated with 2 μg of IL-5, or 400 ng of IL-33 intraperitoneally (i.p.) daily for 2 days or 7 days. For EdU labeling, mice were administrated i.p. with 8 doses of EdU (100 mg/kg) over a 4 day-course: 1 dose daily for the first 2 days, and 3 doses daily at 2 hours interval for day 3 and day 4. For simultaneous administration of cytokine and EdU, EdU administration (100 mg/kg) started at day 1 of IL-5 treatment or day 3 of IL-33 treatment. Mice were euthanized and EdU concentrations were examined by flow cytometry or immunofluorescence at 24 hrs or 4 weeks after EdU labeling.

For intracerebroventricular (i.c.v.) injection, anesthetized mice were secured to the dorsal position on a stereotaxic device (Stoelting Co.) on a 37° C. heat pad. 0.25% of Bupivacaine (2 mg/kg) (McGuff) was administered subcutaneously at the site of the incision. The site of injection was 0.4 mm posterior to the bregma and 1±0.1 mm medilateral. After the hair was removed, the skull at the injection spot was thinned using a microdrill and sterilely prepared PBS or cell suspension was loaded to a 10 μl cone-tip SGE microvolume syringe with a 26G needle (Trajan Scientific). The needle was lowered 2 mm into the brain using stereotaxic controls. was used for injection. The solutions were injected at a slow rate of 3 μl over 3 mins. Each mouse received injection of $10^5$ ILC2, or 10 ug of anti-IL-5 antibody (clone TRFK5, Bio X Cell) or isotype control, or sterile PBS control. The skin incision was sealed using surgical staples. Mice were rested for 1 week before behavior tests.

CRISPR-mediated gene knockout—For CRISPR-mediated gene knockout, guide RNAs (gRNA) were cloned into the lenti-CRISPRv2-GFP vector as was previously described (Shen et al., "Cutting Edge: Core Binding Factor beta Is Required for Group 2 Innate Lymphoid Cell Activation," *J. Immunol.* 202:1669-1673 (2019), which is hereby incorporated by reference in its entirety). Lenti-CRISPRv2-GFP vector was a gift from David Feldser (Addgene plasmid #82416) (Walter et al., "Systematic In Vivo Inactivation of Chromatin-Regulating Enzymes Identifies Setd2 as a Potent Tumor Suppressor in Lung Adenocarcinoma," *Cancer Res.* 77:1719-1729 (2017), which is hereby incorporated by reference in its entirety). The following gRNA sequences were used: 5'-ACGGAGGACGAGGCAGTTCC-3' (targeting Il5) (SEQ ID NO: 1); 5'-TGCGAATACGCCCACGC-GATGGG-3' (non-target control) (SEQ ID NO: 2). The gRNA sequences were previously published by Dr. Zheng Feng's lab (Sanjana et al., "Improved Vectors and Genome-wide Libraries for CRISPR Screening," *Nat. Methods* 11:783-784 (2014), which is hereby incorporated by reference in its entirety). ILC2/b6 line cells were expanded and activated in vitro with 10 ng/ml of IL-7, IL-2 and IL-33, as was described previously (Zhang et al., "Cutting Edge: Notch Signaling Promotes the Plasticity of Group-2 Innate Lymphoid Cells," *J. Immunol.* 198:1798-1803 (2017), which is hereby incorporated by reference in its entirety). LC2/b6 line is an immortalized ILC2 cell line that exhibits the molecular and functional properties of activated ILC2 (Zhang et al., "Cutting Edge: Notch Signaling Promotes the Plasticity of Group-2 Innate Lymphoid Cells," *J. Immunol.* 198:1798-1803 (2017), which is hereby incorporated by reference in its entirety). The transcriptome and functional capability of LC2/b6 line cells have been extensively characterized by recent work (Hosokawa et al., "Cell Type-Specific Actions of Bcl11b in Early T-Lineage and Group 2 Innate Lymphoid Cells," *J. Exp. Med.* DOI:10.1084 (2019); Shen et al., "Cutting Edge: Core Binding Factor beta Is Required for Group 2 Innate Lymphoid Cell Activation," *J. Immunol.* 202:1669-1673 (2019); and Zhang et al., "Cutting Edge: Notch Signaling Promotes the Plasticity of Group-2 Innate Lymphoid Cells," *J. Immunol.* 198:1798-1803 (2017), which are hereby incorporated by reference in their entirety). ILC2/b6 cells express all known ILC2 signature genes (Hosokawa et al., "Cell Type-Specific Actions of Bcl11b in Early T-Lineage and Group 2 Innate Lymphoid Cells," *J. Exp. Med.* DOI:10.1084 (2019); Shen et al., "Cutting Edge: Core Binding Factor beta Is Required for Group 2 Innate Lymphoid Cell Activation," *J. Immunol.* 202:1669-1673 (2019); and Zhang et al., "Cutting Edge: Notch Signaling Promotes the Plasticity of Group-2 Innate Lymphoid Cells," *J. Immunol.* 198:1798-1803 (2017), which are hereby incorporated by reference in their entirety). They vigorously produce IL-5 and IL-13 in vitro, and lacked the production of IL-17, IL-22, IFNα, or other cytokines characteristic of the alternative lineage (Hosokawa et al., "Cell Type-Specific Actions of Bcl11b in Early T-Lineage and Group 2 Innate Lymphoid Cells," *J. Exp. Med.* DOI: 10.1084 (2019); Shen et al., "Cutting Edge: Core Binding Factor beta Is Required for Group 2 Innate Lymphoid Cell Activation," *J. Immunol.* 202:1669-1673 (2019); and Zhang et al., "Cutting Edge: Notch Signaling Promotes the Plasticity of Group-2 Innate Lymphoid Cells," *J. Immunol.* 198:1798-1803 (2017), which are hereby incorporated by reference in their entirety). Lentiviral transduction was performed with cultured ILC2/b6 cells as was previously described (Hosokawa et al., "Cell Type-Specific Actions of Bcl11b in Early T-Lineage and Group 2 Innate Lymphoid Cells," *J. Exp. Med.* DOI:10.1084 (2019); Shen et al., "Cutting Edge: Core Binding Factor beta Is Required for Group 2 Innate Lymphoid Cell Activation," *J. Immunol.* 202:1669-1673 (2019), which are hereby incorporated by reference in their entirety). GFP$^+$ cells were sorted by fluorescence activated cell sorting, and $10^5$ cells were transferred into aged mice by i.c.v. injection. Object Placement Test was performed at 7 days after i.c.v. injection.

Behavior Tests—Mice for behavior tests were group-housed with 4 mice per Allentown cage. Mice were habituated to the testing facility for 1 hour before starting the behavior tests each day. The behavior tests were recorded and analyzed by using the ANY-maze software (Stoelting Co.). Two independent experiments were performed for each behavior test.

Object Placement Test was performed at 24 hrs after IL-5, IL-13 or IL-33 treatment, or at 7 days after i.c.v. injection, as was previously described (Zuloaga et al., "High Fat Diet-induced Diabetes in Mice Exacerbates Cognitive Deficit Due to Chronic Hypoperfusion," *J. Cereb. Blood Flow Metab.* 36:1257-1270 (2016), which is incorporated by reference in its entirety). On day 1, mice explored in a 50×50 cm white box for 10 mins. On day 2, two identical objects were placed into the box with visual cues adhered to walls of the box. Mice were allowed to explore for 20 minutes. On day 3, one of the objects was placed to a new location (the displaced object) and mice were allowed to explore for 20 minutes. Interaction was defined as sniffing and climbing within a 2 cm zone around the object. The percentage of time spent exploring the displaced object out of the total time interacting with both objects was calculated.

Morris Water Maze was performed at 4 days after IL-5 or IL-13 treatment, or at 10 days after i.c.v. injection, as was previously described (Zuloaga et al., "High Fat Diet-induced Diabetes in Mice Exacerbates Cognitive Deficit Due to Chronic Hypoperfusion," *J. Cereb. Blood Flow Metab.* 36:1257-1270 (2016), which is incorporated by reference in its entirety). A circular pool with a diameter of 125 cm was used with the water made opaque by non-toxic white paint and the temperature was kept at 21-22° C. Visual cues were placed on 4 sides of the pool. The maze was conceptually divided into 4 quadrants. On day 1 (Visible trial), mice were trained to escape the maze by swimming to a clear plastic platform that was submerged by 1 cm in one of the four virtual quadrants (the target quadrant). The platform was made visible by black tape around the platform and a 10 cm tall black cylinder on top of it. Mice were trained for 5 trials of 3 mins each. The mice were placed into the maze from 2 alternating locations opposite to the platform. A trial was concluded when the mouse had found the platform and stayed on it for 10 seconds. If a mouse failed to escape the maze within 3 minutes, it was guided slowly to the platform by dragging its tail and stayed on the platform for 10 seconds. On day 2 (Hidden trial), mice were trained for 5 trials of 3 minutes each. The mice were made to escape the maze but the visual cues on the platform were removed. A trial was concluded when the mouse had found the platform and stayed on it for 10 seconds. If a mouse failed to escape the maze within 3 minutes, it was guided slowly to the platform by dragging its tail and stayed on the platform for 10 seconds. On day 3 (Probe trial), the platform was removed, and the mice were assessed by 1 test of 3 minutes. The percentage of time spent in the target quadrant out of the total test time during the Probe trial was calculated.

Immunofluorescence Histology—For immunofluorescence staining of ILC2, wholemount CP was fixed with 4% paraformaldehyde for 1 hr at RT, blocked with 10% normal rat serum in PBS for 1 hr at RT, and stained with AF594 anti-CD3 (17A2) (Biolegend) and AF647 anti-ICOS1 (C398.4) (Biolegend) overnight at 4° C. CP was mounted on to slides with ProLong Antifade with DAPI solution (Thermo). Slides were imaged using a Zeiss Axio Observer fluorescence microscope (Zeiss) with a 10× objective. Images were processed by the Zeiss Zen Blue software (Zeiss).

Neurogenesis was examined as was previously described (Shen et al., "Adult SVZ Stem Cells Lie in a Vascular Niche: A Quantitative Analysis of Niche cell-cell Interactions," *Cell Stem Cell* 3:289-300 (2008), which is hereby incorporated by reference in its entirety). Mice were treated with 2 μg of IL-5 and EdU (100 mg/kg) daily for 2 days followed by 3 doses of EdU (100 mg/kg) administration daily for another 2 days. Immunofluorescence histology was performed at 72 hours after the last IL-5 injection (24 hrs after the last EdU administration). Mice were perfused with 50 ml of PBS followed by 50 ml of 4% paraformaldehyde. The brains were harvested and fixed for 24 hours in 4% paraformaldehyde and transferred to 30% sucrose in PBS until the tissue sank. The brains were frozen in OCT and stored in −80° C. until sectioning. The brains were sectioned at 40 μM using a Leica CM1950 cryostat and stained free floating in a 24-well plate. To visualize EdU, the Click-iT Plus EdU Imaging Kit (Invitrogen) was used following the manufacturer's instructions. The sections were incubated with the blocking buffer consisting of 4% Normal Donkey Serum in 0.3% TPBS for 1 hr at RT and stained with anti-NeuN rabbit polyclonal ab (A60) (Millipore) overnight at 4° C. Sections were then stained with Donkey anti-rabbit Rhodamine secondary ab (Jackson) for 1 hour at RT. Sections were mounted onto glass slides and ProLong Gold Antifade solution (Invitrogen) was applied. Slides were imaged using a Zeiss Axio Observer fluorescence microscope with a 10× objective. Images were processed by the Zeiss Zen Blue software (Zeiss) and EdU$^+$ cells in the hippocampus DG region were tallied blindly.

Statistical Analysis—Wilcoxon rank-sum test was used to determine significance in single-cell RNA-seq data. Two-tailed Student's t-tests or ANOVA were used to calculate statistical significance in other experiments. P<0.05 was considered significant.

Example 2—Tissue-Resident ILC2 Accumulate in the Choroid Plexus of Aged Brains

Figure 1B:
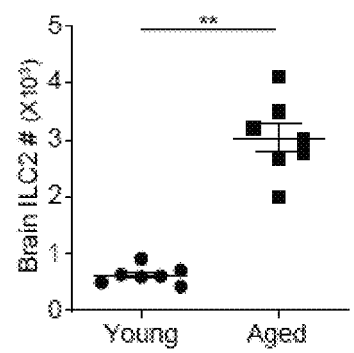
Figure 1C:
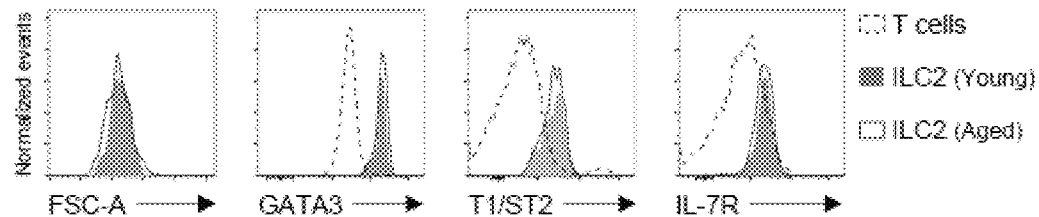
Figure 1D:
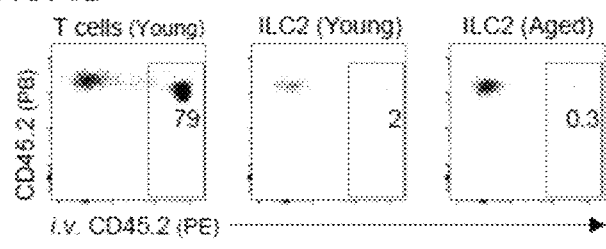
Figure 1E:
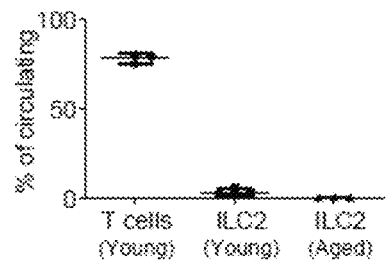
Figure 8:
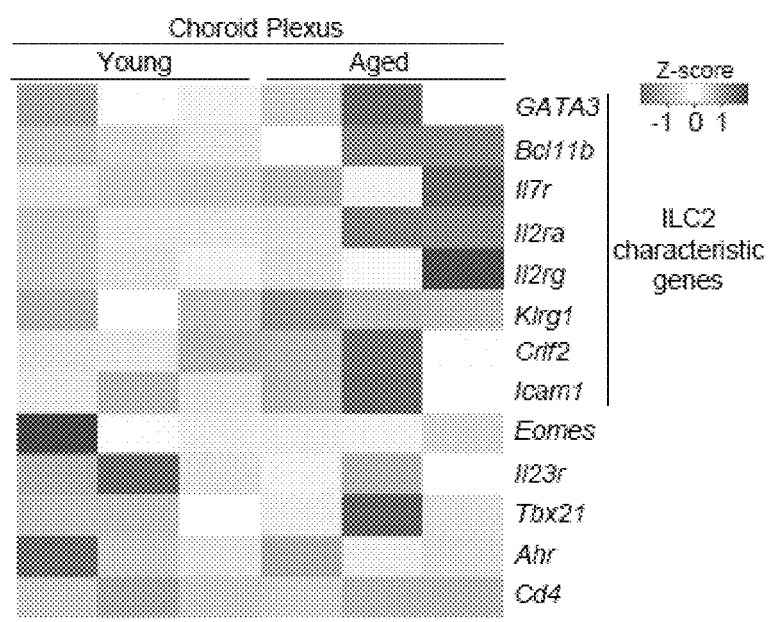
FIG. 8 demonstrates the expression of representative genes by genome-wide microarray analysis of the bulk choroid plexus tissue from young and aged mice.

The choroid plexus, which produces cerebrospinal fluid (CSF) and forms a specialized blood-CSF barrier, may harbor a variety of circulating and tissue-resident immune cells. To investigate the effects of aging on brain neuroimmunity, a genome-wide microarray analysis was performed comparing the gene expression profiles of the choroid plexus of young (2-3 months) versus aged (18-22 months) C57/BL6 mice. Interestingly, an upregulation of a range of ILC2 lineage characteristic genes in the choroid plexus of aged mice was detected, leading to the hypothesis that ILC2 may accumulate in the aged brain (FIG. 8). These genes include the master transcription factors Gata3 and Bcl11b that drive ILC2 development and maintain ILC2 identity; ILC2 characteristic cytokine receptors I/7r, I/2ra, I/2rg, and Crlf2; LC2 maturation marker Klrg1, and ILC2 characteristic adhesion molecule Icam1 (FIG. 8). Therefore, the cellularity and phenotype of ILC2 in the brains of young and aged mice was directly examined by flow cytometry. Indeed, aged mice had a 3-5 fold increase in ILC2 numbers in the brain over young mice (FIGS. 1A and 1B). ILC2 in aged brains were of comparable size and exhibited similar expression of key molecules such as GATA-3, T1/ST2 (IL-33R), and IL7R, to those in young mice (FIG. 1C). Next, an established intravenous anti-CD45.2 PE antibody labeling method was used to determine whether the accumulated brain ILC2 in aged mice were in circulation or tissue-resident (Anderson et al., "Intravascular Staining for Discrimination of Vascular and Tissue Leukocytes," *Nat. Protoc.* 9:209-222 (2014) and Andersson et al., "Eosinophils From Hematopoietic Stem Cell Recipients Suppress Allogeneic T Cell Proliferation," *Biol. Blood Marrow Transplant* 20:1891-1898 (2014), which are hereby incorporated by reference in their entirety). Almost no ILC2 were labeled with intravenously injected anti-CD45.2 PE antibody, indicating that ILC2 in both young and aged brains are non-circulating, brain-resident cells (FIGS. 1D and 1E). Together, tissue-resident ILC2 accumulate in the aged brain.

Figure 1F:
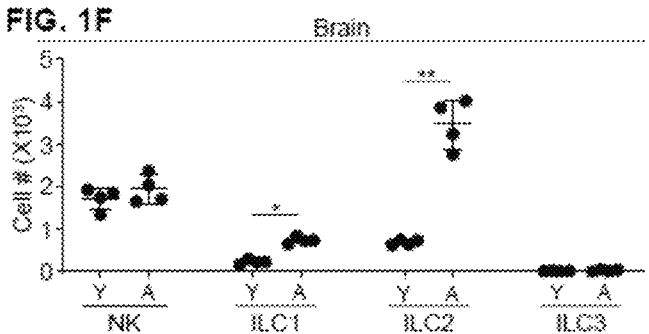

The other ILC subsets in the aged brain were next examined. NK cells were readily detectable in the brain, but their numbers remained unchanged with aging (FIG. 1F). ILC1 were rare, and were moderately increased in number with aging (FIG. 1F). ILC3 were barely detectable in the brain of either young or aged mice. Thus, ILC2 represent the major ILC subset that accumulate in the aged brain (FIG. 1F).

To determine the anatomic locality in which ILC2 reside, their distribution in different regions of aged brains was examined by flow cytometry. Brain parenchyma regions, including the cortex (CTX), prefrontal cortex (PFC), striatum (STR), thalamus (TH), hippocampus (HP), and subventricular zone (SVZ), were devoid of ILC2 (FIG. 2A). Notably, ILC2 were enriched in the choroid plexus (CP) of aged brains (FIG. 2A). Previous studies indicated that ILC2 were also present in the dura sinus of young mice (Gadani et al., "Characterization of Meningeal Type 2 Innate Lymphocytes and Their Response to CNS Injury," *J. Exp. Med.* 214:285-296 (2017), which is hereby incorporated by reference in its entirety). Because dura meninges were attached to the skull, they were not included in the whole brain preparation. The effects of aging on meningeal ILC2 was therefore additionally examined. Meninges attached to the brain parenchyma were referred to as "leptomeninges". Meningeal attached to the skull consisted of dura meninges and some arachnoid meninges, and were referred to as "dura/arachnoid meninges." ILC2 were hardly detectable in the leptomeninges of young or aged mice (FIG. 2A). Consistent with the previous report (Gadani et al., "Characterization of Meningeal Type 2 Innate Lymphocytes and Their Response to CNS Injury," *J. Exp. Med.* 214:285-296 (2017), which is hereby incorporated by reference in its entirety), a relatively large amount of ILC2 were detected in the meninges attached to the skull, which consisted of dura meninges and some arachnoid meninges (FIG. 2A). The number of dura/arachnoid meningeal ILC2 was moderately increased with aging (FIG. 2A). Of note, age-related increase of meningeal ILC2 was rather moderate (around only 2-fold), in contrast to the drastic accumulation of CP ILC2 with aging (FIG. 2A). Indeed, ILC2 represented a major lymphocyte subset in the choroid plexus of aged mice, making up around 50% of the lymphocytes present in the choroid plexus (FIG. 2B). The other ILC subsets, including NK cells, ILC1 and ILC3, were barely detectable in the CP of aged mice (FIG. 2C). Strikingly, unlike the aged brain, the choroid plexus of young mice did not contain a significant amount of ILC2, indicating that the accumulation of ILC2 in the choroid plexus is a signature of aging (FIGS. 2E and 2F). Whole mount immunofluorescence staining verified that ILC2 were readily detectable in the CP of aged mice, but not in the CP of young mice (FIG. 2G). The accumulation of ILC2 in CP was gradual with age, starting as early as 6 month of age (FIG. 2H). Flow cytometry analysis of choroid plexus tissue from deceased elderly people revealed that ILC2 were also a major subset of lymphocytes in the choroid plexus of aged humans (FIG. 2I). Human CP ILC2 in aged individuals expressed high amounts of CRTH2, but not c-Kit (FIG. 2J). Human CP ILC2 also expressed relatively high amounts of mRNA for IL5 and IL13, but not IL17A (FIG. 2J). Together, these data demonstrate that tissue-resident ILC2 accumulate in the choroid plexus of aged brains.

Figure 3A:
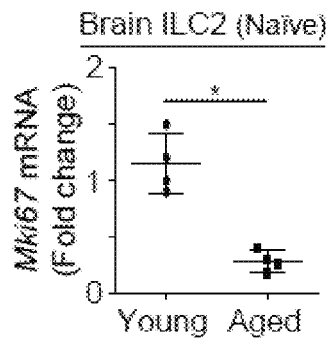
FIGS. 3A-3O show that ILC2 in the aged brain are long-lived, capable of switching between cell cycle quiescence and proliferation, and relatively resistant to cellular senescence and exhaustion.
Figure 3B:
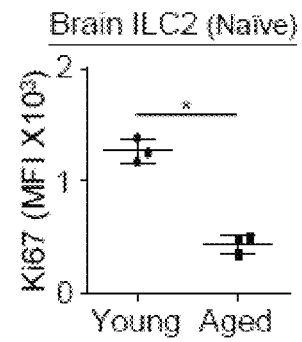
FIG. 3B shows mean fluorescence intensity of Ki67 in ILC2 from young and aged mice, assessed by intracellular staining and flow cytometry analysis. Data are from three mice per group, and representative of two independent experiments.
Figure 3C:
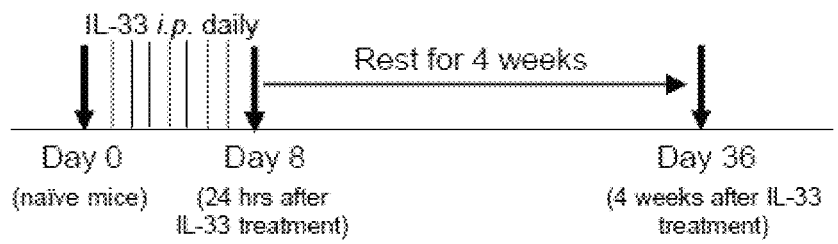
FIG. 3C shows a schematic for IL-33 injections for D to G. Young or aged mice were administrated with IL-33 daily for 7 days. Brain ILC2 in young and aged mice were examined at Day 0 (naïve mice), Day 8 (24 hours after the last IL-33 administration) and Day 36 (4 weeks after the last IL-33 administration).
Figure 3D:
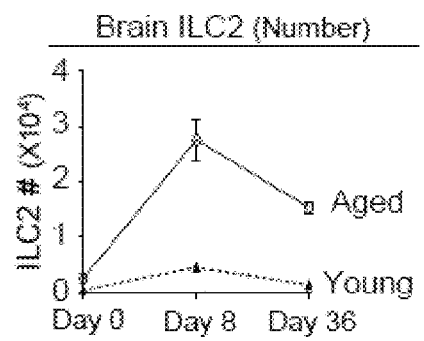
FIG. 3D depicts quantification of brain ILC2 numbers at Day 0, Day 8 and Day 36. Data are from 3-7 mice per group, representative of two independent experiments.
Figure 3E:
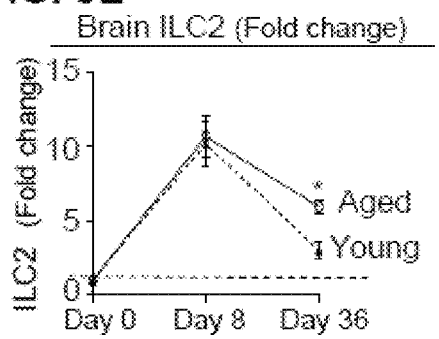
FIG. 3E shows fold change of brain ILC2 numbers at Day 0, Day 8 and Day 36. The average ILC2 number at Day 0 was arbitrarily set as 1. Data are from 3-7 mice per group, representative of two independent experiments.

Example 3—ILC2 in the Aged Brain are Long-Lived and Exhibit Enhanced Cellular Fitness To explore the mechanisms by which ILC2 accumulate in the aged brain, the proliferation capability and life span of brain ILC2 in young and aged mice was examined. Interestingly, compared to ILC2 in the brains of young mice, ILC2 from the aged brain expressed less Mki67 mRNA (FIG. 3A). Flow cytometry analysis verified that ILC2 from aged brains had significantly lower expression of Ki67 when compared to their young counterparts, indicating that aged rain ILC2 are in a deeper cell cycle quiescent state at homeostasis (FIG. 3B). To determine whether ILC2 in the aged brain are capable of proliferating, mice were treated with 400 ng of IL-33, a known ILC2 activator, daily for 7 days (FIG. 3C). Brain ILC2 from both young and aged mice vigorously proliferated in vivo in response to IL-33 (FIGS. 3D and 3E). The expansion of brain ILC2 at day 8 (24 hours after the last IL-33 administration) as measured by the fold change over day 0 (naïve mice) is similar between young and aged mice, indicating that the capability to respond to stimuli is preserved in aged brain ILC2 (FIGS. 3D and 3E). Intravenous anti-CD45.2 PE labeling revealed that local proliferation, but not recruitment from the periphery, is a signature of ILC2 activation in the brains of both young and aged mice (FIGS. 9A and 9B). The mice were then rested for 4 weeks and examined the cellularity of brain ILC2 again at day 36 (4 weeks after the last IL-33 administration). ILC2 in the brains of young mice experienced notable contraction after activation, with a drop of about 4-fold in cellularity at 4 weeks after the withdrawal of IL-33 treatment (FIGS. 3D and 3E). ILC2 from aged brains, however, only experienced a very moderate contraction after activation, less than 2-fold reduction in cell number (FIGS. 3D and 3E). Thus, ILC2 in the aged brain are long-lived and relatively resistant to contraction after replication stress.

EdU-chasing experiments were then used to better understand the longevity and persistence of ILC2 in the aged brain. More than half of the brain ILC2 were labeled with EdU during IL-33 treatment in both young and aged mice at day 8, verifying that aged brain ILC2 possess comparable proliferation capability as young brain ILC2 (FIG. 3F). Interestingly, a large percentage of EdU$^+$ ILC2 persisted in aged brains, but not in the brains of young mice, at 4 weeks after the withdrawal of IL-33 treatment (FIG. 3F). Thus, ILC2 in the aged brain are long-lived, persisting for a long period of time after the withdrawal of proliferation stimulus. Of note, the levels of EdU in ILC2 that persisted in aged brains after 4 weeks were surprisingly high with a minute reduction over time, leading to the hypothesis that these cells may rapidly return to cell cycle quiescence after the withdrawal of replication stress (FIG. 3F). Indeed, intracellular Ki67 staining suggested that ILC2 in aged brains, but not those in young mice, returned to cell cycle quiescence at 4 weeks after IL-33 treatment (FIG. 3G). Thus, ILC2 in the aged brain are capable of switching from proliferation to cell cycle dormancy after the withdrawal of replication stress. This capability may underlie their enhanced persistence after replication stress, because a return to cell cycle quiescence may protect these cells from DNA damage and other cellular insults. Indeed, ILC2 in the aged brain exhibited significantly reduced caspase activity than those in young mice at 3 weeks after the withdrawal of IL-33 treatment, indicating reduced apoptosis (FIG. 3H). Together, ILC2 in the aged brain were relatively resistant to contraction in response to replication stress.

Next, it was determined whether the previously activated ILC2 in aged brains can respond to subsequent secondary stimulation. Aged mice were treated with IL-33, rested them for 4 weeks, and then re-administrated IL-33 or PBS daily for 2 days (FIGS. 3I-3K). EdU diminished after re-administration with IL-33; indicating that these cells have vigorously proliferated upon secondary stimulation leading to the dilution of EdU (FIGS. 3I and 3J). Ki67 staining confirmed that ILC2 from aged brains indeed re-entered cell cycle upon re-activation by IL-33 (FIGS. 3I and 3K). Thus, ILC2 in aged brains are able to reversibly switch between cell dormancy and proliferation, which may underlie their enhanced persistence and gradual accumulation with age.

Figure 3O:
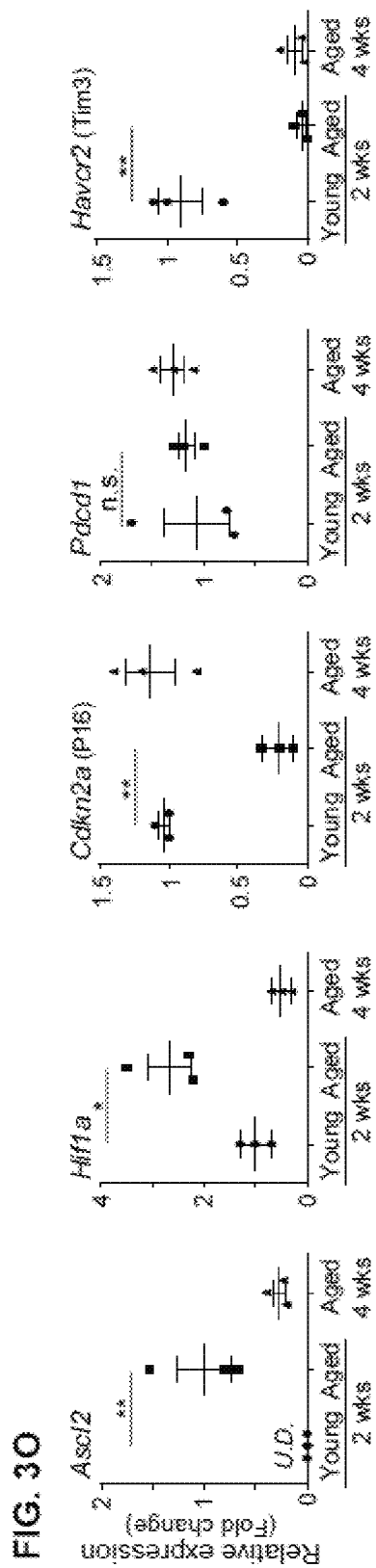

The capability to reversibly switch between dormancy and cell cycle has also been observed in hematopoietic stem cells which have the longest life span and most potent self-renewal potential (Wilson et al., "Hematopoietic Stem Cells Reversibly Switch From Dormancy to Self-Renewal During Homeostasis and Repair," *Cell* 135:1118-1129 (2008), which is hereby incorporated by reference in its entirety). Therefore, an in vitro culture assay was used to examine the self-renewal capability of ILC2 in the aged brain. ILC2 from both the brains of young and aged mice vigorously proliferated when cultured with IL-33 (FIG. 3L). However, while ILC2 from the brains of young mice proliferated only up to 2 weeks, ILC2 from aged brains proliferated for more than 4 weeks without signs of exhaustion (FIG. 3L). The growth of all cultures eventually slowed down to various degrees beyond 4 weeks of culture (not shown). Hence, ILC2 from aged brains exhibited enhanced long-term self-renewal capability in vitro. The long-term cultured ILC2 from aged brains are functionally robust; they produced large amounts of the ILC2 signature cytokines IL-5 and IL-13 even after 4 weeks of culture (FIG. 3M). ILC2 in the aged brain exhibited similar functional capability as ILC2 in other organs (FIG. 3M). They produced low amounts of the anti-inflammatory cytokine IL-10 (FIG. 3M). They did not secrete IL-4 protein (FIG. 3M), though mRNA for IL-4 was detected by RNA-Sequencing (RNA-Seq). They did not produce cytokines characteristic of alternative lymphocyte lineages, such as IL-17, IFNα or IL-22, verifying that they were committed to the ILC2 lineage (FIG. 3M). RNA-Seq indicated that ILC2 from aged brains can maintain high bioenergetics even under prolonged replication stress, as demonstrated by the high expression of oxidative phosphorylation genes at 2 weeks of culture (FIG. 3N). Consistent with their enhanced self-renewal capability, ILC2 from aged brains expressed high amounts of Ascl2 and Hif1a, the transcription factors that promote stem cell self-renewal (FIGS. 3N and 3O). Interestingly, at 2 weeks of culture, ILC2 isolated from aged brains expressed much lower levels of Cdkn2a (encoding P16) than their young counterpart, indicating that the P16-driven cellular senescence pathway may have been repressed in aged brain ILC2 (FIGS. 3N and 3O). Cdkn2a expression, however, eventually increased after 4 weeks of culture, suggesting that P16-driven cellular senescence pathway was delayed but not completely abolished in aged brain ILC2 (FIG. 3O). When compared to young brain ILC2, ILC2 from aged brains also had remarkably lower expression of the lymphocyte exhaustion marker Havcr2 and the expression remained low over time in culture, indicating that lymphocyte exhaustion may also be suppressed in aged brain ILC2 (FIGS. 3N and 3O). Together, ILC2 from the aged brain are relatively resistant to cellular senescence and exhaustion, which may lead to enhanced long-term self-renewal capability.

Example 4—ILC2 in Aged Brains are Functionally Quiescent at Homeostasis, but can Produce Large Amounts of IL-5 and IL-13 In Vivo in Response to Exogenous Stimuli Next, how aging affects brain ILC2 functionality was investigated. ILC2 are known to produce basal levels of cytokines at homeostasis (Nussbaum et al., "Type 2 Innate Lymphoid Cells Control Eosinophil Homeostasis," *Nature* 502:245-248 (2013), which is hereby incorporated by reference in its entirety). Using intracellular cytokine staining, the expression of IL-5 and IL-13 in brain ILC2 in naïve young mice was detected (FIGS. 4A and 4B). However, ILC2 in aged brains had markedly reduced expression of both IL-5 and IL-13 at homeostasis (FIGS. 4A and 4B). Thus, not only are aged brain ILC2 in deep cell cycle dormancy, but they are also functionally quiescent in homeostatic states.

It was next examined whether ILC2 from aged brains can be activated to produce cytokines in response to exogenous stimuli. Indeed, brain ILC2 from both young and aged mice produced large amounts of IL-5 and IL-13 in response to in vivo IL-33 treatment (FIGS. 4C and 4D). The production of IL-5 and IL-13 by brain ILC2 were comparable between IL-33 treated young and aged mice (FIGS. 4C and 4D). Hence, despite functional quiescence at homeostasis, ILC2 in the aged brain have preserved potent functional capability to respond to exogenous stimuli.

Figure 4F:
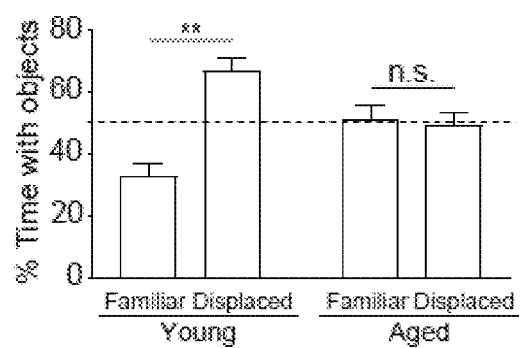
Figure 4G:
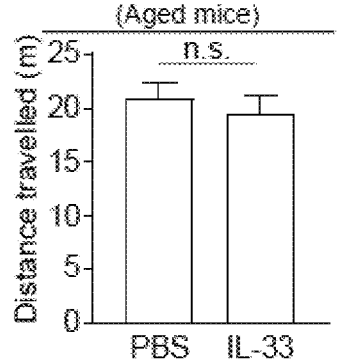
Figure 4H:
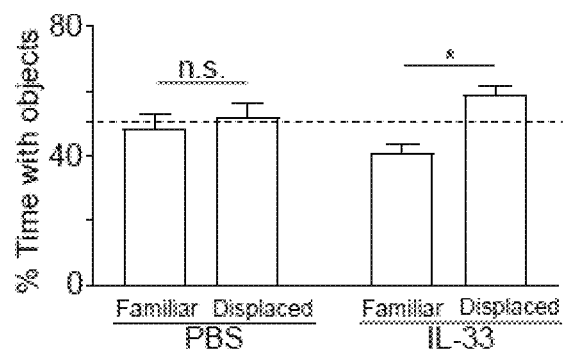

To understand whether ILC2 activation may influence the cognitive function of aged mice, an established Object Placement Test was used to examine spatial recognition Zuloaga et al., "High Fat Diet-induced Diabetes in Mice Exacerbates Cognitive Deficit Due to Chronic Hypoperfusion," *J. Cereb. Blood Flow Metab.* 36:1257-1270 (2016),), which is hereby incorporated by reference in its entirety). Mice were allowed to explore two identical objects placed in a box. After 24 hours, one of the objects was moved to a new location (displaced object) and mice were allowed to explore the familiar and the displaced objects (FIG. 4E). Young mice spent the majority of the time exploring the displaced object; whereas aged mice showed no preference between the 2 objects, indicating a loss of spatial recognition with aging (FIG. 4F). It was next examined whether IL-33 treatment may influence the cognitive function of age mice. IL-33 treatment did not significantly affect the overall motor capability of aged mice (FIG. 4G). IL-33 treated aged mice, however, spent significantly more time interacting with the displaced object over the familiar one in the Object Placement Test, suggesting improved spatial recognition (FIG. 4H). Thus, ILC2 activation may be associated with improved cognitive function in aged mice.

Example 5—Activated ILC2 can Improve the Cognitive Function of Aged Mice

Figure 5A:
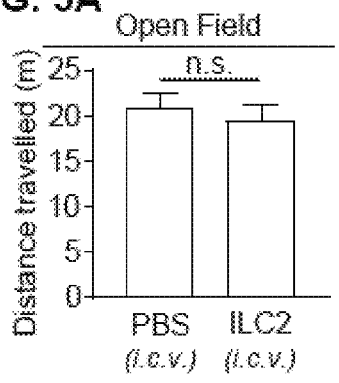
Figure 5B:
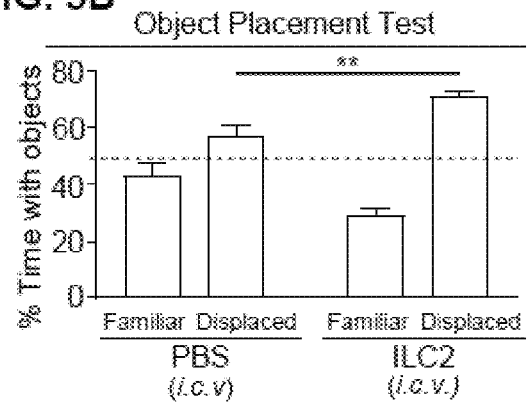
Figure 5C:
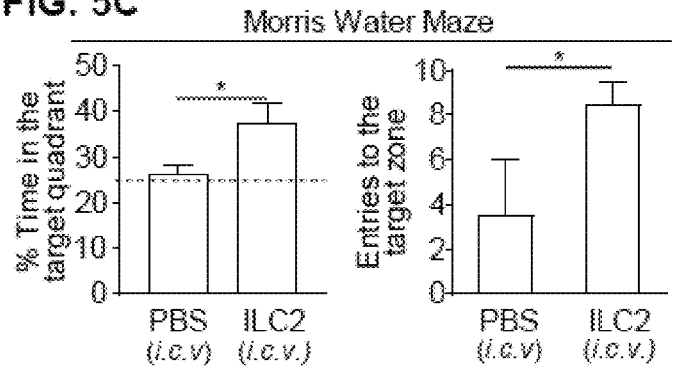
Figure 10:
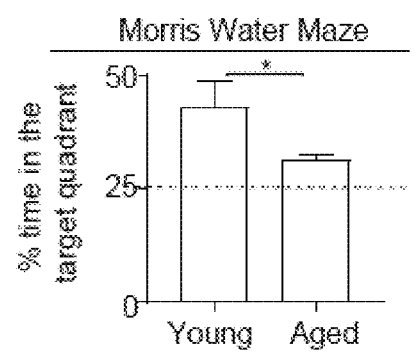
FIG. 10 shows that spatial memory declines with aging in Morris Water Maze Test. Morris Water Maze test was performed with young or aged mice. Percentages of time spent in the target quadrant were quantified. Data are from 6-8 mice per group, representative of two independent experiments. *, $p<0.05$.

To directly examine whether activated ILC2 can improve the cognitive function of aged mice, ILC2 was sorted from aged brains, and expanded and activated them in vitro with SCF, IL-7, IL-2 and IL-33. The in vitro activated ILC2 was then transferred into the brains of aged mice by intracerebroventricular (i.c.v.) injection. Transfer of activated ILC2 did not significantly affect the overall motor capability of aged mice (FIG. 5A). Interestingly, transfer of activated ILC2 drastically enhanced cognitive function of aged mice during Object Placement Test (FIG. 5B). Morris Water Maze Test was additionally performed, in which aged mice exhibited reduced spatial memory (FIG. 10). Morris Water Maze verified that aged mice which received i.c.v. transfer of activated ILC2 displayed significantly enhanced spatial memory, as demonstrated by increased percentage of time spent in the target quadrant as well as increased number of entries into the target zone during the probe trial (FIG. 5C). Together, these data provide direct evidence that activated ILC2 can improve the cognitive function of aged mice.

Figure 5D:
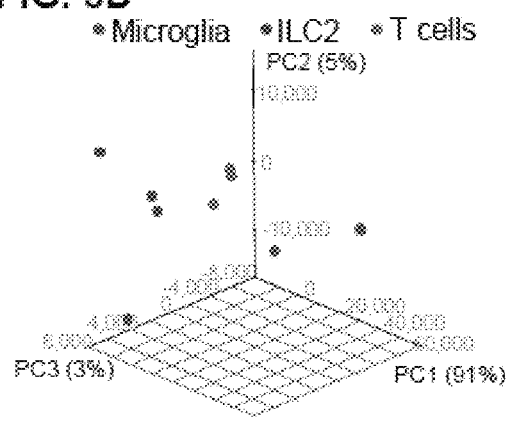

To explore the molecular mechanisms by which activated ILC2 lead to improved cognitive function in aged mice, RNA-Seq was performed to compare the transcriptomes of ILC2, $CD3^+$ T cells, and microglia in the brains of IL-33 treated aged mice. While microglia in aged brains displayed great transcriptomal heterogeneity, ILC2 in aged brains were relatively homogeneous and transcriptionally close to T cells (FIG. 5D). Around 3000 genes were differentially expressed between ILC2 and microglia, and about 700 differentially expressed genes between ILC2 and T cells were identified (FIGS. 5E and 5F). Genes differentially expressed between ILC2 and microglia were enriched for effector molecules including cytokines, cell adhesion molecules, and phagocytosis genes (FIG. 5G). Similarly, genes differentially expressed between ILC2 and T cells were also overrepresented by effector molecules such as cytokines, chemokines and cell adhesion molecules (FIG. 5G). By overlapping the two lists of differentially expressed genes, 161 genes were identified that were highly expressed by ILC2, but not by T cells or microglia, in the brains of IL-33 treated aged mice (FIGS. 5H-5J). Notably, these 161 genes were enriched for cytokines/cytokine receptors genes, chemokine signaling molecules, as well as hippo signaling, suggesting ILC2 in aged brains may possess unique functional capability (FIG. 5H). In addition to IL-5 and IL-13, ILC2 in aged brains also expressed high amounts of several growth factors that may promote neural survival, stimulate neurogenesis, or enhance lymphatic drainage (FIGS. 5I and 5J). They included known ILC2 products such as Areg, Arg1, and Bmp7; as well as previously unreported effector molecules such as Vegfc and Lif (FIGS. 5I and 5J) (Brombacher et al., "IL-13-Mediated Regulation of Learning and Memory," *J. Immunol.* 198: 2681-2688 (2017); Chen et al., "Microglia and Neuroprotection," *J. Neurochem.* 136 Suppl 1:10-17 (2016); Da Mesquita et al., "Functional Aspects of Meningeal Lymphatics in Ageing and Alzheimer's Disease," *Nature* 560:185-191 (2018); Davis et al., "The Role of the Leukemia Inhibitory Factor Receptor in Neuroprotective Signaling," *Pharmacol. Ther.* 183:50-57 (2018); de Rivero Vaccari et al., "Neuroprotective Effects of Bone Morphogenetic Protein 7 (BMP7) Treatment After Spinal Cord Injury," *Neurosci. Lett.* 465:226-229 (2009); Ito et al., "Brain Regulatory T Cells Suppress Astrogliosis and Potentiate Neurological Recovery," *Nature* 565:246-250 (2019); Kiyota et al., "Granulocyte-Macrophage Colony-Stimulating Factor Neuroprotective Activities in Alzheimer's Disease Mice," *J. Neuroimmunol.* 319:80-92 (2018); Monticelli et al., "Arginase 1 is an Innate Lymphoid-cell-intrinsic Metabolic Checkpoint Controlling Type 2 Inflammation," *Nat. Immunol.* 17:656-665 (2016); Nussbaum et al., "Type 2 Innate Lymphoid Cells Control Eosinophil Homeostasis," *Nature* 502:245-248 (2013); and Robinette et al., "Transcriptional Programs Define Molecular Characteristics of Innate Lymphoid Cell classes and Subsets," *Nat. Immunol.* 16:306-317 (2015), all of which are hereby incorporated by reference in their entirety). A number of pro-inflammatory cytokines, such as Il1a, Il1b, Il18, Il15 and Tnf, were highly expressed by microglia in the aged brain (FIG. 5J). Genes indicating a reparative phenotype, such as Arg1 and Nos1, were not significantly expressed in aged microglia even after IL-33 treatment. T cells in the aged brain were biased towards Th1 and Th17 phenotype (FIG. 5J). Expression of type-2 cytokines were nearly undetectable in aged brain T cells (FIG. 5J). Flow cytometry analysis verified that T cells in aged brains failed to produce a significant amount of type-2 cytokines IL-5 or IL-13 in response to IL-33 (FIGS. 5K-5L). Together, aged brain ILC2 exhibited a unique transcriptomal profile and were the predominant source of type-2 cytokines as well as a number of other effector molecules in response to IL-33.

Example 6—CP ILC2 Possess More Potent Capability to Proliferate and to Produce Type-2 Cytokines than Meningeal ILC2

Figures 6A, 6B, 6C, 6D, 6E, 6F:
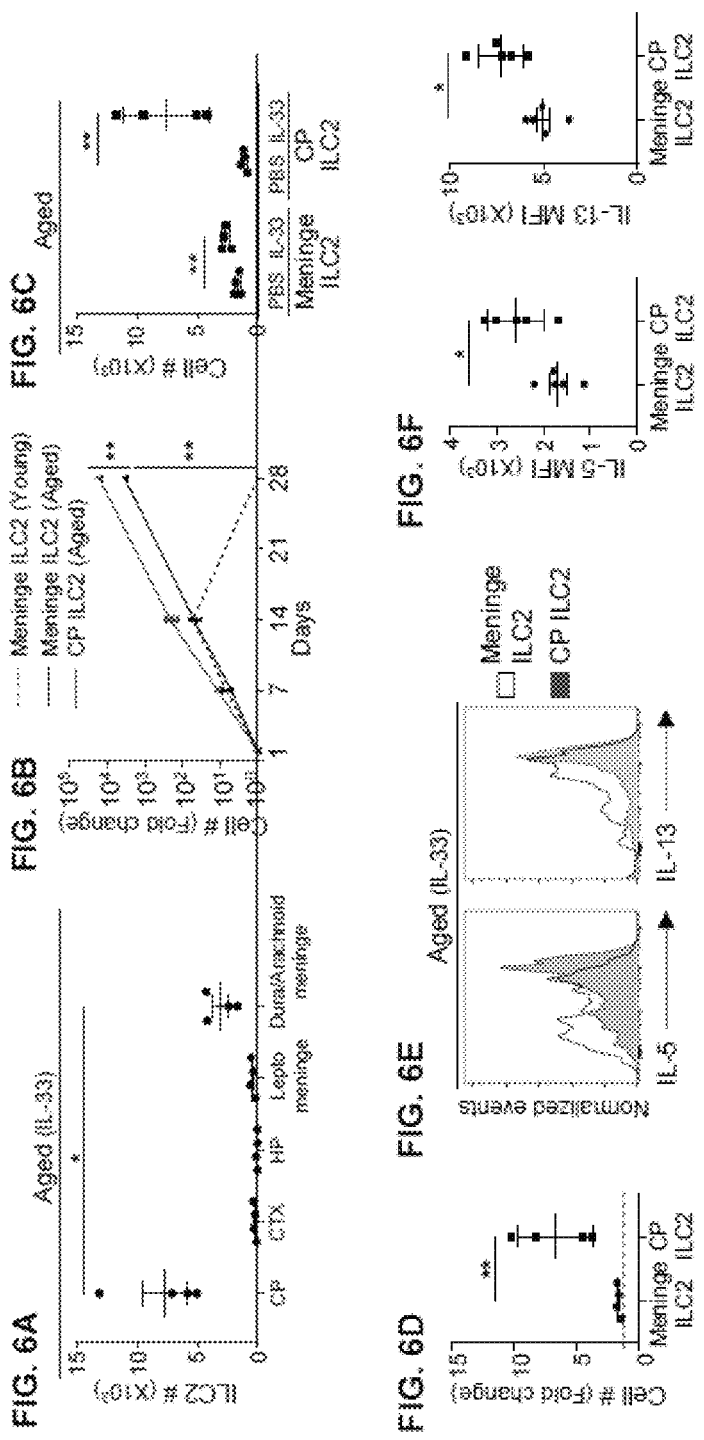
Figure 11A:
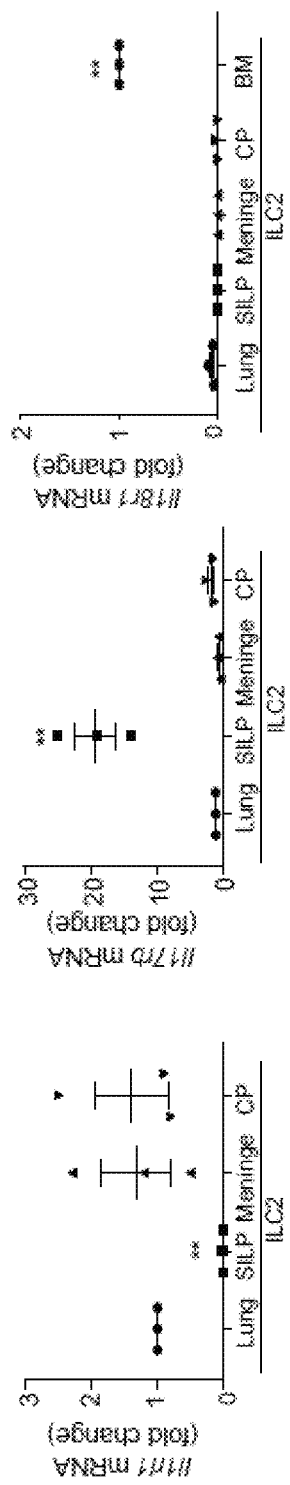
FIGS. 11A-11B show the expression of cytokine receptors in meninge and CP ILC2 of aged mice.
Figure 11B:
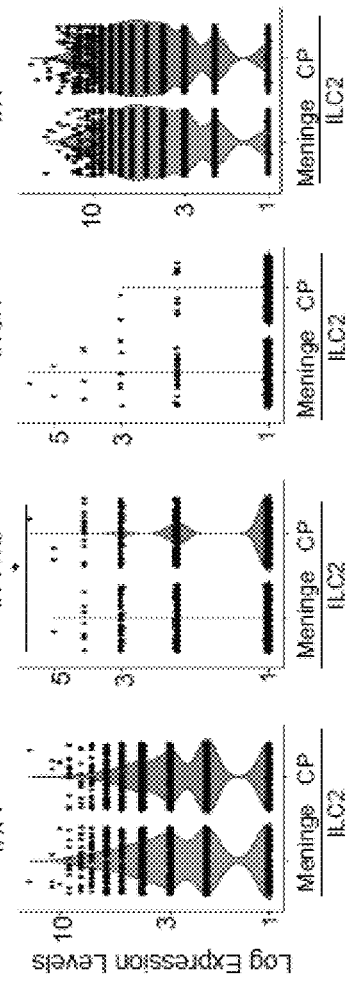

Next to be examined was the anatomic distribution of ILC2 in the brains of IL-33 treated aged mice. ILC2 remained enriched in the CP of aged mice following IL-33 treatment, although a significant amount of ILC2 were also detected in the meninges of IL-33 treated aged mice (FIG. 6A). The proliferative and functional capability of meningeal and CP ILC2 was next compared. First, ILC2 was sorted and cultured with IL-2, IL-7, IL-33 and SCF in vitro (FIG. 6B). Interestingly, both meningeal and CP ILC2 isolated from aged mice, but not meningeal ILC2 from young mice, proliferated for more than 4 weeks (FIG. 6B). Thus, the resistance to cellular senescence might be conferred by aging, regardless of the specific anatomic sites in the brain. Nevertheless, compared to meningeal ILC2, CP ILC2 in aged mice appeared to proliferate more rigorously in vitro (FIG. 6B). Then, the in vivo proliferative and functional capability of meningeal and CP ILC2 in aged mice was compared (FIGS. 6C-6F). Indeed, compared to meningeal ILC2, CP ILC2 possess much more potent capability to proliferate in vivo in response to IL-33 (FIGS. 6C and 6D). CP ILC2 number increased more than 7-fold in response to IL-33 treatment, whereas meningeal ILC2 number increased only around 2-fold (FIGS. 6C and 6D). CP ILC2 in IL-33 treated aged mice also expressed higher amounts of both IL-5 and IL-33 than meningeal ILC2 (FIGS. 6E and 6F). Of note, meningeal and CP ILC2 from aged mice expressed comparable amounts of Il1rl1 (encoding IL-33R), indicating that other mechanisms underlie their functional difference (FIG. 11). Together, CP ILC2 possess more potent capability to proliferate and to produce type-2 cytokines in response to IL-33 than meningeal ILC2.

Figure 6L:
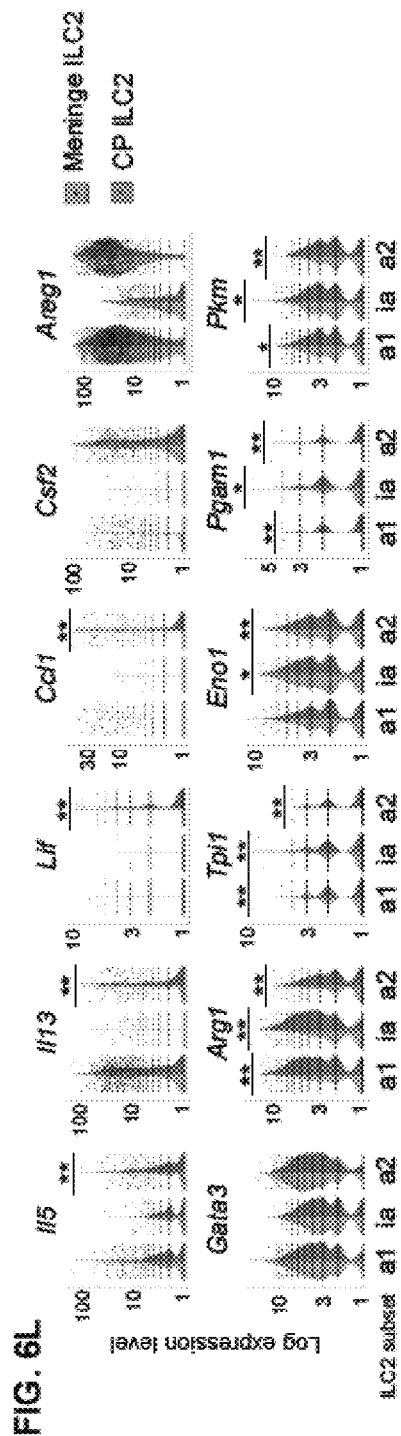

Next, single-cell RNA-seq was performed to compare the transcriptomes of meningeal ILC2 and CP ILC2 in IL-33 treated aged mice. The purpose of IL-33 treatment was to better assess the functional capability of ILC2. First examined was the merged population consisting of both meningeal and CP ILC2. Three distinct ILC2 subsets in IL-33 treated aged mice were identified using Uniform Manifold Approximation and Projection (UMAP) (FIG. 6G). These three subsets were named $ILC2_{ia}$, $ILC2_{a1}$ and $ILC2_{a2}$ (FIG. 6G). $ILC2_{ia}$ expressed lower amounts of type 2 cytokines as well as other effector molecules than the other subsets, and therefore might represent a relatively inactive subset (FIG. 6H). $ILC2_{a1}$ and $ILC2_{a2}$ represented two activated ILC2 subsets with distinct transcriptional profiles (FIGS. 6G and 6H). Notably, $ILC2_{a1}$ expressed higher amounts of Arg1 and Il13, whereas $ILC2_{a2}$ expressed higher amounts of Csf2 (FIG. 6H). Gata3 expression was comparable among all three subsets (FIG. 6H). Next, the single-cell transcriptomes were compared between meningeal ILC2 and CP ILC2. Interestingly, CP ILC2 contained higher proportion of $ILC2_{a1}$, whereas meningeal ILC2 contained higher proportion of $ILC2_{a2}$ (FIGS. 6I and 6J). Consistent with this pattern, CP ILC2 expressed higher amounts of Il13, and meningeal ILC2 expressed higher amounts of Csf2 (FIG. 6K). CP ILC2 also expressed higher amounts of Il5 than meningeal ILC2 (FIG. 6K). In particular, although meningeal ILC2 had increased proportion of the $ILC2_{a2}$ subset, meningeal $ILC2_{a2}$ expressed significantly lower amounts of multiple effector molecules, including Il5, Il13, Lif and Ccl1, than the CP $ILC2_{a2}$ (FIG. 6L). Thus, meningeal ILC2 had reduced proportion of $ILC2_{a1}$ cells and their $ILC2_{a2}$ subset also exhibited a less activated phenotype than CP counterparts, leading to reduced cytokine-producing activity than CP ILC2.

Notably, all subsets of CP ILC2 expressed markedly higher amounts of the urea cycle enzyme Arg1 than the meningeal ILC2 subsets (FIGS. 6K and 6L). Previous work indicated that Arg1 might control the glycolysis of activated ILC2 (Bando et al., "Type 2 Innate Lymphoid Cells Constitutively Express Arginase-I in the Naive and Inflamed Lung," *J. Leukoc. Biol.* 94:877-884 (2013) and Monticelli et al., "Arginase 1 is an Innate Lymphoid-cell-intrinsic Metabolic Checkpoint Controlling Type 2 Inflammation," *Nat. Immunol.* 17:656-665 (2016), both of which are hereby incorporated by reference in their entirety). Indeed, CP ILC2 expressed higher amounts of multiple essential glycolytic enzyme genes than meningeal ILC2, suggesting enhanced glycolysis (FIGS. 6K and 6L). These genes included Tpi1 (encoding triosephosphate isomerase 1), Enos1 (encoding alpha-enolase), Pgam1 (encoding phosphoglycerate mutase 1), and Pkm (encoding pyruvate kinase) (FIGS. 6K and 6L). The increased expression of Arg1 and glycolytic enzyme genes likely underlies the enhanced proliferative and cytokine-producing capability of CP ILC2.

Recent work indicates that ILC2 in distinct organs express different levels of cytokine receptor, which might be related to their differential developmental origins (Ricardo-Gonzalez et al., "Tissue Signals Imprint ILC2 Identity with Anticipatory Function," *Nat. Immunol.* 19:1093-1099 (2018) and Schneider et al., "Tissue-Resident Group 2 Innate Lymphoid Cells Differentiate by Layered Ontogeny and In Situ Perinatal Priming," *Immunity* 50:1425-1438 e1425 (2019), which are hereby incorporated by reference in their entirety). Therefore, gene expression of various cytokine receptors in meningeal and CP ILC2 were examined. QPCR and scRNA-seq data revealed that both meningeal and CP ILC2 in aged mice expressed high amounts of Il1r1 (encoding IL-33R), but not Il17rb (encoding IL-25R) or Il18r1 (FIGS. 12A-12B). Thus, the cytokine receptor expression patterns of aged meningeal and CP ILC2 most closely resemble those of lung ILC2.

Together, ILC2 in the CP of aged mice possess enhanced capability to proliferate and to produce type-2 cytokines in response to IL-33. In addition, activated CP ILC2 in aged mice exhibit a unique transcriptome pattern that might reflect distinctive functional capability and metabolism pathway.

Example 7—IL-5 Improves the Cognitive Function of Aged Mice

To understand the specific effector molecules by which activated ILC2 enhances the cognitive function in aged mice, recombinant IL-5 or IL-13 was administered to aged mice. IL-13 has been shown to promote spatial learning and memory in young mice (Brombacher et al., "IL-13-Mediated Regulation of Learning and Memory," *J. Immunol.* 198: 2681-2688 (2017), which is hereby incorporated by reference in its entirety); whereas whether IL-5 might affect cognitive function remains unknown. Surprisingly, administration of IL-5, but not IL-13, improved the cognitive function of aged mice in Object Placement Test (FIG. 7A). Morris Water Maze verified that IL-5 treated aged mice had enhanced spatial learning and memory, as demonstrated by the higher percentage of time spent in the target quadrant (FIG. 7B). IL-5 treatment did not significantly affect the general motor capability of aged mice (FIGS. 12A-12C). IL-5 treatment also did not significantly alter spatial recognition of young mice (FIGS. 12B and 12C). Together, IL-5, but not IL-13, is sufficient to improve cognitive function in aged mice.

Figure 13A:
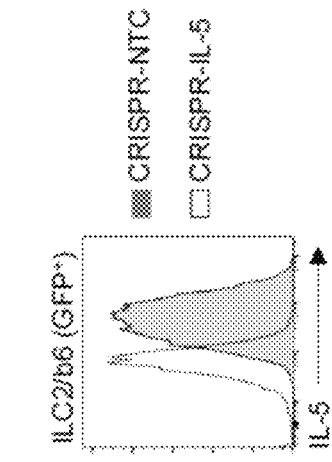
FIGS. 13A-13B show the efficient deletion of IL-5 in ILC2/b6 cells by CRISPR-mediated gene knockout technique.
Figure 13B:
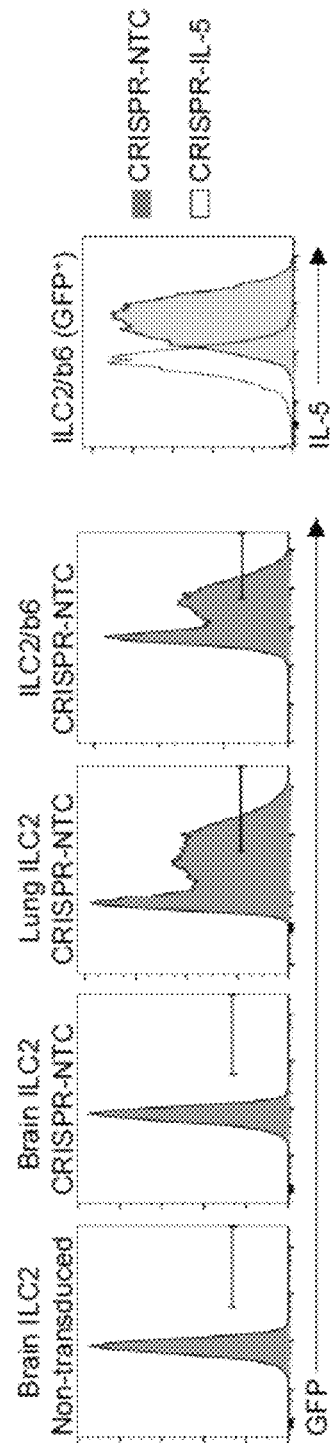

It was sought to understand whether activated ILC2 can alleviate aging-associated cognitive decline through the production of IL-5. It was attempted to delete IL-5 in activated ILC2 using lenti-CRISPRv2-GFP knockout vectors (Walter et al., "Systematic In Vivo Inactivation of Chromatin-Regulating Enzymes Identifies Setd2 as a Potent Tumor Suppressor in Lung Adenocarcinoma," *Cancer Res.* 77:1719-1729 (2017), which is hereby incorporated by reference in its entirety). Nevertheless, ILC2 from the aged brain were resistant to lentiviral transduction in vitro (FIG. 13A). Therefore, ILC2/b6 cell line was used, an immortalized ILC2 line derived from small intestinal laminal propria (Shen et al., "Cutting Edge: Core Binding Factor beta Is Required for Group 2 Innate Lymphoid Cell Activation," *J. Immunol.* 202:1669-1673 (2019) and Zhang et al., "Cutting Edge: Notch Signaling Promotes the Plasticity of Group-2 Innate Lymphoid Cells," *J. Immunol.* 198:1798-1803 (2017), both which are hereby incorporated by reference in their entirety). Similar to ILC2 in the aged brains, ILC2/b6 cell line vigorously proliferate and produced large amounts of IL-5 and IL-13 in vitro, and they lacked the production of alternative lineage effector molecules such as IL-17 or IFNα Shen et al., "Cutting Edge: Core Binding Factor beta Is Required for Group 2 Innate Lymphoid Cell Activation," *J. Immunol.* 202:1669-1673 (2019) and Zhang et al., "Cutting Edge: Notch Signaling Promotes the Plasticity of Group-2 Innate Lymphoid Cells," *J. Immunol.* 198:1798-1803 (2017), both which are hereby incorporated by reference in their entirety). ILC2/b6 cells were cultured and activated in vitro, and efficiently deleted IL-5 in ILC2/b6 cells using the Lenti-CSIRPRv2-GFP construct containing a gRNA sequence that targeted IL-5 (FIG. 13B). Non-target control (NTC) gRNA was used as control (FIG. 13B). Activated IL-5 deficient or control ILC2/b6 cells were then transferred into aged mice by i.c.v. injection (FIG. 7C). Notably, transfer of control ILC2/b6 cells, but not IL-5 deficient ILC2/b6, significantly enhanced spatial recognition of aged mice in Object Placement Test (FIG. 7C). Thus, activated ILC2 may alleviate aging-/d cognitive decline through the production of IL-5.

It was next examined whether IL-33 may improve the cognitive function of aged mice through IL-5 dependent mechanisms. Aged mice were treated with IL-33, together with i.c.v. injection of anti-IL-5 neutralizing antibody or isotype control (FIG. 7D). Anti-IL-5 treatment reduced the cognitive function of IL-33-treated aged mice, suggesting that IL-33 might alleviate aging-associated cognitive decline through IL-5 dependent mechanisms (FIG. 7D). Together, the results highlight a novel role for IL-5 in alleviating aging-associated cognitive decline.

It was sought to understand the mechanisms by which IL-5 promotes the cognitive function of aged mice. Compared to PBS treated mice, IL-5 treatment increased the number of EdU$^+$ cells at the dentate gyrus (DG) region of the hippocampus following in vivo EdU labeling, indicating enhanced hippocampal neurogenesis (FIG. 7E). Because reduced neuroinflammation is often associated with enhanced neurogenesis and improved cognitive function, RNA-Seq was performed to examine the transcriptome changes in brain-resident T cells and microglia, two major sources of pro-inflammatory cytokines in the aged brain. Notably, in vivo IL-5 treatment reduced the expression of the pro-inflammatory cytokine Tnf in CD3$^+$ T cells of the aged brain (FIG. 7F). Because elevated TNFα levels are known to impair neurogenesis and cognitive function (Faraco et al., "Dietary Salt Promotes Neurovascular and Cognitive Dysfunction Through a Gut-Initiated TH17 Response," *Nat. Neurosci.* 21:240-249 (2018); Habbas et al., "Neuroinflammatory TNFalpha Impairs Memory via Astrocyte Signaling," *Cell* 163:1730-1741 (2015); Liu et al., "Interleukin-17 Inhibits Adult Hippocampal Neurogenesis," *Sci. Rep.* 4:7554 (2014); and Terrando et al., "Tumor Necrosis Factor-alpha Triggers a Cytokine Cascade Yielding Postoperative Cognitive Decline," *Proc. Natl. Acad. Sci. USA* 107:20518-20522 (2010), all of which are hereby incorporated by reference in their entirety), the reduced expression of Tnf likely contributes to improved learning and memory in IL-5 treated aged mice. In contrast, the expression of anti-inflammatory growth factors including Tgfb2 and Areg was increased by IL-5 treatment in T cells of the aged brain (FIG. 7F). The expression of Th1 and Th2 characteristic molecules, including Ifng and Il4 respectively, were not significantly altered by IL-5 treatment (FIG. 7F). The expression of Treg characteristic genes Il10 and Foxp3 were barely detectable. Next, flow cytometry analysis was performed to examine the number and cytokine production of T cells in the aged brain. Notably, aging leads to the accumulation of CD8$^+$ T cells that produced high amounts of TNFα, and IL-5 treatment reduced the number as well as TNFα expression of CD8$^+$ T cells in the aged brain (FIGS. 7G-7I). In contrast, IL-5 treatment did not significantly alter the number or TNFα expression of CD4$^+$ T cells in aged mice (FIGS. 7G-7I). Intravenous labeling of anti-CD45.2 antibody revealed that the majority of CD8$^+$ T cells that accumulated in the aged brain were non-circulating, tissue-resident cells (FIGS. 7J and 7K). In particular, tissue-resident CD8$^+$ T cells drastically accumulated in the CP of aged mice, and their number was reduced by IL-5 treatment (FIG. 7L). Together, IL-5 treatment restrains T cell inflammation, especially TNFα expression, which might lead to improved neurogenesis and enhanced cognitive function of the aged brain.

TNFα may also induce myeloid cells to produce neurodestructive pro-inflammatory molecules, such as TNFα itself, IL-1α, and IL-15 (Di Paolo et al., "Interdependence Between Interleukin-1 and Tumor Necrosis Factor Regulates TNF-Dependent Control of *Mycobacterium tuberculosis* Infection," *Immunity* 43:1125-1136 (2015); Pan et al., "Cerebral microvascular IL15 is a Novel Mediator of TNF Action," *J. Neurochem.* 111:819-827 (2009); and Yarilina et al., "TNF Activates an IRF1-dependent Autocrine Loop Leading to Sustained Expression of Chemokines and STAT1-dependent Type I interferon-response Genes," *Nat. Immunol.* 9:378-387 (2008), all of which are hereby incorporated by reference in their entirety). Therefore, microglia in IL-5 treated aged mice were also examined. Microglia in IL-5 treated aged mice were moderately reduced in numbers, and exhibited a less activated phenotype as demonstrated by reduced surface CD68 expression (FIGS. 7M-7O). RNA-Seq revealed that microglia in IL-5-treated aged mice had an extensive reduction in the expression of TNFα signaling molecules, including TFNα receptors and downstream signaling molecules and transcriptional regulators (FIG. 7N). The expression of TNFα-induced pro-inflammatory cytokines, including TNFα itself, Il-1b, and Il-15, were also reduced in aging microglia after in vivo IL-5 treatment (FIG. 7N). The expression of TNFα-independent pro-inflammatory signaling molecules, such as Il18 and Stat2, were not significantly reduced by IL-5 treatment (FIG. 7N). Together, IL-5 also reduces microglia inflammation, possibly by decreasing TNFα signaling.

Figure 14:
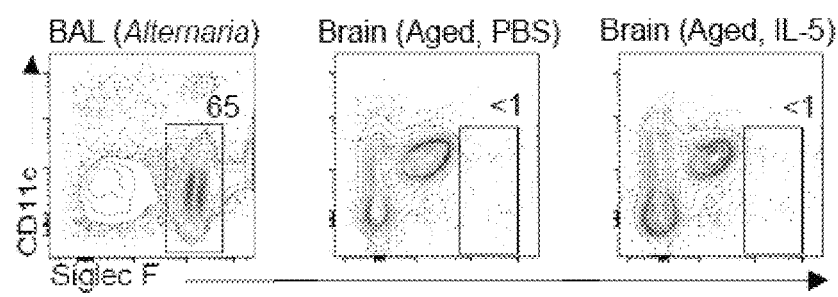
FIG. 14 shows that Eosinophils were not detected in the brains of IL-5 treated aged mice. Aged mice were treated with IL-5 daily for 2 days. Brains were harvested and immune cells were examined by flow cytometry analysis at 24 hours after last injection. Bronchoalveolar lavage (BAL) cells from young mice that inhaled 40 ug of *Alternaria* extract daily for three days were used as positive controls for eosinophil staining. Data are from 3 mice per group, representative of two independent experiments.
Figure 15A:
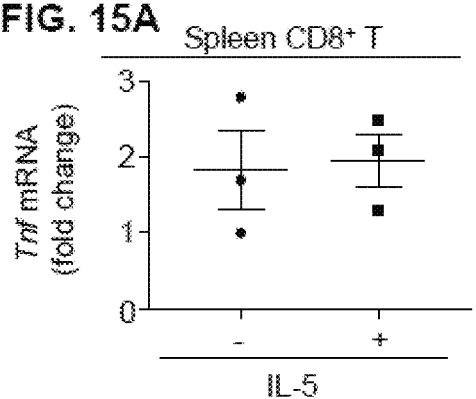
FIGS. 15A-15B show that exposure to IL-5 did not affect Tnf expression or the apoptosis of $CD8^+$ T cells sorted from the spleens of aged mice. Spleen CD8+ T cells were sorted from aged mice and culture with anti-CD3, anti-CD8, IL-7 and IL-2, in the presence or absence of IL-5.
Figure 15B:
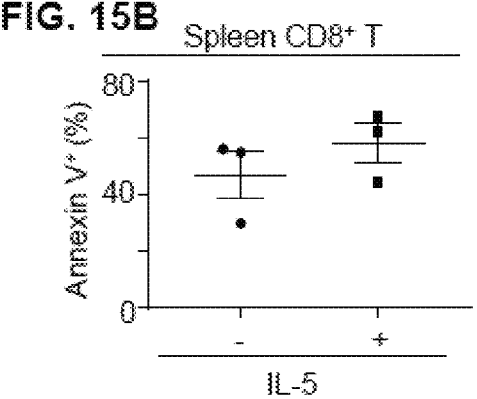
Figure 17:
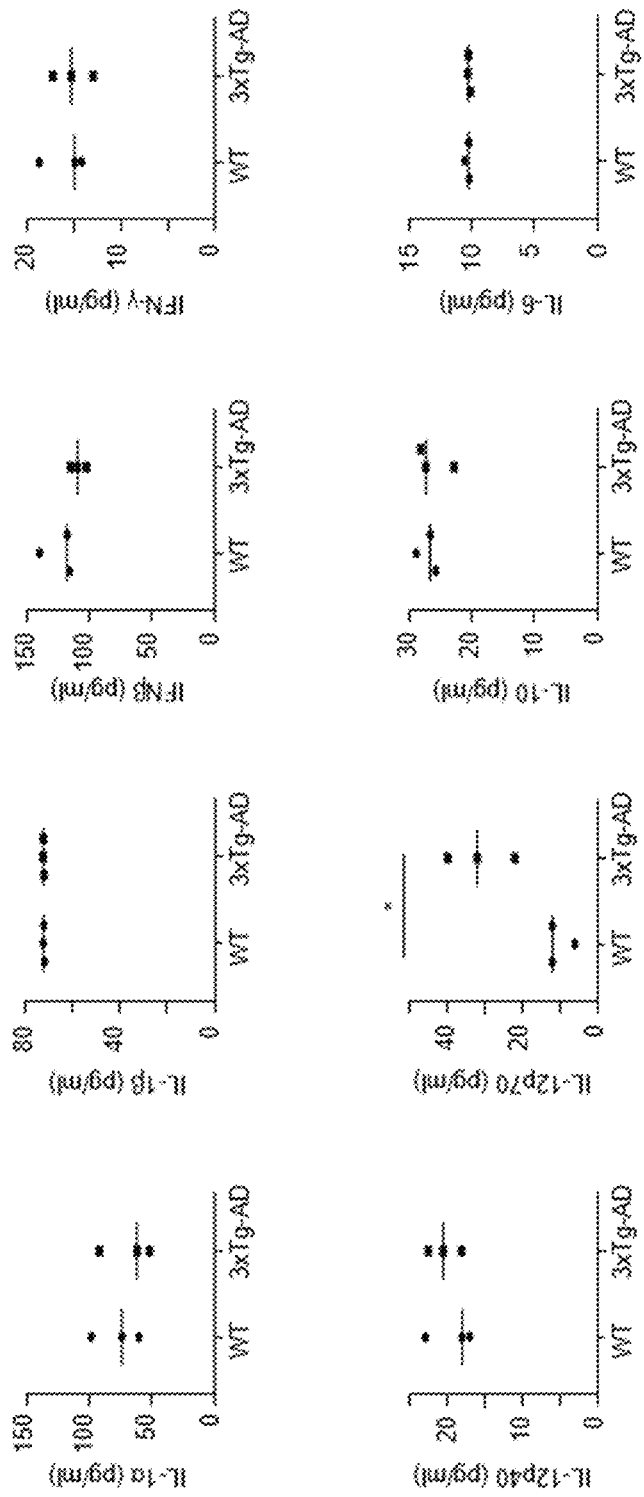
FIG. 17 shows cytokine concentrations in the brain homogenate of 3×Tg-AD mice and control wildtype mice. Concentrations of the indicated cytokines in brain homogenate from 3×Tg-AD mice and control wildtype mice (12 months old). Data are from 3 mice per group, two independent experiments. Error bars=mean±SEM. *p<0.05; **p<0.01.
Figure 17:
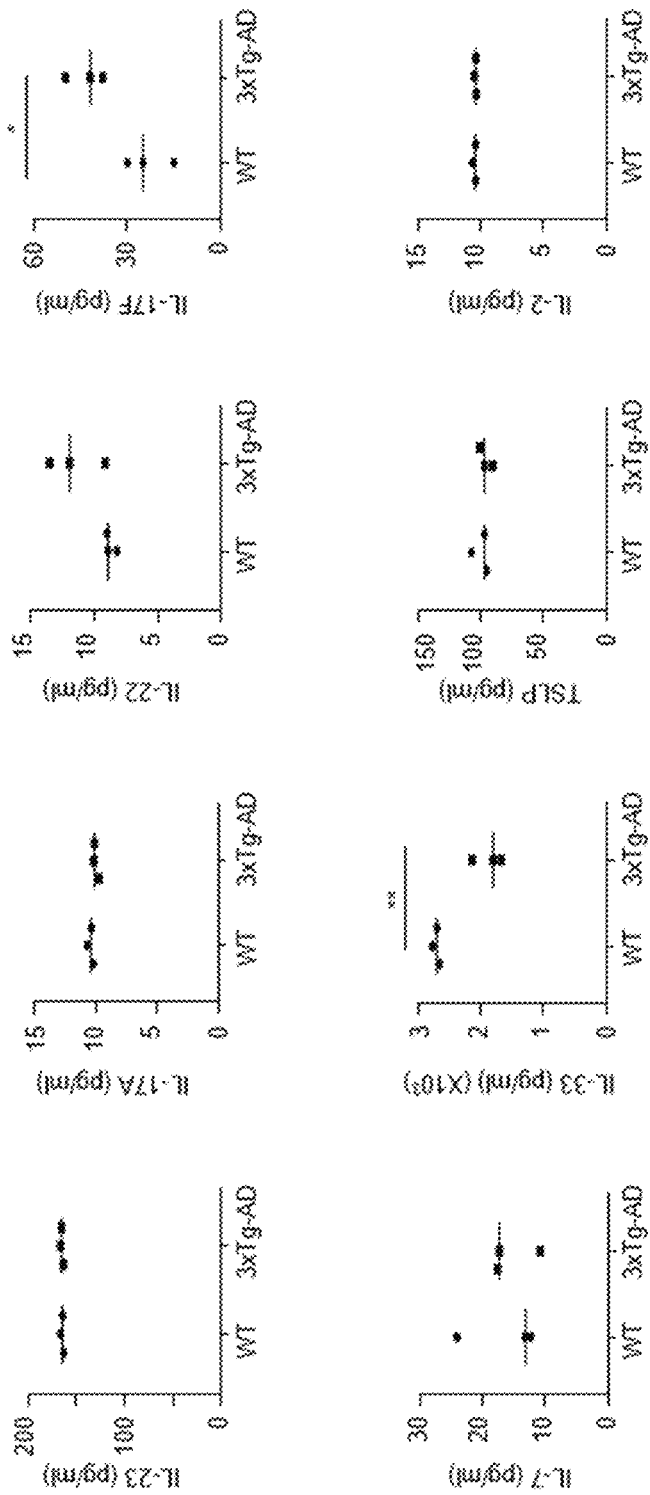

It was next sought to understand the mechanism by which IL-5 restrains neuroinflammation in the aged brain. IL-5 was found to induce proliferation of regulatory eosinophils that can repress tissue inflammation (Anderson et al., "Intravascular Staining for Discrimination of Vascular and Tissue Leukocytes," *Nat. Protoc.* 9:209-222 (2014); Andersson et al., "Eosinophils From Hematopoietic Stem Cell Recipients Suppress Allogeneic T Cell Proliferation," *Biol. Blood Marrow Transplant* 20:1891-1898 (2014); Arnold et al., "Eosinophils Suppress Th1 Responses and Restrict Bacterially Induced Gastrointestinal Inflammation," *J. Exp. Med.* 215:2055-2072 (2018); Finlay et al., "Helminth Products Protect against Autoimmunity via Innate Type 2 Cytokines IL-5 and IL-33, Which Promote Eosinophilia," *J. Immunol.* 196:703-714 (2016); Lingblom et al., "Regulatory Eosinophils Suppress T Cells Partly through Galectin-10," *J. Immunol.* 198:4672-4681 (2017); Mesnil et al., "Lung-Resident Eosinophils Represent a Distinct Regulatory Eosinophil Subset," *J. Clin. Invest.* 126:3279-3295 (2016), all of which are hereby incorporated by reference in their entirety). However, eosinophils were not detected in the brains of aged mice after in vivo IL-5 treatment, indicating that other mechanisms might be involved (FIG. 14). It was noted that, in response to in vivo IL-5 treatment, CD3$^+$ T cells in the aged brain exhibited increased expression of IL-5 signaling molecule Stat5b and IL-5-induced apoptotic molecule Bnip3, leading to the hypothesis that IL-5 might directly act on pro-inflammatory T cells in the aged brain (FIG. 7F). To test this, CD4$^+$ and CD8$^+$ T cells were sort-purified from aged brains and cultured them in the presence or absence of IL-5. Anti-CD3, anti-CD28, IL-2 and IL-7 were added to the culture to ensure T cell survival. Notably, exposure to IL-5 abolished Tnf expression in purified CD8$^+$ T cells within 24 hours (FIG. 7Q). The expression of Tnf by CD4$^+$ cells was low, and not significantly altered by IL-5 (FIG. 7Q). Exposure to IL-5 also reduced the expression of Stat6b and Bnip3, two IL-5 signaling targeted genes, in aged brain CD8$^+$ T cells (FIG. 7R). Consistent with elevated expression of Bnip3, CD8$^+$ T cells cultured with IL-5 also exhibited increased apoptosis, demonstrated by increased percentage of Annexin V$^+$ cells at day 3 of culture (FIG. 14). In contrast, culturing with IL-5 did not affect Tnf expression or the apoptotic rate of CD8$^+$ T cells sorted from the spleens of aged mice (FIGS. 8A-8B). Thus, IL-5 may specifically restrict the survival and TNFα expression of aging-associated brain-resident CD8$^+$ T cells. Together, IL-5 may directly act on aging-associated pro-inflammatory T cells to restrain neuroinflammation, which might lead to enhanced neurogenesis and improved cognitive function.

Example 8—Discussion of Examples 1-7

The present disclosure has thus revealed the accumulation of tissue-resident ILC2 in the choroid plexus of aged brains and demonstrated that their activation may revitalize the aged brain and alleviate aging-associated cognitive decline. Interestingly, ILC2 in the aged brain are long-lived, capable of switching between cell cycle dormancy and proliferation, and resistant to cellular senescence and exhaustion under replication stress. When activated in vitro and transferred into the aged brain, they can drastically improve the cognitive function of aged mice. IL-5, a major effector molecule produced by ILC2, is sufficient to restrain aging-associated neuroinflammation and to alleviate aging-associated cognitive decline. Together, targeting these ILC2 in the aged brain may provide new avenues to combat brain aging.

The data indicate that the effects of aging on immune cells are much more complicated than previously appreciated. Earlier work focused heavily on the detrimental effects of aging on the immune system. The term "immunosenescence" emerged to describe a decline in adaptive immunity and increased susceptibility to infectious diseases with aging (Goronzy et al., "Understanding Immunosenescence to Improve Responses to Vaccines," *Nat. Immunol.* 14:428-436 (2013), which is hereby incorporated by reference in its entirety). Cellular senescence in immune cells was also linked with compromised functional capability, decreased self-renewal and/or increased secretion of destructive pro-inflammatory cytokines (Coppe et al., "The Senescence- Associated Secretory Phenotype: The Dark Side of Tumor Suppression," *Annu. Rev. Pathol.* 5:99-118 (2010); Dilger et al., "Aging, Microglial Cell Priming, and the Discordant Central Inflammatory Response to Signals From the Peripheral Immune System," *J. Leukoc. Biol.* 84:932-939 (2008); Franceschi et al., "Inflammaging: A New Immune-Metabolic Viewpoint For Age-Related Diseases," *Nat. Rev. Endocrinol.* 14:576-590 (2018); and Goronzy et al., "Successful and Maladaptive T Cell Aging," *Immunity* 46:364-378 (2017), all of which are hereby incorporated by reference in their entirety). However, the study instead reveals that aging leads to the accumulation of a unique subset of brain ILC2 that exhibit enhanced cellular fitness, increased self-renewal and robust beneficial functional capability. Despite their accumulation with age, ILC2 in the aged brain are resistant to cellular senescence and exhaustion in response to replication stress, which may lead to enhanced long-term self-renewal capability. ILC2 in the aged brain are functionally quiescent at homeostasis, but can be vigorously activated and re-activated by exogenous stimuli. They possess potent functional capability to secrete beneficial effector molecules that restrain neuroinflammation and improve cognitive function. These results collectively suggest that aging may paradoxically select unique populations of lymphocytes with increased fitness, relative resistance to cellular senescence and preserved beneficial functional capability that may be harnessed to combat aging-associated diseases.

The brain is particularly susceptible to the effects of aging, with aging being the major risk factor for a variety of neurocognitive and neurodegenerative diseases. In the present disclosure, there is direct evidence provided that activated ILC2 can alleviate aging-associated cognitive decline. A novel role for IL-5 has further been defined in repressing aging-associated neuroinflammation and in improving the cognitive function of aged mice. Interestingly, eosinophil growth was not observed in the aged brain after IL-5 treatment. Instead, IL-5 may directly repress the survival and the production of pro-inflammatory cytokines of a unique subset of tissue-resident CD8$^+$ T cells in the aged brain. Further efforts to generate aged eosinophil deficient or aged CD8$^+$ T cells deficient mice would be worthwhile in understanding the intrigue roles of immune cells in brain aging.

The results have also revealed interesting differences in the transcriptomes and functional capability between meningeal and CP ILC2 in the aged brain. Compared to meningeal ILC2, CP ILC2 possess more potent capability to proliferate and to produce type-2 cytokines in response to IL-33. Both meningeal and CP ILC2 express high amounts of Il1rl (encoding IL-33R) at comparable levels. Thus, other mechanisms likely contribute to their differential functional capability. Recent studies indicate that the developmental origins of ILC2 might influence their functional potential (Ricardo-Gonzalez et al., "Tissue Signals Imprint ILC2 Identity with Anticipatory Function," *Nat. Immunol.* 19:1093-1099 (2018) and Schneider et al., "Tissue-Resident Group 2 Innate Lymphoid Cells Differentiate by Layered Ontogeny and In Situ Perinatal Priming," *Immunity* 50:1425-1438 e1425 (2019), which are hereby incorporated by reference in their entirety). In future efforts, it would be worthwhile to explore the ontogeny of meningeal and CP ILC2 in the context of aging, using aged lineage-tracing and other transgenic mice. Potential developmental origins of meningeal and CP ILC2 in aged mice include long-term self-renewal of fetal/postnatal precursor-derived cells, repopulation from adult bone marrow precursors, and repopulation from extramedullary precursors. It would be interesting to understand whether the distinctive property of ILC2 in the aged brain might be related to a unique developmental pathway. Of note, choroid plexus is in close proximity to the hippocampus and other brain parenchyma. Such specialized anatomical location, together with their enhanced functional capability, suggests that CP ILC2 in the aged brain are a promising target for alleviating aging-associated cognitive decline.

Example 9—Materials and Methods

Mice, treadmill exercise, and cytokine administration—3xTg-AD (developed by Dr. Frank LaFerla at UC Irvine) and control B6129SF2/J wildtype breeders were obtained from MMRRC JAX (Oddo et al., "Triple-Transgenic Model of Alzheimer's Disease With Plaques and Tangles: Intracellular Abeta and Synaptic Dysfunction," *Neuron.* 39:409-21 (2003), which is hereby incorporated by reference in its entirety). Mice were bred in the animal facility of Albany Medical College. Female mice of 4 weeks to 18 months were used in this study. All animal experiments were performed according to protocols approved by the Institutional Animal Care and Use Committee at Albany Medical College.

Mice were exercised on a treadmill (Ugo Basil, 57630) for 1 hour per day as was previously described (Balnis et al., "IL-13-Driven Pulmonary Emphysema Leads to Skeletal Muscle Dysfunction Attenuated by Endurance Exercise," *J. Appl. Physiol.* (1985) 128:134-48 (2020), which is hereby incorporated by reference in its entirety). Animals underwent treadmill exercise 5 days a week for 4 weeks. The speeds were set as 12 m/min for the first two weeks, 15/m for the third week, and 17 m/min for the fourth week. Mice were euthanized and ILC2 activity was examined on the day after the last day of treadmill exercise.

For cytokine treatments, mice were administered with 1 μg IL-12p70, 1 μg IL-17F, or 400 ng IL-33, intraperitoneally daily for 4 days. Mice were euthanized and ILC2 activity was examined on the day after the last day of cytokine treatment. For IL-5 treatments, mice were administrated with 2 g IL-5 intraperitoneally daily for 2 days. Mice were euthanized and Aβ concentrations were examined 24 hours after the last IL-5 treatment.

Isolation of Brain Hematopoietic Cells—Mice were perfused through the right ventricle with 50 ml of PBS. Brains were minced with fine scissors and digested in HBSS with 0.2 mg/ml of Liberase TL (Sigma) and 0.1 mg/ml DNase I (Sigma) at 37° C. for 30 minutes. Cells were filtered through a 70 μM cell strainer. Gradient centrifugation with 40% Percoll (GE) were performed to purify live immune cells.

Flow Cytometry and intracellular cytokine staining—Flow cytometry analysis were performed as was previously described (22-27). Antibodies in the lineage markers included anti-B220 (RA3-6B2), anti-NK1.1 (PK136), anti-CD11b (M1/70), anti-CD3 (2C11), anti-CD5 (53-7.3) and anti-TCRβ (H57). Other antibodies included anti-CD45.2 (104), anti-Thy1.2 (53-2.1), anti-CD25 (PC61.5), anti-T1/ST2 (DJ8), anti-IL5 (TRFK5), anti-IL13 (ebiol3A) and anti-GATA3 (TWAJ). Antibodies were purchased from BioLegend or Thermo. For intracellular staining of cytokines, cells were re-stimulated with PMA and Ionomycin in the presence of Monensin at 37° C. for 2.5 hrs. Intracellular staining for cytokines was performed using the Cytofix/Cytoperm Kit (BD) according to the manufacturer's instructions. Flow cytometric analysis was performed using a FACSCanto analyzer (BD).

Measurement of cytokines and β-Amyloid concentration—Cytokine concentrations in brain homogenate and serum were measured using the LEGENDplex Kit (BioLegend) following the manufacturer's instructions (Lehmann et al., "Multiplex Cytokine Profiling of Stimulated Mouse Splenocytes Using a Cytometric Bead-based Immunoassay Platform," *J. Vis. Exp.* (2017), which is hereby incorporated by reference in its entirety). The concentrations of soluble and insoluble β-Amyloid were measured using the LEGENDMAX™ β-Amyloid x-42 ELISA kit (BioLegend) according to the manufacturer's instructions.

Statistical analysis—Student's t tests were used to calculate statistical significance between two different groups. $P<0.05$ was considered significant.

Example 10—Aging-Associated Accumulation of Brain ILC2 is Lost in 3×Tg-AD Mice

Recent work indicates that ILC2 accumulated in the aged brain and their activation alleviates aging-associated cognitive decline (Hin et al., "Activation of Group 2 Innate Lymphoid Cells Alleviates Aging-Associated Cognitive Decline," *J. Exp. Med.* 217 (4):e20190915 (2020), which is hereby incorporated by reference in its by entirety). The regulation and function of ILC2 in Alzheimer's Disease, however, remain unknown. A hallmark of Alzheimer's Disease is increased neuroinflammation mediated by pro-inflammatory cytokines and other milieus (Calsolaro V. and Edison P., "Neuroinflammation in Alzheimer's Disease: Current Evidence and Future Directions," *Alzheimers Dement.* 12:719-32 (2016) Bradburn et al., "Neuroinflammation in Mild Cognitive Impairment and Alzheimer's Disease: A Meta-Analysis," *Ageing Res. Rev.* 50:1-8 (2019); Chaney et al., "In Vivo Molecular Imaging of Neuroinflammation in Alzheimer' Disease," *J. Neurochem.* 149:438-51 (2019), all of which are hereby incorporated by reference in their entirety). Because ILC2 activity can be regulated by many inflammatory and anti-inflammatory cytokines, it was hypothesized that ILC2 number and activity might alter in the inflamed brains of Alzheimer's Disease. To test this hypothesis, ILC2 in the brains of the triple-transgenic Alzheimer's Disease mouse model (3×Tg-AD) and control wild type (WT) mice was examined at various ages. Consistent with previous reports, ILC2 gradually accumulated with aging in control WT mice (FIGS. 1A, 1B). Interestingly, such aging-associated accumulation of brain ILC2 was lost in 3×Tg-AD mice (FIGS. 1A, 1B). Specifically, a small number of ILC2 were detected in the brains of both 3×Tg-AD and control WT mice at a young age (4 weeks old); and the number of brain ILC2 were comparable between 3×Tg-AD and control wildtype mice at this young age (FIG. 1B). However, while the numbers of brain ILC2 gradually increased with age in wildtype mice, ILC2 numbers remained low in the brains of 3×Tg-AD mice over age (FIG. 1B). Compared to age-matched wildtype mice, the number of brain ILC2 were severely compromised in middle-aged and aged 3×Tg-AD mice (FIG. 1B). The ILC2 deficiency became apparent as early as 7 months (FIG. 1B). This is a time point at which 3×Tg-AD mice begin to exhibit increased brain inflammation and declined cognitive function (Oddo et al., "Triple-Transgenic Model of Alzheimer's Disease With Plaques and Tangles: Intracellular Abeta and Synaptic Dysfunction," *Neuron.* 39:409-21 (2003), which is hereby incorporated by reference in its entirety). Together, ILC2 fail to accumulate with age in the brains of triple transgenic AD mouse model.

The functional activity of ILC2 in the brains of wildtype and 3×Tg-AD mice was next examined. ILC2 in the brains of 7-month wildtype mice expressed relatively high amounts of IL-5 and IL-13 (FIG. 1C, 1D). Notably, the expression of both IL-5 and IL-13 was diminished in brain ILC2 of 3×Tg-AD mice (FIG. 1C, 1D). Thus, the remaining ILC2 in the brains of 3×Tg-AD mice are functionally defective, failing to produce cytokines.

Example 11—Increased Concentration of IL-17F Represses ILC2 Activity in 3×Tg-AD Mice Whether increased concentrations of proinflammatory cytokines in AD brains might lead to reduced cellularity and functional activity of ILC2 was sought to be determined. A bead-based multiplex assay was used to examine the concentrations of various pro-inflammatory cytokines in the brains of 3×Tg-AD mice and control wildtype mice (FIG. 2). Notably, multiplex assays revealed that concentrations of two proinflammatory cytokines IL-12 and IL-17F were increased in the brain homogenate of 3×Tg-AD mice (FIG. 2). The concentrations of other pro-inflammatory cytokines such as IL-1s, IFNs, and IL-6 were low and comparable in the brain homogenate of 3×Tg-AD and control wildtype mice. The concentration of IL-22 showed a trend towards being increased in the brains of 3×Tg-AD mice. The levels of several cytokines that are known to promote ILC2 proliferation and function were also examined, including IL-2, IL-7, IL-33 and TSLP (Yang Q. and Bhandoola A., "The Development of Adult Innate Lymphoid Cells," *Curr. Opin. Immunol.* 39:114-20 (2016), which is hereby incorporated by reference in its entirety). Interestingly, the concentrations of IL-33, but not the other cytokines, were significantly decreased in 3×Tg-AD mice (FIG. 2). Together, 3×Tg-AD mice have increased concentrations of pro-inflammatory cytokines IL-12 and IL-17F, but decreased levels of IL-33 in the brain.

Previous studies indicate that IL-12 can induce the functional plasticity of ILC2 (Ohne et al., "IL-1 is a Critical Regulator of Group 2 Innate Lymphoid Cell Function and Plasticity," *Nat. Immunol.* 17:646-55 (2016) and Lim et al., "IL-12 Drives Functional Plasticity of Human Group 2 Innate Lymphoid Cells," *J. Exp. Med.* 213:569-83 (2016), both of which are hereby incorporated by reference in their entirety). The role of IL-17F in regulating ILC2 function has not been explored before. It was sought to determine whether a high level of the proinflammatory cytokines IL-12 and IL-17F might influence the maintenance and/or functional activity of ILC2. Recombinant IL-12 and IL-17F were administered into wildtype mice, and examined ILC2 in the brain. IL-12 administration did not affect the number of ILC2 in the brain (FIG. 3A). The cytokine production activity of ILC2 was also not altered by IL-12 treatment (FIG. 3B). Thus, a high amount of IL-12 did not inhibit ILC2 maintenance or activity. Mice were next treated with recombinant IL-17F. IL-17F administration also did not significantly change the cellularity of ILC2 in the brain (FIG. 3C). However, the expression of both IL-5 and IL-13 by brain ILC2 was significantly reduced in mice treated with IL-17F, compared to mice treated with PBS control (FIG. 3C). Thus, a high level of IL-17F, but not IL-12, impaired the functional activity of brain ILC2. The increased concentration of IL-17F in 3×Tg-AD likely contributes to the decreased functional activity of brain ILC2 in these mice.

3×Tg-AD mice also had decreased concentrations of IL-33, a potent activator of ILC2, in the brain (FIG. 2). To determine whether decreased levels of IL-33 may also contribute to the impaired cellularity and functional activity of ILC2 in 3×Tg-AD mice, recombinant IL-33 to 3×Tg-AD was administered mice. Indeed, IL-33 treatment increased the numbers of ILC2 in the brain of 3×Tg-AD mice (FIG. 3E). The cytokine production of ILC2 was also drastically increased in IL-33 treated 3×Tg-AD mice (FIG. 3F). Thus, decreased levels of IL-33 might also contribute to the reduced cellularity and functional activity of brain ILC2 in 3×Tg-AD mice.

Example 12—Treadmill Exercise Enhances ILC2 Activity in 3×Tg-AD Mice

Aerobic exercise has established roles in improving Alzheimer's Disease pathologies and symptoms in clinical trials and in animal models of Alzheimer's Disease (Liu et al., "Short-term Resistance Exercise Inhibits Neuroinflammation and Attenuates Neuropathological Changes in 3×Tg Alzheimer's Disease Mice," *J. Neuroinflammation* 17:4 (2020); Zhang et al., "Treadmill Exercise Inhibits Amyloid-beta Generation in the Hippocampus of APP/PS1 Transgenic Mice by Reducing Cholesterol-mediated Lipid Raft Formation," *Neuroreport.* 30:498-503 (2019); Zhang et al., "Treadmill Exercise Decreases Abeta Deposition and Counteracts Cognitive Decline in APP/PS1 Mice, Possibly via Hippocampal Microglia Modifications," *Front Aging Neurosci.* 11:78 (2019); Mee-Inta et al., "Physical Exercise Inhibits Inflammation and Microglial Activation," *Cells* 8 (2019); Kim et al., "Protective Effect of Exercise Training Against the Progression of Alzheimer's Disease in 3×Tg-AD Mice," *Behav. Brain Res.* 374:112105 (2019); Buchman et al., "Physical Activity, Common Brain Pathologies, and Cognition in Community-dwelling Older Adults," *Neurology* 92:e811-e22 (2019); Panza et al., "Can Exercise Improve Cognitive Symptoms of Alzheimer's Disease?," *J. Am. Geriatr. Soc.* 66:487-95 (2018); Do et al., "The Effects of Exercise on Hypothalamic Neurodegeneration of Alzheimer's Disease Mouse Model," *PLoS One* 13:e0190205 (2018); Morris et al., "Aerobic Exercise for Alzheimer's Disease: A Randomized Controlled Pilot Trial," *PLoS One* 12:e0170547 (2017); Koo et al., "Treadmill Exercise Decreases Amyloid-beta Burden Possibly via Activation of SIRT-1 Signaling in a Mouse Model of Alzheimer's Disease," *Exp. Neurol.* 288:142-52 (2017); Um et al., "Treadmill Exercise Represses Neuronal Cell Death in an Aged Transgenic Mouse Model of Alzheimer's Disease," *Neurosci. Res.* 69:161-73 (2011); and Garcia-Mesa et al., "Physical Exercise Protects Against Alzheimer's Disease in 3×Tg-AD Mice," *J. Alzheimers Dis.* 24:421-54 (2011), all of which are hereby incorporated by reference in their entirety). Therefore, it was examined whether aerobic exercise may influence ILC2 activity in the brains of 3×Tg-AD mice. A forced treadmill exercise protocol modified from previous studies that has demonstrated protective effects of treadmill exercise in mouse models of Alzheimer's Disease was used (FIG. 4A) (Zhang et al., "Treadmill Exercise Inhibits Amyloid-beta Generation in the Hippocampus of APP/PS1 Transgenic Mice by Reducing Cholesterol-mediated Lipid Raft Formation," *Neuroreport.* 30:498-503 (2019); Zhang et al., "Treadmill Exercise Decreases Abeta Deposition and Counteracts Cognitive Decline in APP/PS1 Mice, Possibly via Hippocampal Microglia Modifications," *Front Aging Neurosci.* 11:78 (2019); Koo et al., "Treadmill Exercise Decreases Amyloid-beta Burden Possibly via Activation of SIRT-1 Signaling in a Mouse Model of Alzheimer's Disease," *Exp. Neurol.* 288:142-52 (2017); Um et al., "Treadmill Exercise Represses Neuronal Cell Death in an Aged Transgenic Mouse Model of Alzheimer's Disease," *Neurosci. Res.* 69:161-73 (2011), all of which are hereby incorporated by reference in their entirety). Interestingly, treadmill exercise significantly reduced the concentrations of IL-17F in 3×Tg-AD mice (FIG. 4B). In contrast, the levels of IL-12 and IL-33 remained comparable between exercised mice and sedentary mice. Because a high level of IL-17F can repress ILC2 activity (FIG. 3D), it was hypothesized that exercise might enhance ILC2 activity in the brains of 3×Tg-AD mice by repressing IL-17F concentrations. Thus, ILC2 numbers and cytokine production in exercised and sedentary 3×Tg-AD mice was directly examined. Indeed, ILC2 in the brains of exercised mice expressed significantly higher amounts of both IL-5 and IL-13, compared to those in sedentary mice (FIG. 4, C-E). Together, treadmill exercise led to reduced concentration of IL-17F and increased activity of brain ILC2 in 3×Tg-AD mice.

To determine whether enhancing ILC2 activity might lead to improved AD pathologies, 3×Tg-AD mice were treated with IL-5, a cytokine produced by activated ILC2. Notably, IL-5 treatment rapidly reduced the concentrations of soluble Aβ in 3×Tg-AD mice (FIG. 4F). Thus, enhancing ILC2 activity may alleviate Aβ burden in Alzheimer's Disease.

Example 13—Discussion of Examples 9-12

In the present work, striking numerical and functional defects of ILC2 in the brains of 3×Tg-AD mice were revealed. A novel role for IL-17F in repressing ILC2 function was also uncovered, and it was demonstrated that aerobic exercise can reduce IL-17F concentrations and partially restore ILC2 activity in 3×Tg-AD mice. Finally, treatment with IL-5, a cytokine produced by activated ILC2, alleviates Aβ pathologies in 3×Tg-AD mice. Thus, enhancing ILC2 activity by altering lifestyle might alleviate the disease progression of AD.

Alzheimer's Disease is a devastating disease characterized by increased Aβ and tau pathologies, declined cognitive function and increased neuroinflammation (Bondi et al., "Alzheimer's Disease: Past, Present, and Future," *J. Int. Neuropsychol. Soc.* 23:818-31 (2017) and Wang et al., "A Systemic View of Alzheimer Disease—Insights From Amyloid-Beta Metabolism Beyond the Brain," *Nat. Rev. Neurol.* 13:703 (2017), which are hereby incorporated by reference in their entirety). Using multiplex assays, it was revealed that the transgenic AD mice model (3×Tg-AD) has markedly increased concentrations of pro-inflammatory cytokines IL-12 and IL-17F in the brain. Interestingly, the results indicate that high levels of IL-17F, but not IL-12, represses the functional activity of ILC2. IL-17F is a close family member of, and shares receptors with, IL-17A (Dubin P J and Kolls J K., "Interleukin-17A and Interleukin-17F: A Tale of Two Cytokines," *Immunity* 30:9-11 (2009), which is hereby incorporated by reference in its entirety). IL-17A has long been implicated in brain function, and its role in Alzheimer's Disease remains controversial. While some reports indicate beneficial roles of IL-17A in promoting short-term memory and in reducing AD pathologies (Ribeiro et al., "Meningeal Gammadelta T Cell-derived IL-17 Controls Synaptic Plasticity and Short-term Memory," *Sci. Immunol.* 4 (2019); Saksida et al., "Impaired IL-17 Production in Gut-Residing Immune Cells of 5×FAD Mice with Alzheimer's Disease Pathology," *J. Alzheimers Dis.* 61:619-30 (2018); Yang et al., "Intracranial IL-17A Overexpression Decreases Cerebral Amyloid Angiopathy by Upregulation of ABCA1 in an Animal Model of Alzheimer's Disease," *Brain Behav. Immun.* 65:262-73 (2017), all of which are hereby incorporated by reference in their entirety), other reports suggest that a high amount of IL-17A might instead promote neuroinflammation and impair cognitive function (Cristiano et al., "Neutralization of IL-17 Rescues Amyloid-beta-induced Neuroinflammation and Memory Impairment," *Br. J. Pharmacol.* 176:3544-57 (2019); Liu et al., "Interleukin-17 Inhibits Adult Hippocampal Neurogenesis," *Sci. Rep.* 4:7554 (2014); and Zhang et al., "Th17 Cell-mediated Neuroinflammation is Involved in Neurodegeneration of abeta1-42-induced Alzheimer's Disease Model Rats," *PLoS One* 8:e75786 (2013), all of which are hereby incorporated by reference in their entirety). It is possible that the maintenance of the delicate brain function requires a highly balanced cytokine microenvironment, and thus either excessiveness or deficiency of stimulating cytokines will lead to deleterious effects. The role of IL-17F in regulating brain function and AD progression, however, has not been previously explored. The functional similarity and difference between IL-17F and IL-17A in other inflammatory diseases also remain elusive (Dubin P J and Kolls J K., "Interleukin-17A and Interleukin-17F: A Tale of Two Cytokines," *Immunity* 30:9-11 (2009) and Tang et al., "Suppression of IL-17F, But Not of IL-17A, Provides Protection Against Colitis by Inducing Treg Cells Through Modification of the Intestinal Microbiota," *Nat. Immunol.* 19:755-65 (2013), both of which are hereby incorporated by reference in their entirety). The data indicate a novel role for IL-17F in repressing ILC2 activity and suggests that increased concentrations of IL-17F might contribute to ILC2 defects in the mouse model of Alzheimer's Disease. Future studies to further explore the functional importance of IL-17F in human AD are thus warranted.

Lifestyle factors have been long implicated in AD development and progression. Beneficial effects of physical exercise in AD has been demonstrated by results from clinical trials and animal research (Liu et al., "Short-term Resistance Exercise Inhibits Neuroinflammation and Attenuates Neuropathological Changes in 3×Tg Alzheimer's Disease Mice," *J. Neuroinflammation* 17:4 (2020); Zhang et al., "Treadmill Exercise Inhibits Amyloid-beta Generation in the Hippocampus of APP/PS1 Transgenic Mice by Reducing Cholesterol-mediated Lipid Raft Formation," *Neuroreport.* 30:498-503 (2019); Zhang et al., "Treadmill Exercise Decreases Abeta Deposition and Counteracts Cognitive Decline in APP/PS1 Mice, Possibly via Hippocampal Microglia Modifications," *Front Aging Neurosci.* 11:78 (2019); Mee-Inta et al., "Physical Exercise Inhibits Inflammation and Microglial Activation," *Cells* 8 (2019); Kim et al., "Protective Effect of Exercise Training Against the Progression of Alzheimer's Disease in 3×Tg-AD Mice," *Behav. Brain Res.* 374:112105 (2019); Buchman et al., "Physical Activity, Common Brain Pathologies, and Cognition in Community-dwelling Older Adults," *Neurology* 92:e811-e22 (2019); Panza et al., "Can Exercise Improve Cognitive Symptoms of Alzheimer's Disease?," *J. Am. Geriatr. Soc.* 66:487-95 (2018); Do et al., "The Effects of Exercise on Hypothalamic Neurodegeneration of Alzheimer's Disease Mouse Model," *PLoS One* 13:e0190205 (2018); Morris et al., "Aerobic Exercise for Alzheimer's Disease: A Randomized Controlled Pilot Trial," *PLoS One* 12:e0170547 (2017); Koo et al., "Treadmill Exercise Decreases Amyloid-beta Burden Possibly via Activation of SIRT-1 Signaling in a Mouse Model of Alzheimer's Disease," *Exp. Neurol.* 288:142-52 (2017); Um et al., "Treadmill Exercise Represses Neuronal Cell Death in an Aged Transgenic Mouse Model of Alzheimer's Disease," *Neurosci. Res.* 69:161-73 (2011); and Garcia-Mesa et al., "Physical Exercise Protects Against Alzheimer's Disease in 3×Tg-AD Mice," *J. Alzheimers Dis.* 24:421-54 (2011), all of which are hereby incorporated by reference in their entirety). Here it is reported that, interestingly, treadmill exercise leads to enhanced ILC2 activity in the 3×Tg-AD mouse model. Of note, treadmill exercise reduces IL-17F levels in 3×Tg-AD mice, indicating that aerobic exercise might boost ILC2 activity by decreasing pro-inflammatory cytokines. Together, these results that ILC2 activity may be modulated by lifestyle factors, which in turn influences health and diseases.

The association between $A\beta$ pathologies and AD symptoms has been an area of intense study (Wang et al., "A Systemic View of Alzheimer Disease—Insights From Amyloid-Beta Metabolism Beyond the Brain," *Nat. Rev. Neurol.* 13:703 (2017), which is hereby incorporated by reference in entirety). Recent work indicates that soluble $A\beta$ oligomers might be the more neurotoxic form in AD patients (Fritschi et al., "Highly Potent Soluble Amyloid-beta Seeds in Human Alzheimer Brain but Not Cerebrospinal Fluid," *Brain* 137: 2909-15 (2014); Ono et al., "Structure-neurotoxicity Relationships of Amyloid beta-protein Oligomers," *Proc. Natl. Acad. Sci. USA* 106:14745-50 (2009); Selkoe D J. "Soluble Oligomers of the Amyloid Beta-protein Impair Synaptic Plasticity and Behavior," *Behav. Brain Res.* 192:106-13 (2008); Townsend et al., "Effects of Secreted Oligomers of Amyloid beta-protein on Hippocampal Synaptic Plasticity: A Potent Role for Trimers," *J. Physiol.* 572:477-92 (2006); Wang et al., "Soluble Oligomers of Beta Amyloid (1-42) Inhibit Long-term Potentiation but not Long-term Depression in Rat Dentate gyrus," *Brain Res.* 924:133-40 (2002); and Dahlgren et al., "Oligomeric and Fibrillar Species of Amyloid-beta Peptides Differentially Affect Neuronal Viability," *J. Biol. Chem.* 277:32046-53 (2002), all of which are hereby incorporated by reference in their entirety). Interestingly, the results indicate that treatment with IL-5 rapidly reduces the concentrations of soluble $A\beta$ in the 3×Tg AD mouse model. Of note, previous work also suggests that activated ILC2 and IL-5 can alleviate neuroinflammation and improve the cognitive function of aged mice without $A\beta$ pathologies (Hin et al., "Activation of Group 2 Innate Lymphoid Cells Alleviates Aging-Associated Cognitive Decline," *J. Exp. Med.* 217 (4):e20190915 (2020), which is hereby incorporated by reference in its entirety). Thus, enhancing ILC2 activity might provide beneficial neuroprotective effects through multiple mechanisms. Targeting ILC2 may provide new clues to combat AD.

While the novel technology has been illustrated and described in detail in the figures and foregoing description, the same is to be considered as illustrative and not restrictive in character, it being understood that only the preferred embodiments have been shown and described and that all changes and modifications that come within the spirit of the novel technology are desired to be protected. As well, while the novel technology was illustrated using specific examples, theoretical arguments, accounts, and illustrations, these illustrations and the accompanying discussion should by no means be interpreted as limiting the technology. All patents, patent applications, and references to texts, scientific treatises, publications, and the like referenced in this application are incorporated herein by reference in their entirety.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method of treating, or preventing progression of, aging-associated cognitive decline in a subject, comprising administering to the subject a cytokine selected from the group consisting of interleukin 5 (IL-5), interleukin 7 (IL-7), interleukin 25 (IL-25), thymic stromal lymphopoietin, and any combination of two or more of the foregoing, wherein the subject has aging-associated cognitive decline.

2. The method of claim 1, wherein the administering is to a choroid plexus of said subject.

3. The method of claim 1, wherein the administering is of an amount of from 1 mg to 10 mg of the cytokine.

4. The method of claim 1, wherein the administering comprises administering daily.

5. The method of claim 1, wherein said subject has mild cognitive impairment.

6. The method of claim 1, wherein said subject has frontotemporal dementia, senile dementia, or Alzheimer's disease.

7. The method of claim 1, wherein the subject does not have Alzheimer's disease.

8. The method of claim 1, wherein said administering is carried out intraperitoneally, orally, parenterally, nasally, subcutaneously, intravenously, intramuscularly, intracerebroventricularly, intraparenchymally, by intranasal inhalation, by implantation, by intracavitary or intravesical instillation, intraocularly, intraarterially, intralesionally, transdermally, or by application to mucous membranes.

9. The method of claim 1, comprising administering to the subject interleukin 5 (IL-5).

10. The method of claim 1, comprising administering to the subject interleukin 7 (IL-7).

11. The method of claim 1, comprising administering to the subject interleukin 25 (IL-25).

12. The method of claim 1, comprising administering to the subject thymic stromal lymphopoietin.

13. The method of claim 9, wherein said subject has mild cognitive impairment.

14. The method of claim 9, wherein said subject has frontotemporal dementia, senile dementias, or Alzheimer's disease.

15. The method of claim 10, wherein said subject has mild cognitive impairment.

16. The method of claim 10, wherein said subject has frontotemporal dementia, senile dementias, or Alzheimer's disease.

17. The method of claim 11, wherein said subject has mild cognitive impairment.

18. The method of claim 11, wherein said subject has frontotemporal dementia, senile dementias, or Alzheimer's disease.

19. The method of claim 12, wherein said subject has mild cognitive impairment.

20. The method of claim 12, wherein said subject has frontotemporal dementia, senile dementias, or Alzheimer's disease.

* * * * *